United States Patent
Yamamoto et al.

(10) Patent No.: US 10,187,659 B2
(45) Date of Patent: Jan. 22, 2019

(54) IMAGE DECODING DEVICE, IMAGE CODING DEVICE, AND CODING DATA TRANSFORM DEVICE

(71) Applicant: SHARP KABUSHIKI KAISHA, Sakai, Osaka (JP)

(72) Inventors: Tomoyuki Yamamoto, Sakai (JP); Tomohiro Ikai, Sakai (JP); Takeshi Tsukuba, Sakai (JP)

(73) Assignee: SHARP KABUSHIKI KAISHA, Sakia (JP)

(*) Notice: Subject to any disclaimer, the term of this patent is extended or adjusted under 35 U.S.C. 154(b) by 116 days.

(21) Appl. No.: 15/303,585

(22) PCT Filed: Apr. 24, 2015

(86) PCT No.: PCT/JP2015/062555
§ 371 (c)(1),
(2) Date: Oct. 12, 2016

(87) PCT Pub. No.: WO2015/163456
PCT Pub. Date: Oct. 29, 2015

(65) Prior Publication Data
US 2017/0034532 A1    Feb. 2, 2017

(30) Foreign Application Priority Data

Apr. 25, 2014 (JP) ................. 2014-091275
Jun. 17, 2014 (JP) ................. 2014-124100

(51) Int. Cl.
*H04N 19/61* (2014.01)
*H04N 19/70* (2014.01)
*H04N 19/30* (2014.01)
*H04N 19/17* (2014.01)
*H04N 19/105* (2014.01)
*H04N 19/174* (2014.01)
*H04N 19/187* (2014.01)

(52) U.S. Cl.
CPC .......... *H04N 19/61* (2014.11); *H04N 19/105* (2014.11); *H04N 19/17* (2014.11); *H04N 19/187* (2014.11); *H04N 19/30* (2014.11); *H04N 19/70* (2014.11); *H04N 19/174* (2014.11)

(58) Field of Classification Search
CPC .... H04N 19/105; H04N 19/17; H04N 19/174; H04N 19/187; H04N 19/30; H04N 19/61; H04N 19/70; H04N 19/50
See application file for complete search history.

(56) References Cited

U.S. PATENT DOCUMENTS

2018/0077419 A1* 3/2018 Minoo ................ H04N 19/187

OTHER PUBLICATIONS

Official Communication issued in International Patent Application No. PCT/JP2015/062555, dated Jul. 21, 2015.
(Continued)

*Primary Examiner* — Anner N Holder
(74) *Attorney, Agent, or Firm* — Keating & Bennett, LLP

(57) ABSTRACT

A hierarchy video decoding device (1) includes a parameter set decoding unit (12) that decodes reference region information, and a predicted image generation portion (1442) that derives a scale or a corresponding reference position, and generates a predicted image, based on a target layer reference region position and a reference layer reference region position which are derived from the reference region information.

6 Claims, 22 Drawing Sheets

(56) References Cited

OTHER PUBLICATIONS

Yamamoto et al., "AHG 13: On reference position calculation", Joint Collaborative Team on Video Coding (JCT-VC) of ITU-T SG 16 WP 3 and ISO/IEC JTC 1/SC 29/WG 11, JCTVC-R0220, Jun.-Jul. 2014, 5 pages.
Chen et al., "On phase offset for resampling process in SHVC", Joint Collaborative Team on Video Coding (JCT-VC) of ITU-T SG 16 WP 3 and ISO/IEC JTC 1/SC 29/WG 11, JCTVC-Q0168, Mar.-Apr. 2014, 4 pages.
Kwon et al., "Reference-layer cropping offsets signaling in SHVC", Joint Collaborative Team on Video Coding (JCT-VC) of ITU-T SG 16 WP 3 and ISO/IEC JTC 1/SC 29/WG 11, JCTVC-M0219, Apr. 2013, pp. 1-5.
Minoo et al., "Increased resolution for scaled reference layer offset", Joint Collaborative Team on Video Coding (JCT-VC) of ITU-T SG 16 WP 3 and ISO/IEC JTC 1/SC 29/WG 11, JCTVC-Q0119r1, Mar.-Apr. 2014, 7 pages.
Yamamoto et al., "AHG 13: Sub-region extraction—position calculation and comparison of different approaches", Joint Collaborative Team on Video Coding (JCT-VC) of ITU-T SG 16 WP 3 and ISO/IEC JTC 1/SC 29/WG 11, JCTVC-Q0159r1, Mar.-Apr. 2014, pp. 1-7.
Chen et al., "Preliminary version of High efficiency video coding (HEVC) scalable extension Draft 6", Joint Collaborative Team on Video Coding (JCT-VC) of ITU-T SG 16 WP 3 and ISO/IEC JTC 1/SC 29/WG 11, JCTVC-Q1008_v1, Mar.-Apr. 2014, 136 pages.
"Series H: Audiovisual and Multimedia Systems Infrastructure of Audiovisual Services—Coding of Moving Video" Recommendation H.265, ITU-T, Apr. 2013, 317 pages.

\* cited by examiner

FIG. 4
(a)
<RELATION BETWEEN PICTURE AND TILE-SLICE>
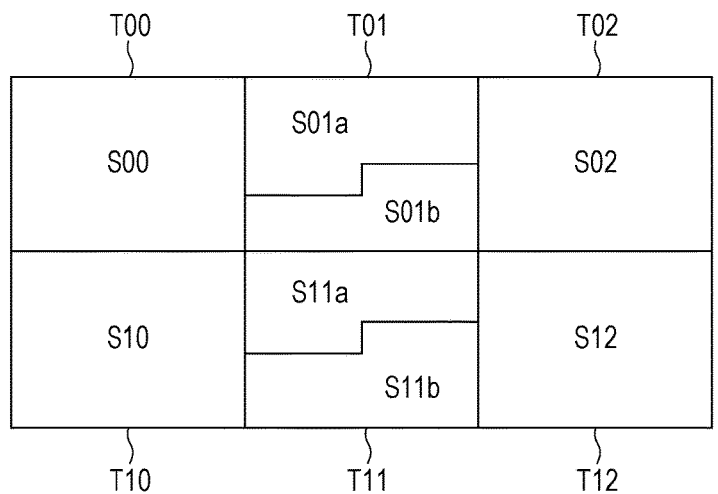
(b)
<RELATION BETWEEN CODING DATA AND TILE-SLICE>
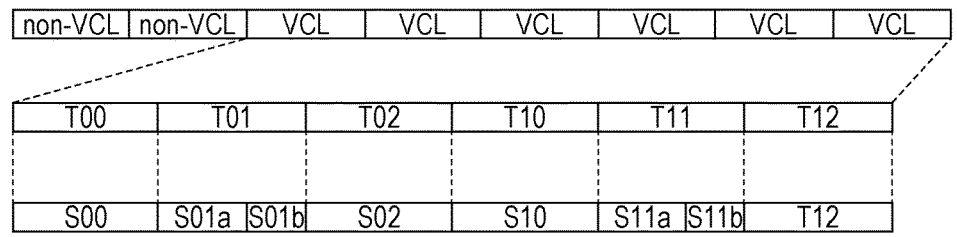

FIG. 9

| vps_extension(){ | Descriptor |
|---|---|
| ... | |
| ref_region_offsets_in_vps_flag | u(1) |
| if(ref_region_offsets_in_vps_flag){ | |
|   for(i = 0; i <= MaxLayersMinus1; i++){ | |
|     num_ref_region_offsets[i] | ue(v) |
|     for(j = 0; i < vps_num_ref_region_offsets[i]; j++){ | |
|       ref_region_layer_idx_delta_minus1[i][j] | ue(v) |
|       ref_region_left_offset[i][j] | se(v) |
|       ref_region_top_offset[i][j] | se(v) |
|       ref_region_right_offset[i][j] | se(v) |
|       ref_region_bottom_offset[i][j] | se(v) |
|     } | |
|   } | |
| } | |
| } | |

FIG. 10

| sps_multilayer_extension(){ | Descriptor |
|---|---|
| ... | |
| num_ref_region_offsets | ue(v) |
| for(i = 0; i < num_ref_region_offsets; i++){ | |
|   ref_region_layer_id[i] | u(6) |
|   ref_region_left_offset[ref_region_layer_id[i]] | se(v) |
|   ref_region_top_offset[ref_region_layer_id[i]] | se(v) |
|   ref_region_right_offset[ref_region_layer_id[i]] | se(v) |
|   ref_region_bottom_offset[ref_region_layer_id[i]] | se(v) |
|   ... | |
| } | |
| } | |

FIG. 11

| sps_multilayer_extension(){ | Descriptor |
|---|---|
| ... | |
| num_ref_region_offsets | ue(v) |
| for(i = 0; i < num_ref_region_offsets; i++){ | |
| ref_region_target_info[i] | u(7) |
| lid1 = (ref_region_target_info[i] < nuh_layer_id)? nuh_layer_id: (ref_region_target_info[i] − nuh_layer_id) | |
| lid2 = (ref_region_target_info[i] < nuh_layer_id)? nuh_region_target_info[i]: nuh_layer_id | |
| ref_region_left_offset[lid1][lid2] | se(v) |
| ref_region_top_offset[lid1][lid2] | se(v) |
| ref_region_right_offset[lid1][lid2] | se(v) |
| ref_region_bottom_offset[lid1][lid2] | se(v) |
| ... | |
| } | |
| } | |

FIG. 12

| sps_multilayer_extension(){ | Descriptor |
|---|---|
| ... | |
| nse_conf_win_il_flag | u(1) |
| ... | |
| } | |

FIG. 21
(a)
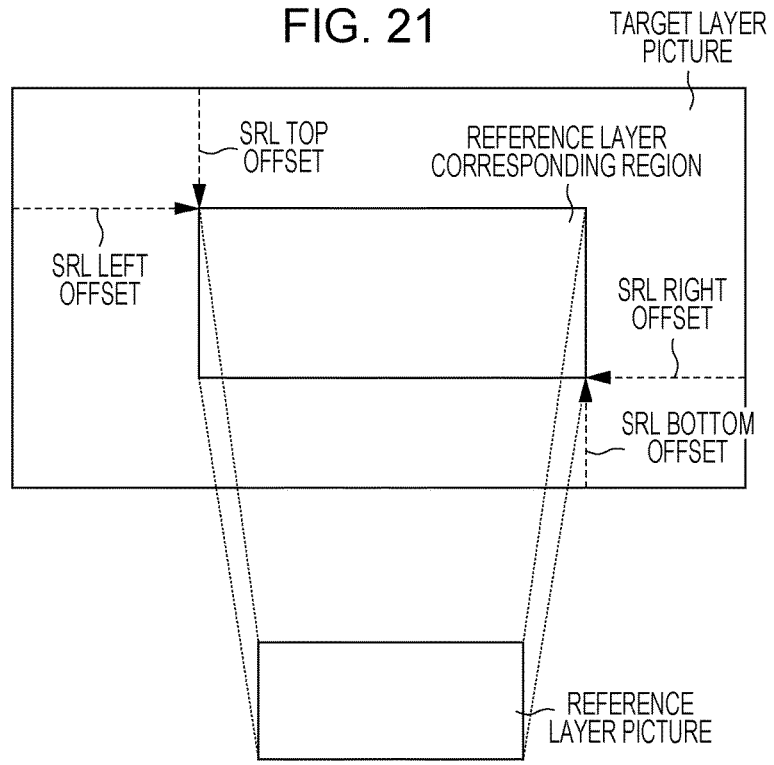
(b)
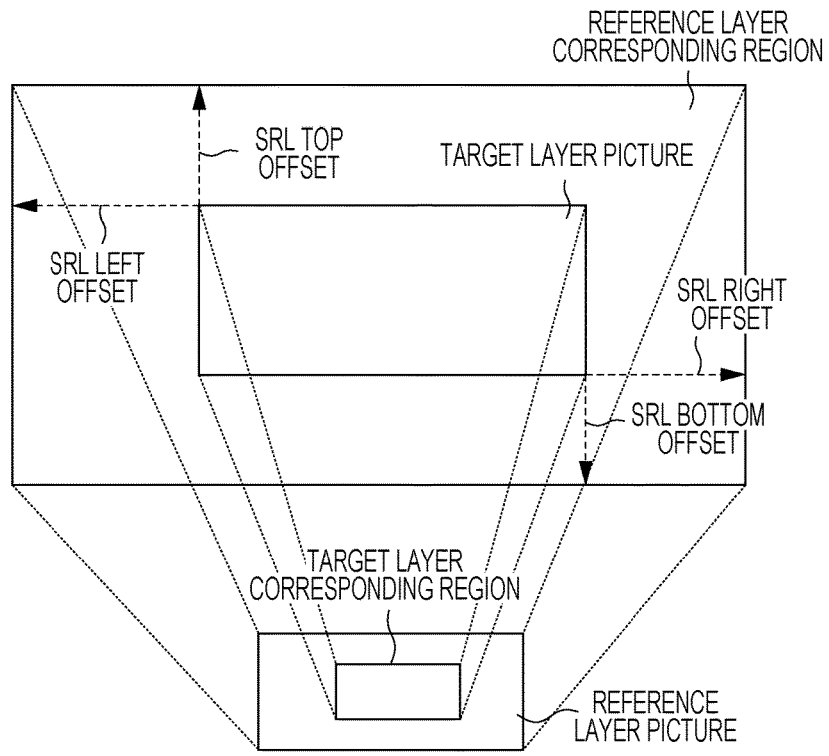

FIG. 22

| pps_multilayer_extension(){ | Descriptor |
|---|---|
| ... | |
| num_scaled_ref_layer_offsets | ue(v) |
| for(i = 0; i < num_scaled_ref_layer_offsets; i++){ | |
| ref_layer_id[i] | u(6) |
| scaled_ref_layer_left_offset[ref_layer_id[i]] | se(v) |
| scaled_ref_layer_top_offset[ref_layer_id[i]] | se(v) |
| scaled_ref_layer_right_offset[ref_layer_id[i]] | se(v) |
| scaled_ref_layer_bottom_offset[ref_layer_id[i]] | se(v) |
| ref_layer_offset_present_flag[i] | u(1) |
| if(ref_layer_offset_present_flag[i]){ | |
| ref_layer_left_offset[ref_layer_id[i]] | se(v) |
| ref_layer_top_offset[ref_layer_id[i]] | se(v) |
| ref_layer_right_offset[ref_layer_id[i]] | se(v) |
| ref_layer_bottom_offset[ref_layer_id[i]] | se(v) |
| } | |
| resample_phase_present_flag[i] | u(1) |
| if(resample_phase_present_flag[i]){ | |
| phase_hor_luma[ref_layer_id[i]] | ue(v) |
| phase_ver_luma[ref_layer_id[i]] | ue(v) |
| phase_hor_chroma[ref_layer_id[i]] | ue(v) |
| phase_ver_chroma[ref_layer_id[i]] | ue(v) |
| } | |
| } | |
| ... | |
| } | |

FIG. 23

| pps_multilayer_extension(){ | Descriptor |
|---|---|
| ... | |
| num_scaled_ref_layer_offsets | ue(v) |
| for(i = 0; i < num_scaled_ref_layer_offsets; i++){ | |
| ref_layer_id[i] | u(6) |
| scaled_ref_layer_offset_present_flag[i] | u(1) |
| if(scaled_ref_layer_offset_present_flag){ | |
| scaled_ref_layer_left_offset[ref_layer_id[i]] | se(v) |
| scaled_ref_layer_top_offset[ref_layer_id[i]] | se(v) |
| scaled_ref_layer_right_offset[ref_layer_id[i]] | se(v) |
| scaled_ref_layer_bottom_offset[ref_layer_id[i]] | se(v) |
| } | |
| ref_layer_offset_present_flag[i] | u(1) |
| if(ref_layer_offset_present_flag[i]){ | |
| ref_layer_left_offset[ref_layer_id[i]] | se(v) |
| ref_layer_top_offset[ref_layer_id[i]] | se(v) |
| ref_layer_right_offset[ref_layer_id[i]] | se(v) |
| ref_layer_bottom_offset[ref_layer_id[i]] | se(v) |
| } | |
| resample_phase_present_flag[i] | u(1) |
| if(resample_phase_present_flag[i]){ | |
| phase_hor_luma[ref_layer_id[i]] | ue(v) |
| phase_ver_luma[ref_layer_id[i]] | ue(v) |
| phase_hor_chroma[ref_layer_id[i]] | ue(v) |
| phase_ver_chroma[ref_layer_id[i]] | ue(v) |
| } | |
| } | |
| ... | |
| } | |

FIG. 24

| pps_multilayer_extension(){ | Descriptor |
|---|---|
| ... | |
|   num_scaled_ref_layer_offsets | ue(v) |
|   for(i = 0; i < num_scaled_ref_layer_offsets; i++){ | |
|     ref_layer_id[i] | u(6) |
|     layer_offset_present_flag[i] | u(1) |
|     if(layer_offset_present_flag[i]){ | |
|       scaled_ref_layer_left_offset[ref_layer_id[i]] | se(v) |
|       scaled_ref_layer_top_offset[ref_layer_id[i]] | se(v) |
|       scaled_ref_layer_right_offset[ref_layer_id[i]] | se(v) |
|       scaled_ref_layer_bottom_offset[ref_layer_id[i]] | se(v) |
|       ref_layer_left_offset[ref_layer_id[i]] | se(v) |
|       ref_layer_top_offset[ref_layer_id[i]] | se(v) |
|       ref_layer_right_offset[ref_layer_id[i]] | se(v) |
|       ref_layer_bottom_offset[ref_layer_id[i]] | se(v) |
|     } | |
|     resample_phase_present_flag[i] | u(1) |
|     if(resample_phase_present_flag[i]){ | |
|       phase_hor_luma[ref_layer_id[i]] | ue(v) |
|       phase_ver_luma[ref_layer_id[i]] | ue(v) |
|       phase_hor_chroma[ref_layer_id[i]] | ue(v) |
|       phase_ver_chroma[ref_layer_id[i]] | ue(v) |
|     } | |
|   } | |
| ... | |
| } | |

IMAGE DECODING DEVICE, IMAGE CODING DEVICE, AND CODING DATA TRANSFORM DEVICE

TECHNICAL FIELD

The present invention relates to an image decoding device which decodes hierarchy coding data obtained by hierarchically coding an image, and to an image coding device which generates hierarchy coding data by hierarchically coding an image.

BACKGROUND ART

In general, an image or a video is one of information transmitted in a communication system, or information recorded in an accumulation device. In the related art, a technology of coding an image for transmitting or accumulating an image (including a video in the following descriptions) is known.

As a video coding method, AVC (H.264/MPEG-4 Advanced Video Coding) and High-Efficiency Video Coding (HEVC) which are an advanced coding method is known (NPL 1).

In the video coding method, generally, a predicted image is generated based on a locally-decoded image obtained by coding/decoding an input image. A prediction residual obtained by removing the generated predicted image from the input image (original image) is coded. As a generation method of the predicted image, inter-frame prediction (inter-prediction) and intra-frame prediction (intra-prediction) are exemplified.

In the intra-prediction, a predicted image for a picture is sequentially generated based on a local decoding image in the same picture.

In the inter-prediction, a predicted image is generated by motion compensation between pictures. A decoded picture which is used when a predicted image is generated is referred to as a reference picture in the inter-prediction.

A technology in which a plurality of videos which are associated with each other is divided into layers (level layers), and coding is performed, and thus coding data is generated from the plurality of videos is also known. This technology may be referred to as a hierarchy coding technology. Coding data generated by using the hierarchy coding technology may be also referred to as hierarchy coding data.

As the representative hierarchy coding technology, Scalable HEVC (SHVC) which uses HEVC as a base is known (NPL 2).

In the SHVC, spatial scalability, temporal scalability, and SNR scalability are supported. For example, in a case of the spatial scalability, a plurality of videos which have different resolution is divided into layers, and coding is performed so as to generate hierarchy coding data. For example, an image obtained from an original image by performing down-sampling so as to have desired resolution is coded as a lower layer. Then, coding is performed as a higher layer in a state where inter-layer prediction is applied to the original image in order to remove redundancy between layers.

As the other representative hierarchy coding technology, Multi View HEVC (MV-HEVC) which uses HEVC as a base is known. In the MV-HEVC, view scalability is supported. In the view scalability, a plurality of videos which respectively correspond to different viewpoints (views) is divided into layers, and coding is performed so as to generate hierarchy coding data. For example, a video corresponding to a viewpoint (base view) which is used as a base is coded as a lower layer. Then, a video corresponding to a different viewpoint is coded as a higher layer in a state of applying the inter-layer prediction.

As the inter-layer prediction in the SHVC or the MV-HEVC, inter-layer image prediction and inter-layer motion prediction are provided. In the inter-layer image prediction, a predicted image is generated by using a decoding image of a lower layer. In the inter-layer motion prediction, a prediction value of motion information is derived by using the motion information of a lower layer. A picture used in prediction in the inter-layer prediction is referred to as an inter-layer reference picture. A layer including the inter-layer reference picture is referred to as a reference layer. In the following descriptions, a reference picture used in the inter-prediction and a reference picture used in the inter-layer prediction are collectively simply referred to as a reference picture.

The inter-layer image prediction includes reference pixel position deriving processing, and scale deriving processing. In the reference pixel position deriving processing, a pixel position on a lower layer, which corresponds to a position of a prediction target pixel on a higher layer is derived. In the scale deriving processing, a scale corresponding to magnification in extension processing applied to a picture of a lower layer is derived.

In the SHVC or the MV-HEVC, any of the inter-prediction, the intra-prediction, and the inter-layer image prediction can be used for generating a predicted image.

As one application of using the SHVC or the MV-HEVC, an image application considering an interest region is provided. For example, in an image reproduction terminal, generally, an image of the entire region is reproduced at relatively low resolution. In a case where a viewer of the image reproduction terminal designates a portion of a displayed image as an interest region, the designated interest region is displayed at high resolution in the reproduction terminal.

Such an image application considering an interest region can be realized by using hierarchy coding data. The hierarchy coding data is obtained in such a manner that coding is performed by setting an image which has relatively low resolution in the entire region, as coding data of a lower layer, and by setting an image which has high resolution in an interest region, as coding data of a higher layer. That is, in a case where the entire region is reproduced, only coding data of a lower layer is decoded and reproduced. In a case where an image which has high resolution in an interest region is reproduced, coding data of a higher layer is added to the coding data of the lower layer, and transmission is performed. Thus, the application can be realized in a transmission band which is narrower than that in a case where both pieces of coding data for a low resolution image, and coding data for a high resolution image are transmitted. At this time, coding data corresponding to a region which includes an interest region is extracted from the higher layer and the lower layer, and the extracted coding data is transmitted, and thus it is possible to suppress the transmission band.

In such an image application considering an interest region, in a case where coding data which includes an interest region and has a higher layer and a lower layer is generated, a positional relation between a pixel of the higher layer and a pixel of the lower layer is changed. As a result, there is a problem in that accuracy in prediction in a case where a pixel value of the higher layer is predicted based on a pixel value of the lower layer is degraded.

NPL 3 discloses a method in which additional information indicating a position of an alternative picture on the lower layer is transmitted, and a reference pixel position or a scale is calculated by using the additional information, and thus the reference pixel positions (corresponding reference positions) before and after extraction are equal to each other, or the scales before and after extraction are equal to each other even in a case where partial data corresponding to an interest region is extracted from hierarchy coding data.

CITATION LIST

Non Patent Literature

NPL 1: "Recommendation H.265 (04/13)", ITU-T (publication date: Jun. 7, 2016)

NPL 2: JCTVC-Q1008_v1 "Preliminary version of High efficiency video coding (HEVC) scalable extension Draft 6", Joint Collaborative Team on Video Coding (JCT-VC) of ITU-T SG 16 WP 3 and ISO/IEC JTC 1/SC 29/WG 11 17th Meeting: Valencia, ES, 27 Mar.-4 Apr. 2014 (publication date: May 15, 2014).

NPL 3: JCTVC-Q0159 "AHG 13: Sub-region extraction-position calculation and comparison of different approaches", Joint Collaborative Team on Video Coding (JCT-VC) of ITU-T SG 16 WP 3 and ISO/IEC JTC 1/SC 29/WG 11 17th Meeting: Valencia, ES, 27 Mar.-4 Apr. 2014 (publication date: Mar. 18, 2014)

SUMMARY OF INVENTION

Technical Problem

However, in the method disclosed in NPL 3, there is a problem in that applying multiple additional syntax elements is required when partial data corresponding to an interest region is extracted. The additional syntax element is used for coding or decoding additional data which is used for realizing maintaining of a reference pixel position or a scale. Thus, there is a problem in that processing for handling the additional syntax elements is required in an image decoding device and an image coding device, and thus the processing quantity of decoding/coding processing or a circuit size is increased.

Considering the above problems, an object of the present invention is to realize an image coding device and an image decoding device which can realize maintaining of a reference pixel position or a scale when partial data corresponding to an interest region is extracted, by using additional syntax elements of which the number is smaller than that in the related art. That is, the object of the present invention is to realize an image coding device and an image decoding device in which coding or decoding processing is performed with the smaller processing quantity and the smaller circuit size than those in the related art, and thus it is possible to realize maintaining of a reference pixel position or a scale when partial data corresponding to an interest region is extracted.

Solution to Problem

To solve the above problems, according to the present invention, there is provided an image coding device which decodes coding data subjected to hierarchy coding, and restores a decoding picture of a higher layer which is a target layer. The image coding device includes a parameter set decoding unit that decodes a parameter set, and a predicted image generation portion that generates a predicted image by inter-layer prediction, with reference to a decoding pixel of a reference layer picture. The parameter set decoding unit decodes reference region information. The predicted image generation portion derives a target layer reference region position and a reference layer reference region position from reference region position information included in the reference region information, and derives at least one of a scale and a corresponding reference position used in the inter-layer prediction, by using the reference region position and the reference layer reference region position.

In the image decoding device, it is preferable that the reference region position information be reference region offset information, the target layer reference region position be a target layer reference region offset, and the reference layer reference region position be a reference layer target region offset.

In the image decoding device, the reference region position information preferably corresponds to a two-dimensional array variable in which first layer identification information and second layer identification information are used as indices. It is preferable that the first layer identification information be information for specifying a layer in which a reference region is provided, and the second layer identification information be information for specifying an inter-layer processing target layer. When the predicted image generation portion performs the inter-layer prediction between the target layer and a reference layer, the predicted image generation portion preferably sets the target layer reference region position by using the reference region position information in which the first layer identification information indicating the target layer, and the second layer identification information indicating the reference layer are used as indices, and preferably sets the reference layer reference region position by using the reference region position information in which the first layer identification information indicating the reference layer and the second layer identification information indicating the target layer are used as indices.

In the image decoding device, the first layer identification information is preferably information for directly or indirectly designating an index of a layer in which the reference region is provided in a VPS. The second layer identification information is preferably information for directly or indirectly designating an index of the inter-layer processing target layer in the VPS. When the predicted image generation portion performs the inter-layer prediction on the target layer in which a value of an index in the VPS is C, the predicted image generation portion preferably sets the target layer reference region position by using the reference region position information in which the first layer identification information indicating the index C in the VPS, and the second layer identification information indicating index R in the VPS, which is smaller than C are used as index, and preferably sets the reference layer reference region position by using the reference region position information in which the first layer identification information indicating the index R in the VPS, and the second layer identification information indicating the index C in the VPS are used as an index.

In the image decoding device, the reference region position information preferably corresponds to a two-dimensional array variable in which first layer identification information and second layer identification information are used as indices. It is preferable that the first layer identification information be information for specifying a layer in which a reference region is provided, and the second layer identification information be information for specifying an inter-layer processing target layer. When the predicted image generation portion performs the inter-layer prediction between the target layer and a reference layer, the predicted image generation portion preferably sets the target layer reference region position by using the reference region position information in which the first layer identification information indicating the target layer, and the second layer identification information indicating the reference layer are used as indices, and preferably sets the reference layer reference region position by using the reference region position information in which the first layer identification information indicating the target layer, and the second layer identification information indicating the target reference layer are used as indices.

In the image decoding device, it is preferable that the parameter set decoding unit decode reference region target selection information, derive first layer identification information and second layer identification information from the decoded reference region target selection information, associate a combination of the first layer identification information and the second layer identification information with the reference region position information, and record a result of the association. When the predicted image generation portion performs the inter-layer prediction between the target layer and a reference layer, the predicted image generation portion preferably sets the target layer reference region position by using the reference region position information which is recorded in association with combination of the first layer identification information indicating the target layer, and the second layer identification information indicating the reference layer, and preferably sets the reference layer reference region position by using the reference region position information which is recorded in association with the first layer identification information indicating the reference layer, and the second layer identification information indicating the target layer.

In the image decoding device, the parameter set decoding unit preferably decodes display region information of the target layer and the reference layer. When the predicted image generation portion performs the inter-layer prediction between the target layer and the reference layer, the predicted image generation portion preferably sets a display region position for indicating the display region information of the target layer, as the target layer reference region position, in a case where the reference region position information in which the first layer identification information indicating the target layer, and the second layer identification information indicating the reference layer are used as indices is not provided, and the predicted image generation portion preferably sets a display region for indicating the display region information of the reference layer, as the reference layer reference region position, in a case where the reference region position information in which the first layer identification information indicating the reference layer, and the second layer identification information indicating the target layer are used as indices is not provided.

In the image decoding device, the predicted image generation portion preferably derives the scale as a ratio between a reference region size indicating the target layer reference region position and a reference region size indicating the reference layer reference region position, or a value approximate to the ratio.

To solve the above problem, according to the present invention, there is provided an image coding device which generates coding data of a higher layer which is a target layer, from an input image. The image coding device includes a parameter set coding unit that codes a parameter set, and a predicted image generation portion that generates a predicted image by inter-layer prediction, with reference to a decoding pixel of a reference layer picture. The parameter set coding unit codes reference region information. The predicted image generation portion derives a target layer reference region position and a reference layer reference region position from reference region position information included in the reference region information, and derives at least one of a scale and a corresponding reference position which are used in the inter-layer prediction, by using the reference region position and the reference layer reference region position.

To solve the above problem, according to the present invention, there is provided a coding data transform device which transforms input hierarchy coding data based on input interest region information, and generates and outputs interest region hierarchy coding data. The coding data transform device includes a parameter set modification unit. The parameter set modification unit modifies reference region position information so as to cause target layer reference region positions which are derived from the hierarchy coding data before and after transform to be equal to each other, and to cause reference layer reference region positions which are derived from the hierarchy coding data before and after transform to be equal to each other.

To solve the above problem, according to the present invention, there is provided an image coding device which decodes coding data subjected to hierarchy coding, and restores a decoding picture of a higher layer which is a target layer. The image decoding device includes a parameter set decoding unit that decodes a parameter set, and a predicted image generation portion that generates a predicted image by inter-layer prediction, with reference to a decoding pixel of a reference layer picture. The parameter set decoding unit decodes inter-layer position corresponding information. The inter-layer position corresponding information includes scaled reference layer offset syntax, reference layer offset syntax, and inter-layer phase offset syntax which are associated with a reference layer. The parameter set decoding unit decodes a first reference layer identifier indicating a specific reference layer. The parameter set decoding unit continuously decodes the scaled reference layer offset syntax associated with the first reference layer identifier, the reference layer offset syntax associated with the first reference layer identifier, and the inter-layer phase offset syntax associated with the first reference layer identifier, from the coding data. The scaled reference layer offset syntax, the reference layer offset syntax, and the inter-layer coding data. In a case where the predicted image generation portion generates a predicted image in a case of using a predetermined reference layer, the predicted image generation portion derives at least one of a scale and a corresponding reference position used in the inter-layer prediction, by using the scaled reference layer offset syntax, the reference layer offset syntax, and the inter-layer phase offset syntax which are associated with the reference layer.

In the image decoding device, the inter-layer position corresponding information includes a reference layer offset information present flag which is associated with the specific reference layer. The predicted image generation portion decodes the reference layer offset syntax relating to a reference layer with which the reference layer offset is associated, in accordance with a value of the reference layer offset information present flag.

In the image decoding device, the inter-layer position corresponding information includes an inter-layer phase offset information present flag which is associated with the specific reference layer. The predicted image generation portion decodes the inter-layer phase offset syntax with which the reference layer offset is associated, in accordance with a value of the inter-layer phase offset information present flag.

In the image decoding device, the inter-layer position corresponding information includes a layer offset information present flag which is associated with the specific reference layer. The predicted image generation portion decodes the scaled reference layer offset syntax and the reference layer offset syntax with which the reference layer offset is associated, in accordance with a value of the layer offset information present flag.

Advantageous Effects of Invention

According to the present invention, an image decoding device (image coding device) includes a parameter set decoding unit that decodes a parameter set including reference region position information, and a predicted image generation portion that derives a scale or a corresponding reference position in inter-layer prediction, with reference to a target layer reference region position and a reference layer reference region position which are derived from reference region position information.

Thus, the image decoding device (image coding device) according to the present invention can realize maintaining of a corresponding reference position or a scale when partial data corresponding to an interest region is extracted, by decoding processing (coding processing) which is performed with the smaller processing quantity and a circuit of the smaller size than those in the related art.

BRIEF DESCRIPTION OF DRAWINGS

FIG. 2(a) illustrates the hierarchy video coding device side. FIG. 2(b) illustrates the hierarchy video decoding device side.

FIG. 3(a) illustrates a sequence layer for defining a sequence SEQ. FIG. 3(b) illustrates a picture layer for defining a picture PICT. FIG. 3(c) is a diagram illustrating a slice layer for defining a slice S. FIG. 3(d) is a diagram illustrating a CTU layer for defining a coding tree unit CTU. FIG. 3(e) is a diagram illustrating a CU layer for defining a coding unit (CU) which is included in the coding tree unit CTU.

FIG. 4 is a diagram illustrating a relation between a picture and a tile.slice in the hierarchy coding data according to the embodiment of the present invention. FIG. 4(a) illustrates a division region in a case where a picture is divided by the tile.slice. FIG. 4(b) illustrates a relation between a tile and a slice in the configuration of the coding data.

FIG. 9 illustrates a portion of a syntax table referring when VPS extension is decoded, and the portion is a portion relating to syntax which relates to reference region information.

FIG. 10 illustrates a portion of a syntax table referring when SPS extension is decoded, and the portion is a portion relating to syntax which relates to the reference region information.

FIG. 11 illustrates a portion of the syntax table referring when SPS extension is decoded, and the portion is another example of the portion relating to syntax which relates to the reference region information.

FIG. 12 illustrates a portion of the syntax table referring when SPS extension is decoded, and the portion is an example of a portion relating to a display region-using control flag.

FIG. 19(a) illustrates the transmission device having the hierarchy video coding device mounted therein. FIG. 19(b) illustrates the reception device having the hierarchy video decoding device mounted therein.

FIG. 20(a) illustrates the recording device having the hierarchy video coding device mounted therein. FIG. 20(b) illustrates the reproduction device having the hierarchy video decoding device mounted therein.

FIG. 21 is a diagram illustrating an example of a relation between a target layer picture, a target layer corresponding region, a reference layer picture, a reference layer target region, and an scaled reference layer offset.

FIG. 22 illustrates a portion of a syntax table referring when PPS extension is decoded, and the portion is a portion relating to syntax which relates to inter-layer position corresponding information.

FIG. 23 illustrates another example of the portion of the syntax table referring when PPS extension is decoded, and the portion is a portion relating to the syntax which relates to the inter-layer position corresponding information.

FIG. 24 illustrates still another example of the portion of the syntax table referring when PPS extension is decoded, and the portion is a portion relating to the syntax which relates to the inter-layer position corresponding information.

DESCRIPTION OF EMBODIMENTS

A hierarchy video decoding device 1, a hierarchy video coding device 2, and a coding data transform device 3 according to an embodiment of the present invention will be described as follows, with reference to FIGS. 1 to 20.

[Outline]

The hierarchy video decoding device (image decoding device) 1 according to the embodiment decodes coding data which has been obtained by hierarchy coding of the hierarchy video coding device (image coding device) 2. The hierarchy coding means a coding method in which a video is hierarchically coded from a video having low quality to a video having high quality. The hierarchy coding is standardized in, for example, SVC or SHVC. The quality of a video referred here broadly means an element of subjectively and objectively having an influence on a visual aspect of a video. As the quality of a video, for example, "resolution", "frame rate", "image quality", and "expression precision of a pixel" are included. Thus, in the following descriptions, a statement that quality of video is different indicates that, for example, "resolution" and the like are different. However, it is not limited thereto. For example, in a case of videos quantized by different quantizing steps (that is, in a case of videos coded by different coding noises), it may be stated that quality of the videos is different from each other.

The hierarchy coding technology is classified into (1) spatial scalability, (2) temporal scalability, (3) SNR (Signal to Noise Ratio) scalability, and (4) view scalability. The spatial scalability is a technology of performing hierarchy in resolution or a size of an image. The temporal scalability is a technology of performing hierarchy in a frame rate (number of frames during a unit time). The SNR scalability is a technology of performing hierarchy in a coding noise. The view scalability is a technology of performing hierarchy in a position of a viewpoint correlated with each image.

The coding data transform device 3 according to the embodiment transforms coding data which has been hierarchically coded by the hierarchy video coding device 2, and generates coding data (interest region coding data) relating to a predetermined interest region. The interest region coding data can be decoded by the hierarchy video decoding device 1 according to the embodiment.

Before the hierarchy video coding device 2, the hierarchy video decoding device 1, and the hierarchy coding data transform device 3 according to the embodiment are described in detail, firstly, (1) a layer structure of hierarchy coding data which is generated by the hierarchy video coding device 2 or the hierarchy coding data transform device 3, and is decoded by the hierarchy video decoding device 1 will be described. Then, (2) a specific example of a data structure which may be employed in each layer will be described.

[Layer Structure of Hierarchy Coding Data]

Figure 2:
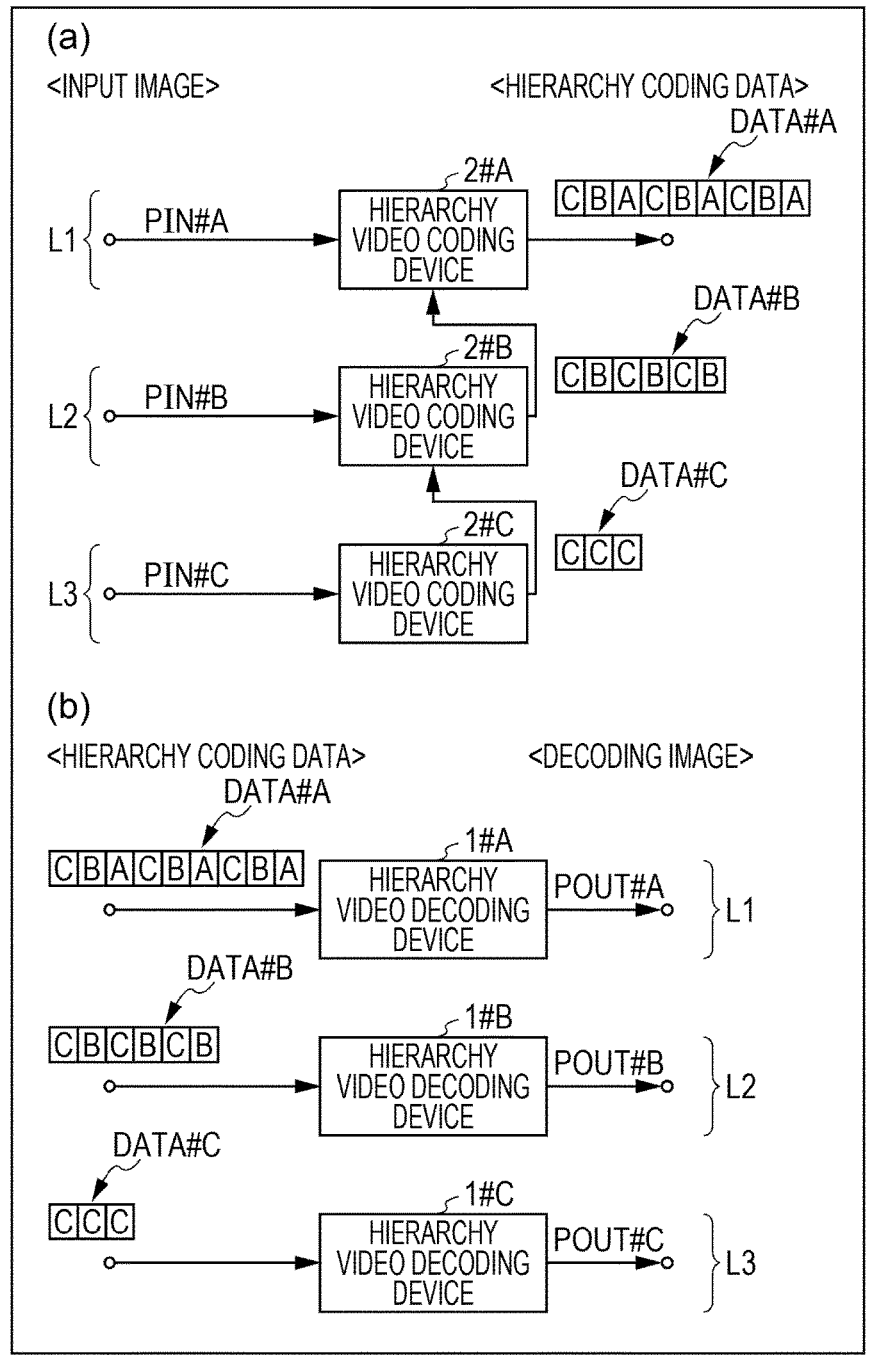
FIG. 2 is a diagram illustrating a layer structure of hierarchy coding data according to the embodiment of the present invention.

Here, coding and decoding of hierarchy coding data will be described as follows, by using FIG. 2. FIG. 2 is a schematic diagram illustrating a case where a video is hierarchically coded/decoded by three level layers of a lower layer L3, a middle layer L2, and a higher layer L1. That is, in the example illustrated in FIGS. 2(a) and 2(b), among the three level layers, the higher layer L1 is the top layer, and the lower layer L3 is the bottom layer.

In the following descriptions, a decoding image which corresponds to specific quality and may be decoded from hierarchy coding data is referred to as a decoding image having a specific level (or a decoding image corresponding to the specific level) (for example, decoding image POUT#A of a higher layer L1).

FIG. 2(a) illustrates hierarchy video coding devices 2#A to 2#C that respectively and hierarchically code input images PIN#A to PIN#C, and generate pieces of coding data DATA#A to DATA#C. FIG. 2(b) illustrates hierarchy video decoding devices 1#A to 1#C that respectively decode pieces of coding data DATA#A to DATA#C which have been hierarchically coded, and generate decoding images POUT#A to POUT#C.

Firstly, the coding device side will be described with reference to FIG. 2(a). Regarding input images PIN#A, PIN#B, and PIN#C which function as inputs of the coding device side, original images are the same as each other, but quality (resolution, frame rate, image quality, and the like) of the images is different from each other. The quality of the images is reduced in an order of the input images PIN#A, PIN#B, and PIN#C.

The hierarchy video coding device 2#C for the lower layer L3 codes the input image PIN#C of the lower layer L3, and generates the coding data DATA#C of the lower layer L3. Base information required for decoding the decoding image POUT#C of the lower layer L3 is included (indicated by "C" in FIG. 2). Since the lower layer L3 is the bottom layer, the coding data DATA#C of the lower layer L3 is also referred to as base coding data.

The hierarchy video coding device 2#B for the middle layer L2 codes the input image PIN#B of the middle layer L2 with reference to the coding data DATA#C of the lower layer, and generates the coding data DATA#B of the middle layer L2. In addition to the base information "C" which is included in the coding data DATA#C, additional information (indicated by "B" in FIG. 2) required for decoding the decoding image POUT#B of the middle layer is included in the coding data DATA#B of the middle layer L2.

The hierarchy video coding device 2#A for the higher layer L1 codes the input image PIN#A of the higher layer L1 with reference to the coding data DATA#B of the middle layer L2, and generates the coding data DATA#A of the higher layer L1. In addition to the base information "C" required for decoding the decoding image POUT#C of the lower layer L3, and to the additional information "B" required for decoding the decoding image POUT#B of the middle layer L2, additional information (indicated by "A" in FIG. 2) required for decoding the decoding image POUT#A of the higher layer is included in the coding data DATA#A of the higher layer L1 higher layer L1.

As described above, the coding data DATA#A of the higher layer L1 includes information regarding a plurality of decoding images which have different quality.

Next, the decoding device side will be described with reference to FIG. 2(b). In the decoding device side, the decoding devices 1#A, 1#B, and 1#C decode pieces of coding data DATA#A, DATA#B, and DATA#C in accordance with each of the level layers (higher layer L1, middle layer L2, and lower layer L3), and outputs the decoding images POUT#A, POUT#B, and POUT#C.

Information of a portion of higher hierarchy coding data is extracted. In the lower specific decoding device, the extracted information is decoded, and thus a video having specific quality can be reproduced.

For example, the hierarchy decoding device 1#B for the middle layer L2 may extract information (that is, "B" and "C" included in the hierarchy coding data DATA#A) required for decoding the decoding image POUT#B, from the hierarchy coding data DATA#A of the higher layer L1, and may decode the decoding image POUT#B. In other words, in the decoding device side, the decoding images POUT#A, POUT#B, and POUT#C can be decoded based on information which is included in the hierarchy coding data DATA#A of the higher layer L1.

The hierarchy coding data is not limited to the above hierarchy coding data of the three levels. The hierarchy coding data may be subjected to hierarchy coding at two levels, and may be subjected to hierarchy coding at levels of which the number is more than 3.

The hierarchy coding data may be configured such that a portion or the entirety of coding data relating to a decoding image of a specific level may be coded so as to be separated from other level, and decoding is completed without referring to information of the other level when the specific level layer is decoded. For example, in the example which has been described with reference to FIGS. 2(a) and 2(b), a case where the decoding image POUT#B is decoded with reference to "C" and "B" is described. However, it is not limited thereto. The hierarchy coding data may be configured so as to enable decoding of the decoding image POUT#B only by using "B". For example, a hierarchy video decoding device in which hierarchy coding data configured only by "B" and the decoding image POUT#C are used as an input can be configured in order to decode the decoding image POUT#B.

In a case where SNR scalability is realized, hierarchy coding data having image quality in which decoding images POUT#A, POUT#B, and POUT#C are different from each other in a state where the same original image is used for input images PIN#A, PIN#B, and PIN#C can be generated. In this case, a hierarchy video coding device of the lower layer performs quantization of a prediction residual by using a quantization width which is wider than that in a hierarchy video coding device of the higher layer, and thus the hierarchy video coding device of the lower layer generates hierarchy coding data.

In this specification, for simple descriptions, terms as follows are defined. The following terms are used for presenting the following technical items, as long as there is no particular statement.

Higher layer: A layer positioned higher than a certain layer is referred to as a higher layer. For example, in FIG. 2, a higher layer of the lower layer L3 is the middle layer L2 and the higher layer L1. A decoding image of the higher layer means a decoding image having higher quality (for example, resolution is high, a frame rate is high, and image quality is high).

Lower layer: A layer positioned lower than a certain layer is referred to as a lower layer. For example, in FIG. 2, a lower layer of the higher layer L1 is the middle layer L2 and the lower layer L3. A decoding image of the lower layer means a decoding image having lower quality.

Target layer: A target layer means a layer set as a target of decoding or coding. A decoding image corresponding to the target layer is referred to as a target layer picture. Pixels constituting the target layer picture are referred to as target layer pixels.

Reference layer: A specific lower layer used as a reference when a decoding image corresponding to a target layer is decoded is referred to as a reference layer. A decoding image corresponding to the reference layer is referred to as a reference layer picture. Pixels constituting the reference layer are referred to as reference layer pixels.

In the example illustrated in FIGS. 2(a) and 2(b), a reference layer of the higher layer L1 is the middle layer L2 and the lower layer L3. However, it is not limited thereto, and hierarchy coding data can be configured so as to allow decoding of a specific layer without referring to all lower layers. For example, hierarchy coding data may be configured so as to cause either of the middle layer L2 and the lower layer L3 to be set as the reference layer of the higher layer L1.

Base layer: A layer positioned at the bottom layer is referred to as a base layer. A decoding image of the base layer is a decoding image having the lowest quality, among images which may be decoded from coding data. The decoding image of the base layer is referred to as a base decoding image. In other words, the base decoding image is a decoding image corresponding to the level of the bottom layer. Partial coding data of hierarchy coding data required for decoding the base decoding image is referred to as base coding data. For example, the base information "C" included in the hierarchy coding data DATA#A of the higher layer L1 is the base coding data.

Enhanced layer: A higher layer of a base layer is referred to as an enhanced layer.

Layer identifier: A layer identifier is used for identifying a level. The layer identifier has one-to-one correspondence with the layer. A level identifier used for selecting partial coding data is included in hierarchy coding data. The partial coding data is required for decoding a decoding image of a specific level. A subset of hierarchy coding data associated with a layer identifier which corresponds to a specific layer is also referred to as a layer expression.

Generally, a layer expression of a level layer and/or a layer expression corresponding to a lower layer of the level layer are used when a decoding image of a specific level layer is decoded. That is, a layer expression of a target layer and/or a layer expression of one or more level layers which are included in a lower layer of the target layer are used when a decoding image of a target layer is decoded.

Inter-layer prediction: Inter-layer prediction means that a syntax element value of a target layer, or a coding parameter and the like used in decoding of the target layer is predicted. The prediction is performed based on a syntax element value included in a layer expression of a level layer (reference layer), which is different from the layer expression of the target layer, a value derived by the syntax element value, and a decoding image. Inter-layer prediction in which information regarding motion prediction is predicted from information of a reference layer may be referred to as motion information prediction. Inter-layer prediction in which prediction is performed from a decoding image of a lower layer may be referred to as inter-layer image prediction (or inter-layer texture prediction). A level layer used in the inter-layer prediction is a lower layer of a target layer, for example. Prediction which is performed in a target layer without using a reference layer may be referred to as intra-layer prediction.

The above-described terms are used just for simple descriptions, and the above-described technical items may be expressed by other terms.

[Regarding Data Structure of Hierarchy Coding Data]

A case of using HEVC and an enhanced method thereof is exemplified below as a coding method of generating coding data of each level layer. However, it is not limited thereto, and the coding data of each level layer may be generated by a coding method such as MPEG-2 and H.264/AVC.

The lower layer and the higher layer may be coded by different coding methods. The coding data of each level layer may be supplied to the hierarchy video decoding device 1 through different channels, and may be supplied to the hierarchy video decoding device 1 through the same channel.

For example, in a case where a ultra-high definition video (video, 4K video data) is subjected to scalable coding by using a base layer and one enhanced layer, and is transmitted, regarding the base layer, 4K video data may be subjected to down scaling, and interlaced video data may be coded by MPEG-2 or H.264/AVC, and may be transmitted on a television broadcasting network. Regarding the enhanced layer, a 4K video (progressive) may be coded by HEVC, and may be transmitted on the Internet.

(Base Layer)

Figure 3:
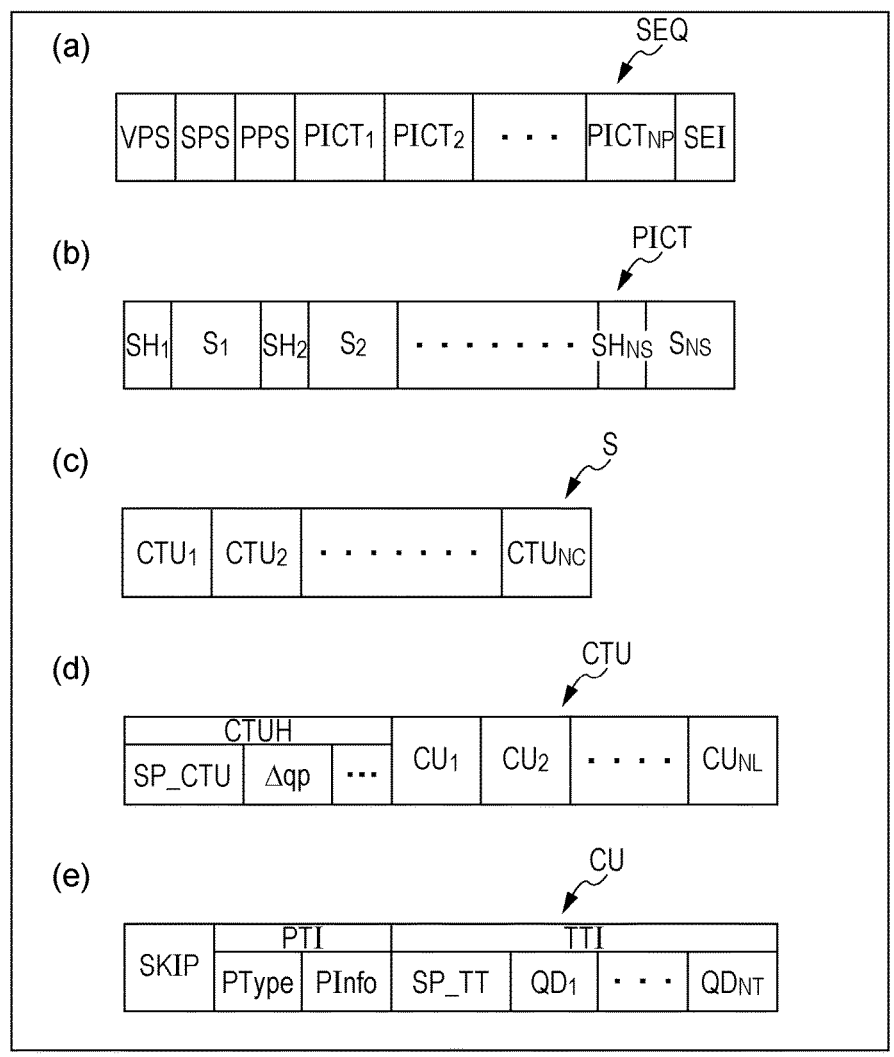
FIG. 3 is a diagram illustrating a configuration of the hierarchy coding data according to the embodiment of the present invention.

FIG. 3 is a diagram illustrating an example of a data structure of coding data (in the example of FIG. 2, hierarchy coding data DATA#C) which can be employed in a base layer. For example, the hierarchy coding data DATA#C includes a sequence and a plurality of pictures constituting the sequence.

FIG. 3 illustrates hierarchy structure of data in the hierarchy coding data DATA#C. FIG. 3(a) is a diagram illustrating a sequence layer for defining a sequence SEQ. FIG. 3(b) is a diagram illustrating a picture layer for defining a picture PICT. FIG. 3(c) is a diagram illustrating a slice layer for defining a slice S. FIG. 3(d) is a diagram illustrating a CTU layer for defining a coding tree unit (CTU). FIG. 3(e) is a diagram illustrating a CU layer for defining a coding unit (CU) which is included in the coding tree unit CTU.

(Sequence Layer)

A set of pieces of data to which the hierarchy video decoding device 1 refers in order to decoding a sequence SEQ (below also referred to as a target sequence) set as a processing target is defined in a sequence layer. As illustrated in FIG. 3(a), the sequence SEQ includes a video parameter set VPS, a sequence parameter set SPS, a picture parameter set PPS, pictures PICT1 to PICTNP (NP is the total number of pictures included in the sequence SEQ), and supplemental enhancement information SEI.

The number of layers included in coding data, and a dependency relation between layers are defined in a video parameter set VPS.

A set of coding parameter to which the hierarchy video decoding device 1 refers in order to decode a target sequence is defined in the sequence parameter set SPS. A plurality of SPSs may be provided in coding data. In this case, an SPS used in decoding for each target sequence is selected from a plurality of candidates. An SPS used for decoding a specific sequence may be referred to as an active SPS. As long as a particular statement is not made in the following descriptions, the SPS means an active SPS for a target sequence.

A set of coding parameter to which the hierarchy video decoding device 1 refers in order to decode each picture in a target sequence is defined in the picture parameter set PPS. A plurality of PPSs may be provided in coding data. In this case, any of a plurality of PPSs is selected from each picture in the target sequence. A PPS used for decoding a specific picture may be referred to as an active PPS. As long as a particular statement is not made in the following descriptions, the PPS means an active PPS for a target picture. The active SPS may be set as a different SPS for each layer, and the active PPS may be set as a different PPS for each layer.

(Picture Layer)

A set of pieces of data to which the hierarchy video decoding device 1 refers in order to decode a picture PICT (below also referred to as a target picture) set as a processing target is defined in a picture layer. As illustrated in FIG. 3(b), the picture PICT includes slice headers SH1 to SHNS, and slices S1 to SNS (NS is the total number of slices included in the picture PICT).

In a case where the slice headers SH1 to SHNS or the slices S1 to SNS are not required for being distinguished from each other, the suffix of the signs may be omitted and descriptions will be made below. Regarding another piece of data which is data included in hierarchy coding data DATA#C (which will be described below) and has an attached suffix, descriptions will be similarly made.

A coding parameter group to which the hierarchy video decoding device 1 refers in order to determine a decoding method of the corresponding slice Sk is included in the slice header SHk. For example, an SPS identifier (seq_parameter_set_id) for designating an SPS, or a PPS identifier (pic_parameter_set_id) for designating a PPS is included. Slice type designation information (slice_type) for designating a slice type is an example of a coding parameter included in the slice header SH.

As the slice type which may be designated by the slice type designation information, (1) an I slice only using intra-prediction when coding is performed, (2) a P slice using uni-directional prediction or intra-prediction when coding is performed, (3) a B slice using uni-directional prediction, bi-directional prediction, or intra-prediction, and the like are exemplified.

(Slice Layer)

A set of pieces of data to which the hierarchy video decoding device 1 refers in order to decode a slice S (also referred to as a target slice) as a processing target is defined in a slice layer. As illustrated in FIG. 3(c), the slice S includes coding tree units CTU1 to CTUNC (NC is the total number of CTUs included in the slice S).

(CTU Layer)

A set of pieces of data to which the hierarchy video decoding device 1 refers in order to decode a coding tree unit CTU (also referred below as a target CTU) as a processing target is defined in a CTU layer. A coding tree unit may be also referred to as a coding tree block (CTB) or as a largest cording unit (LCU).

The coding tree unit CTU includes a CTU header CTUH and pieces of coding unit information CU1 to CUNL (NL is the total number of pieces of coding unit information included in a CTU). Here, firstly, a relation between a coding tree unit CTU and coding unit information CU will be described as follows.

The coding tree unit CTU is split by a unit for specifying a block size for intra-prediction or inter-prediction, and processing of transform.

The unit of the coding tree unit CTU is split by recursive quadtree subdivision. A tree structure obtained by the recursive quadtree subdivision is referred below as a coding tree.

A unit corresponding to a leaf which is a node at a termination of a coding tree is referred to as a coding node.

Since a coding node functions as a basic unit in coding processing, the coding node is also referred to a coding unit (CU) below.

That is, pieces of coding unit information (below referred to as CU information) CU1 to CUNL are information corresponding to each coding node (coding unit) obtained by recursively splitting a coding tree unit CTU into quad-trees.

A root of a coding tree is correlated with a coding tree unit CTU. In other words, the coding tree unit CTU is correlated with the top node of a tree structure of quadtree subdivision, which recursively includes a plurality of coding nodes.

The size of each coding node is half of the size of a coding node (that is, a node higher than the coding node by 1) which functions as a parent node of the coding node, in length and breadth.

The size of a coding tree unit CTU or the allowable size of each coding unit depends on size designation information of the smallest coding node and a difference in level depth between the largest coding node and the smallest coding node. The size designation information of the smallest coding node and a difference in level depth between the largest coding node and the smallest coding node are included in a sequence parameter set SPS. For example, in a case where the size of the smallest coding node is 8×8 pixels, and a difference in level depth between the largest coding node and the smallest coding node is 3, the size of the coding tree unit CTU is 64×64 pixels. As the size of the coding node, any of four types of sizes, that is, 64×64 pixels, 32×32 pixels, 16×16 pixels, and 8×8 pixels may be obtained.

(CTU Header)

A CTU header CTUH includes a coding parameter to which the hierarchy video decoding device 1 refers in order to determine a decoding method of a target CTU. Specifically, as illustrated in FIG. 3(d), the CTU header CTUH includes CTU split information SP_CTU for designating a split pattern of a target CTU into CUs, and a quantization parameter difference Δqp (qp_delta) for designating the size in a quantization step.

The CTU split information SP_CTU is information indicating a coding tree for splitting a CTU. Specifically, the CTU split information is information for designating the shape and the size of each CU included in a target CTU, and for designating a position in the target CTU.

The CTU split information SP_CTU may not explicitly include the shape or the size of a CU. For example, the CTU split information SP_CTU may be a set of flags indicating whether or not the entirety of a target CTU or a partial region of the CTU is split into four pieces. In this case, the shape and the size of a CTU are used together, and thus the shape or the size of each CU can be specified.

(CU Layer)

A set of pieces of data to which the hierarchy video decoding device 1 refers in order to decode a CU (also below referred to as a target CU) as a processing target is defined in a CU layer.

Here, before specific details of data included in CU information CU will be described, a tree structure of data included in a CU will be described. The coding node functions as a node of a root of a prediction tree (PT) and a transform tree (TT). The prediction tree and the transform tree will be described as follows.

A coding node is split into one or a plurality of prediction blocks, and a position and the size of each of the split prediction blocks are defined in the prediction tree. In other words, the prediction block corresponds to one or a plurality of regions which constitute a coding node and do not overlap each other. The prediction tree includes one or a plurality of prediction blocks which are obtained by the above-described splitting.

Prediction processing is performed for each of the prediction blocks. The prediction block which is a unit of prediction is also referred to as a prediction unit (PU) below.

As the type of the splitting (below abbreviated as PU splitting) in a prediction tree, two cases of a case of the intra-prediction and a case of the inter-prediction are roughly provided.

In a case of the intra-prediction, as a splitting method, 2N×2N (the same size as that of a coding node) and N×N are provided. In a case of the inter-prediction, as a splitting method, 2N×2N (the same size as that of a coding node), 2N×N, 2N×nU, 2N×nD, N×2N, nL×2N, nR×2N, and the like are provided.

A coding node is split into one or a plurality of transform blocks, and a position and the size of each of the split transform blocks are defined in the transform tree. In other words, the transform block corresponds to one or a plurality of regions which constitute a coding node and do not overlap each other. The transform tree includes one or a plurality of transform blocks which are obtained by the above-described splitting.

As the type of the splitting in a transform tree, a case where a region having the same size as that of a coding node is assigned as the transform block, and a case of using recursive quad-tree subdivision, which is similar to the above-described splitting of the tree block are provided.

Transform processing is performed for each of the transform blocks. The transform block which is a unit of transform is also referred to as a transform unit (TU) below.

(Data Structure of CU Information)

Specific details of data included in CU information CU will be described with reference to FIG. 3(e). As illustrated in FIG. 3(e), the CU information CU specifically includes a skip flag SKIP, prediction tree information (below abbreviated as PT information) PTI, and transform tree information (below abbreviated as TT information) TTI.

The skip flag SKIP is a flag indicating a skip mode is applied to a target PU. In a case where a value of the skip flag SKIP is 1, that is, in a case where the skip mode is applied to a target CU, a portion of PT information PTI and TT information TTI in CU information CU thereof are omitted. The skip flag SKIP is not provided in an I slice.

[PT Information]

The PT information PTI is information regarding a prediction tree (below abbreviated as a PT) which is included in a CU. In other words, the PT information PTI is a set of pieces of information regarding each of one or a plurality of PUs included in a PT. The PT information PTI is used as a reference when the hierarchy video decoding device 1 generates a predicted image. As illustrated in FIG. 3(e), the PT information PTI includes prediction type information PType and prediction information PInfo.

The prediction type information PType is information for designating a predicted image generation method for a target PU. In a base layer, the prediction type information PType is information for designating whether intra-prediction is used or inter-prediction is used.

The prediction information PInfo is prediction information used in a prediction method which is designated by the prediction type information PType. In a base layer, intra-prediction information PP_Intra is included in the prediction information PInfo in a case of the intra-prediction. In a case of the inter-prediction, the prediction information PInfo includes inter-prediction information PP_Inter.

The inter-prediction information PP_Inter includes prediction information referring when the hierarchy video decoding device 1 generates an inter-predicted image by the inter-prediction. More specifically, the inter-prediction information PP_Inter includes inter-PU split information and an inter-prediction parameter (motion compensation parameter) for each inter-PU. The inter-PU split information is used for designating a split pattern of a target CU into inter-PUs. Examples of the inter-prediction parameter include a merging flag (merge_flag), a merging index (merge_idx), an estimation motion vector index (mvp_idx), a reference picture index (ref_idx), an inter-prediction flag (inter_pred_flag), and a motion vector residual (mvd).

The intra-prediction information PP_Intra includes a coding parameter referring when the hierarchy video decoding device 1 generates an intra-predicted image by the intra-prediction. More specifically, the intra-prediction information PP_Intra includes intra-PU split information and an intra-prediction parameter for each intra-PU. The intra-PU split information is used for designating a split pattern of a target CU into intra-PUs. The intra-prediction parameter is a parameter for designating an intra-prediction method (prediction mode) for each intra-PU.

[TT Information]

The TT information TTI is information regarding a transform tree (below abbreviated as a TT) which is included in a CU. In other words, the TT information TTI is a set of pieces of information regarding each of one or a plurality of transform blocks included in a TT. The TT information TTI is used as a reference when the hierarchy video decoding device 1 decodes residual data.

As illustrated in FIG. 3(e), the TT information TTI includes TT split information SP_TT and quantization prediction residuals QD1 to QDNT (NT is the total number of blocks included in a target CU). The TT split information SP_TT is used for designating a split pattern of a target CU into transform blocks.

Specifically, the TT split information SP_TT is information for determining the shape of each of transform blocks included in a target CU, and a position of each of the transform blocks in the target CU. For example, the TT split information SP_TT can be realized by information (split_transform_unit_flag) and information (trafoDepth). The information (split_transform_unit_flag) indicates whether or not a target node is split. The information (trafoDepth) indicates a depth of the split.

For example, in a case where a CU size is 64×64, each of transform blocks obtained by splitting may obtain a size of 32×32 pixel to 4×4 pixel.

Each of the quantization prediction residuals QD is coding data generated in such a manner that the hierarchy video coding device 2 performs the following processing 1 to 3 on a target block which is a transform block set as a processing target.

Processing 1: Frequency transform (for example, discrete cosine transform (DCT transform), discrete sine transform (DST transform), and the like) is performed on a prediction residual obtained by subtracting a predicted image from a coding target image;

Processing 2: A transform coefficient obtained by Processing 1 is quantized;

Processing 3: A transform coefficient quantized by Processing 2 is subjected to variable length coding;

The above-described quantization parameter qp indicates the size of a quantization step QP used when the hierarchy video coding device 2 quantizes the transform coefficient ($QP=2^{qp/6}$).

(PU Split Information)

As a PU split type designated by PU split information, the following 8 types of patterns are provided if the size of a target CU is set to be 2N×2N pixels. That is, 4 symmetric splittings of 2N×2N pixels, 2N×N pixels, N×2N pixels, and N×N pixels, and 4 asymmetric splittings of 2N×nU pixels, 2N×nD pixels, nL×2N pixels, and nR×2N pixels are provided. N=2m (m is an integer of 1 or more) is set. In the following descriptions, a prediction unit obtained by splitting a target CU is referred to as a prediction block or a partition.

(Enhanced Layer)

Regarding coding data (below, enhanced layer coding data) included in a layer expression of an enhanced layer, for example, a data structure which is substantially the same as the data structure illustrated in FIG. 3 can be employed. In the enhanced layer coding data, supplemental information can be added, or a parameter can be omitted as will be described below.

In a slice layer, pieces of identification information (respectively, dependency_id, temporal_id, quality_id, and view_id) for a level of spatial scalability, temporal scalability, SNR scalability, and view scalability may be coded.

The prediction type information PType included in the CU information CU is information for designating whether a predicted image generation method for a target CU is any of the intra-prediction, the inter-prediction, and the inter-layer image prediction. The prediction type information PType includes a flag (inter-layer image prediction flag) for designating whether or not an inter-layer image prediction mode is applied. The inter-layer image prediction flag may be referred to as texture_rl_flag, inter_layer_pred_flag, or base_mode_flag.

In an enhanced layer, it may be designated whether a CU type of a target CU is any of an intra-CU, an inter-layer CU, an inter-CU, and a skip CU.

The intra-CU can be defined similar to the intra-CU in a base layer. In the intra-CU, the inter-layer image prediction flag is set to be "0", and a prediction mode flag is set to be "0".

The inter-layer CU can be defined as a CU used when a decoding image of a picture of a reference layer is used for generating a predicted image. In the inter-layer CU, the inter-layer image prediction flag is set to be "1", and a prediction mode flag is set to be "0".

The skip CU can be defined similar to the above-described case of the HEVC method. For example, in the skip CU, "1" is set in the skip flag.

The inter-CU may be defined as a CU to which non-skip and motion compensation (MC) is applied. In the inter-CU, for example, "0" is set in the skip flag, and "1" is set in the prediction mode flag.

As described above, coding data of an enhanced layer may be generated by a coding method which is different from a coding method of a lower layer. That is, coding.decoding processing for an enhanced layer does not depend on the type of coding of the lower layer.

The lower layer may be coded by MPEG-2 or the H.264/AVC method, for example.

The enhanced layer coding data may include a parameter which is obtained by enhancing a VPS and indicates a reference structure between layers.

The enhanced layer coding data may include information (for example, an inter-layer reference picture set (which will be described later), an inter-layer reference picture list, and syntax for directly or indirectly deriving base control information and the like) regarding a decoding image of a reference layer which is used in the inter-layer image prediction. In the information, an extended SPS, an extended PPS, and an extended slice header are provided.

The above-described parameter may be independently coded, or a plurality of parameters may be complexly coded. In a case where a plurality of parameters may be complexly coded, an index is assigned to a combination of values of the parameters, and the assigned index is coded. If the parameter can be derived from other parameters or decoded information, coding of the parameter can be omitted.

[Relation between Picture, Tile, and Slice]

Next, a relation between a picture, a tile, and a slice, and a relation with coding data will be described with reference to FIG. 4. FIG. 4 is a diagram illustrating a relation between a picture and a tile.slice in hierarchy coding data. A tile is correlated with a rectangular partial region in a picture, and coding data relating to the partial region. A slice is correlated with a partial region in a picture, and coding data relating to the partial region, that is, a slice header and slice data which relate to the partial region.

FIG. 4(a) illustrates an example of a division region in a case where a picture is divided by a tile.slice. In FIG. 4(a), a picture is divided into 6 rectangular tiles (T00, T01, T02, T10, T11, and T12). Each of the tile T00, the tile T02, the tile T10, and the tile T12 includes one slice (slice S00, slice S02, slice S10, and slice S12 in this order). The tile T01 includes two slices (slice S01a and slice S01b), and the tile T11 includes two slices (slice S11a and slice S11b).

FIG. 4(b) illustrates an example of a relation between the tile and the slice in a configuration of coding data. Firstly, coding data is configured from a plurality of VCL (video coding layer) NAL units and a plurality of non-VCL NAL units. Coding data of a video coding layer corresponding to one picture is configured from a plurality of VCL NALs. In a case where a picture is divided into tiles, coding data corresponding to the picture includes pieces of coding data corresponding to tiles in a raster order of the tiles. That is, in a case where a picture is divided into tiles as illustrated in FIG. 4(a), coding data corresponding to the picture includes pieces of coding data corresponding to the tiles in an order of the tiles T00, T01, T02, T10, T11, and T12. In a case where the tile is divided into a plurality of slices, coding data corresponding to the slice is included in coding data corresponding to the slice, in an order from a slice in which the leading CTU of the slice is positioned ahead in a CTU raster scanning order in a tile. For example, in a case where the tile T01 includes the slice S01a and the S01b as illustrated in FIG. 4(a), coding data corresponding to a slice in an order of the slice S01a and the slice S01b is sequentially included in coding data corresponding to the tile T01.

As understood from the above descriptions, coding data corresponding to one or more slice is associated with coding data corresponding to a specific tile in a picture. Thus, if a decoding image of a slice associated with a tile can be generated, a decoding image of a partial region in a picture, which corresponds to the tile can be generated.

If particular additional descriptions are not provided, descriptions will be made below on the assumption of such a relation between (picture, tile, and slice) and coding data.

[Hierarchy Video Decoding Device]

A configuration of the hierarchy video decoding device 1 according to the embodiment will be described below with reference to FIGS. 1 to 13.

(Configuration of Hierarchy Video Decoding Device)

Figure 5:
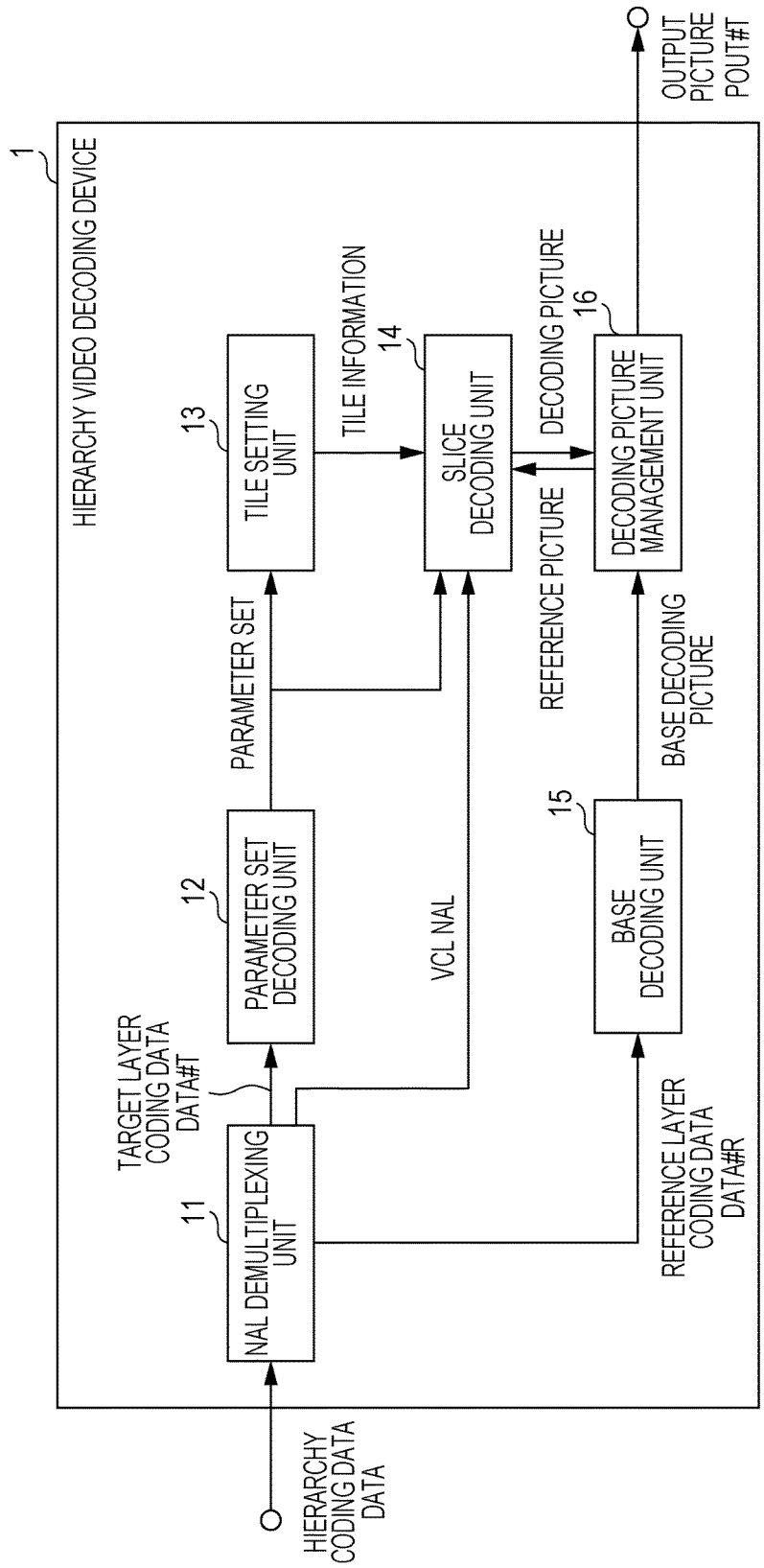
FIG. 5 is a functional block diagram illustrating a schematic configuration of the hierarchy video decoding device.

The schematic configuration of the hierarchy video decoding device 1 will be described with reference to FIG. 5. FIG. 5 is a functional block diagram illustrating the schematic configuration of the hierarchy video decoding device 1. The hierarchy video decoding device 1 decodes hierarchy coding data DATA (hierarchy coding data DATAF provided from the hierarchy video coding device 2, or hierarchy coding data DATAR provided from the coding data transform device 3), and generates a decoding image POUT#T of a target layer. In the following descriptions, descriptions will be made on the assumption that the target layer is an enhanced layer in which a base layer is used as a reference layer. Thus, the target layer is also a higher layer of the reference layer. Conversely, the reference layer is also a lower layer of the target layer.

As illustrated in FIG. 5, the hierarchy video decoding device 1 includes a NAL demultiplexing unit 11, a parameter set decoding unit 12, a tile setting unit 13, a slice decoding unit 14, a base decoding unit 15, and a decoding picture management unit 16.

The NAL demultiplexing unit 11 performs demultiplexing of the hierarchy coding data DATA which is transmitted in a unit of a NAL unit in a network abstraction layer (NAL).

The NAL is a layer provided for abstracting communication between a video coding layer (VCL) and a lower system. In the lower system, coding data is transmitted and accumulated.

The VCL is a layer in which image coding processing is performed. In the VCL, coding is performed. The lower system referred herein corresponds to a file format of H.264/AVC and HEVC or an MPEG-2 system.

A bitstream generated in the VCL is divided in a unit which is referred to as a NAL unit, in the NAL, and is transmitted to a lower system set as a destination. The NAL unit includes coding data which has been coded in a VCL, and a header for appropriately sending the coding data to a lower system as a destination. Coding data at each level is subjected to NAL multiplexing by being stored in a NAL unit, and is transmitted to the hierarchy video decoding device 1.

The hierarchy coding data DATA includes a NAL which includes a parameter set (VPS, SPS, PPS), SEI, or the like, in addition to a NAL generated by a VCL. The NALs may be referred to as a non-VCL NAL unit against a VCL NAL.

The NAL demultiplexing unit 11 performs demultiplexing of the hierarchy coding data DATA, and thus extracts target layer coding data DATA#T and reference layer coding data DATA#S. The NAL demultiplexing unit 11 supplies a non-VCL NAL to the parameter set decoding unit 12, and supplies a VCL NAL to the slice decoding unit 14, among NALs included in the target layer coding data DATA#T.

The parameter set decoding unit 12 decodes parameter sets, that is, a VPS, an SPS, and a PPS from the input non-VCL NAL, and supplies the decoded parameter sets to the tile setting unit 13 and the slice decoding unit 14. Processing which has high relevancy with the present invention, in the parameter set decoding unit 12 will be described later in detail.

The tile setting unit 13 derives tile information of a picture based on the input parameter set, and supplies the derived tile information to the slice decoding unit 14. The tile information includes at least tile split information of the picture.

The slice decoding unit 14 generates a decoding picture or a partial region of the decoding picture, based on the VCL NAL, the parameter set, and the tile information which have been input, and a reference picture. The slice decoding unit 14 records the decoding picture or the partial region of the decoding picture which has been generated, in a buffer of the decoding picture management unit 16. The slice decoding unit will be described in detail later.

The decoding picture management unit 16 records the input decoding picture or a base decoding picture in an internal decoded picture buffer (DPB), and performs reference picture list generation or output picture determination. The decoding picture management unit 16 outputs the decoding picture recorded in the DPB, as an output picture POUT#T, to the outside thereof at a predetermined timing.

The base decoding unit 15 decodes the base decoding picture from reference layer coding data DATA#R. The base decoding picture is a decoding picture of the reference layer, which is used when the decoding picture of the target layer is decoded. The base decoding unit 15 records the decoded base decoding picture in the DPB of the decoding picture management unit 16.

Figure 6:
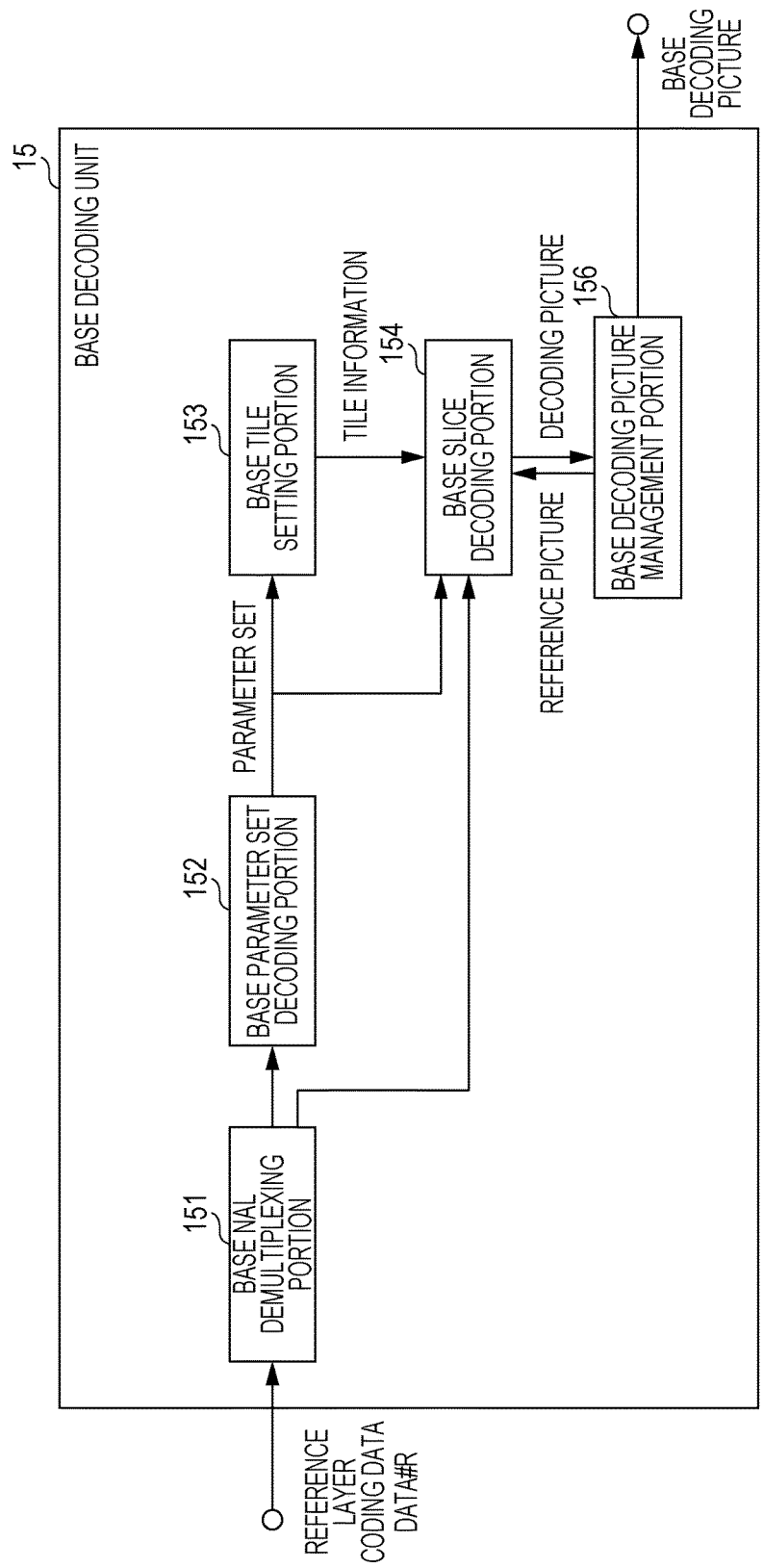
FIG. 6 is a functional block diagram illustrating an example of a configuration of a base decoding unit included in the hierarchy video decoding device.

The detailed configuration of the base decoding unit 15 will be described with reference to FIG. 6. FIG. 6 is a functional block diagram illustrating an example of a configuration of the base decoding unit 15.

As illustrated in FIG. 6, the base decoding unit 15 includes a base NAL demultiplexing portion 151, a base parameter set decoding portion 152, a base tile setting portion 153, a base slice decoding portion 154, and a base decoding picture management portion 156.

The base NAL demultiplexing portion 151 performs demultiplexing of the reference layer coding data DATA#R, and thus extracts a VCL NAL and a non-VCL NAL. The base NAL demultiplexing portion 151 supplies the extracted non-VCL NAL to the base parameter set decoding portion 152, and supplies the extracted VCL NAL to the base slice decoding portion 154.

The base parameter set decoding portion 152 decodes parameter sets, that is, a VPS, an SPS, and a PPS from the input non-VCL NAL, and supplies the decoded parameter sets to the base tile setting portion 153 and the base slice decoding portion 154.

The base tile setting portion 153 derives tile information of a picture based on the input parameter set, and supplies the derived tile information to the base slice decoding portion 154.

The base slice decoding portion 154 generates a decoding picture or a partial region of the decoding picture, based on the VCL NAL, the parameter set, and the tile information which have been input, and the reference picture. The base slice decoding portion 154 records the decoding picture or the partial region of the decoding picture which has been generated, in a buffer of the base decoding picture management portion 156.

The base decoding picture management portion 156 records the input decoding picture in an internal DPB, and performs reference picture list generation or output picture determination. The base decoding picture management portion 156 outputs the decoding picture recorded in the DPB, as a base decoding picture, at a predetermined timing.

(Parameter Set Decoding Unit 12)

The parameter set decoding unit 12 decodes a parameter set (VPS, SPS, PPS) which is used for decoding a target layer, from the input coding data of the target layer. The parameter set decoding unit 12 outputs the decoded parameter set. Generally, the parameter set is decoded based on the known syntax table. That is, a bit string is read from coding data by a predetermined procedure of the syntax table, and a syntax value of a syntax element included in the syntax table is decoded. If necessary, a variable is derived based on the decoded syntax value, and the derived variable may be included in a parameter set to be output. Thus, a parameter set output from the parameter set decoding unit 12 can be expressed by a set of a syntax value of a syntax element relating to the parameter sets (VPS, SPS, and PPS) which are included in coding data, and a variable derived by using the syntax value.

A portion of the syntax table which has high relevancy with the present invention, and relates to picture information and inter-layer position corresponding information, in the syntax table used for decoding of the parameter set decoding unit 12 will be described below in detail.

(Picture Information)

The parameter set decoding unit 12 decodes picture information from the input target layer coding data. The picture information schematically corresponds to information for determining a size of a decoding picture of a target layer. For example, the picture information includes information indicating a width or a height of the decoding picture of the target layer.

The picture information is included in an SPS, for example. The picture information decoded from the SPS includes the width (pic_width_in_luma_samples) of a decoding picture, and the height (pic_height_in_luma_samples) of the decoding picture. A value of syntax pic_width_in_luma_samples corresponds to the width of the decoding picture in a unit of a luminance pixel. A value of syntax pic_height_in_luma_samples corresponds to the height of the decoding picture in a unit of a luminance pixel.

The picture information is shared between layers. That is, picture information of a layer which is different from the target layer can be used as a reference when the target layer is decoded and coded.

(Display Region Information)

The parameter set decoding unit 12 decodes display region information from the input target layer coding data. The display region information is included in an SPS, for example. The display region information decoded from the SPS includes a display region flag (conformance_flag). The display region flag indicates whether or not information (display region position information) indicating a position of a display region is additionally included in the SPS. That is, in a case where the display region flag is 1, the display region flag indicates that the display region position information is additionally included. In a case where the display region flag is 0, the display region flag indicates that the display region position information is not additionally included.

In a case where the display region flag is 1, the display region information decoded from an SPS includes a display region left offset (conf_win_left_offset), a display region right offset (conf_win_right_offset), a display region top offset (conf_win_top_offset), and a display region bottom offset (conf_win_bottom_offset), as display region position information.

In a case where the display region flag is 0, the entirety of a picture is set as a display region. In a case where the display region flag is 1, a partial region in the picture, which is indicated by the display region position information is set. The display region is also referred to as a conformance window.

Figure 7:
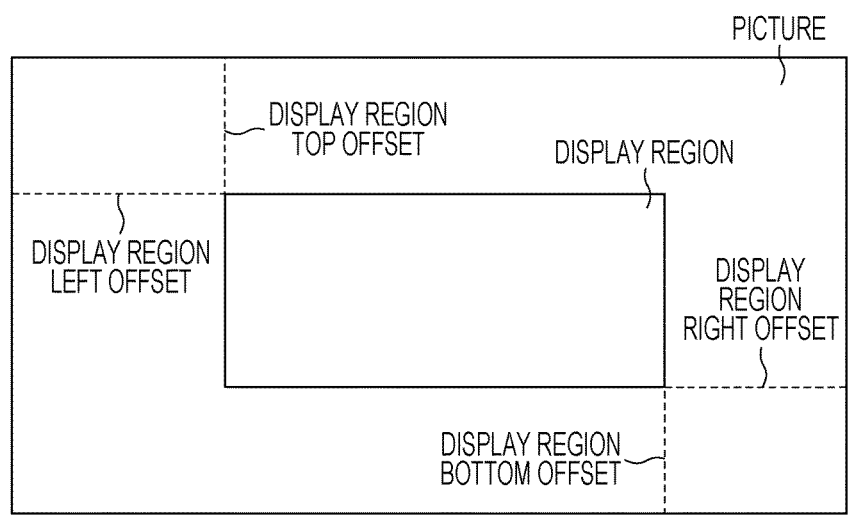
FIG. 7 is a diagram illustrating an example of a relation between a display region which is a partial region in a picture, and display region position information.

A relation between the display region position information and the display region will be described with reference to FIG. 7. FIG. 7 is a diagram illustrating an example of the relation between a display region which is a partial region of a picture, and display region position information. As illustrated in FIG. 7, the display region is enclosed in the picture. The display region top offset indicates a distance between an upper side of the picture and an upper side of the display region. The display region left offset indicates a distance between the left side of the picture and the left side of the display region. The display region right offset indicates a distance between the right side of the picture and the right side of the display region. The display region bottom offset indicates a distance between a lower side of the picture and a lower side of the display region. Thus, the position and the size of the display region in the picture can be uniquely specified by the display region position information. The display region information may be another piece of information which can uniquely specify the position and the size of the display region in the picture.

The display region information is shared between layers. That is, display region information of a layer which is different from the target layer can be used as a reference when the target layer is decoded and coded.

(Inter-Layer Position Corresponding Information)

The parameter set decoding unit 12 decodes inter-layer position corresponding information from the input target layer coding data. The inter-layer position corresponding information schematically indicates a positional relation between a target layer and the corresponding region of the reference layer. For example, in a case where an object (object A) is included in a picture of the target layer and a picture of the reference layer, a region corresponding to the object A in the picture of the target layer, and a region corresponding to the object A in the picture of the reference layer correspond to regions of the target layer and the reference layer corresponding to each other. The inter-layer position corresponding information may not be required to be information which accurately indicates a positional relation between the regions of the target layer and the reference layer corresponding to each other. Generally, the inter-layer position corresponding information indicates an accurate positional relation between the regions of the target layer and the reference layer corresponding to each other, in order to improve accuracy of the inter-layer prediction.

(Reference Region Information)

The inter-layer position corresponding information includes reference region information. The reference region information is information which indicates a spatially positional relation of the following two regions in a specific layer (below, layer A).

(Picture region): region corresponding to a picture in a layer A (Reference region): region in the layer A, which is used for deriving information which indicates a correspondence relation in a pixel position between layers, in inter-layer processing between the layer A and another layer (layer B)

In the embodiment, a reference region offset is used as reference region information. The reference region offset is information indicating displacement between each vertex of the reference region and the corresponding vertex of the picture region. The reference region offset is configured from the following 4 offsets which respectively correspond to the left, the top, the right, and the bottom.

Figure 8:
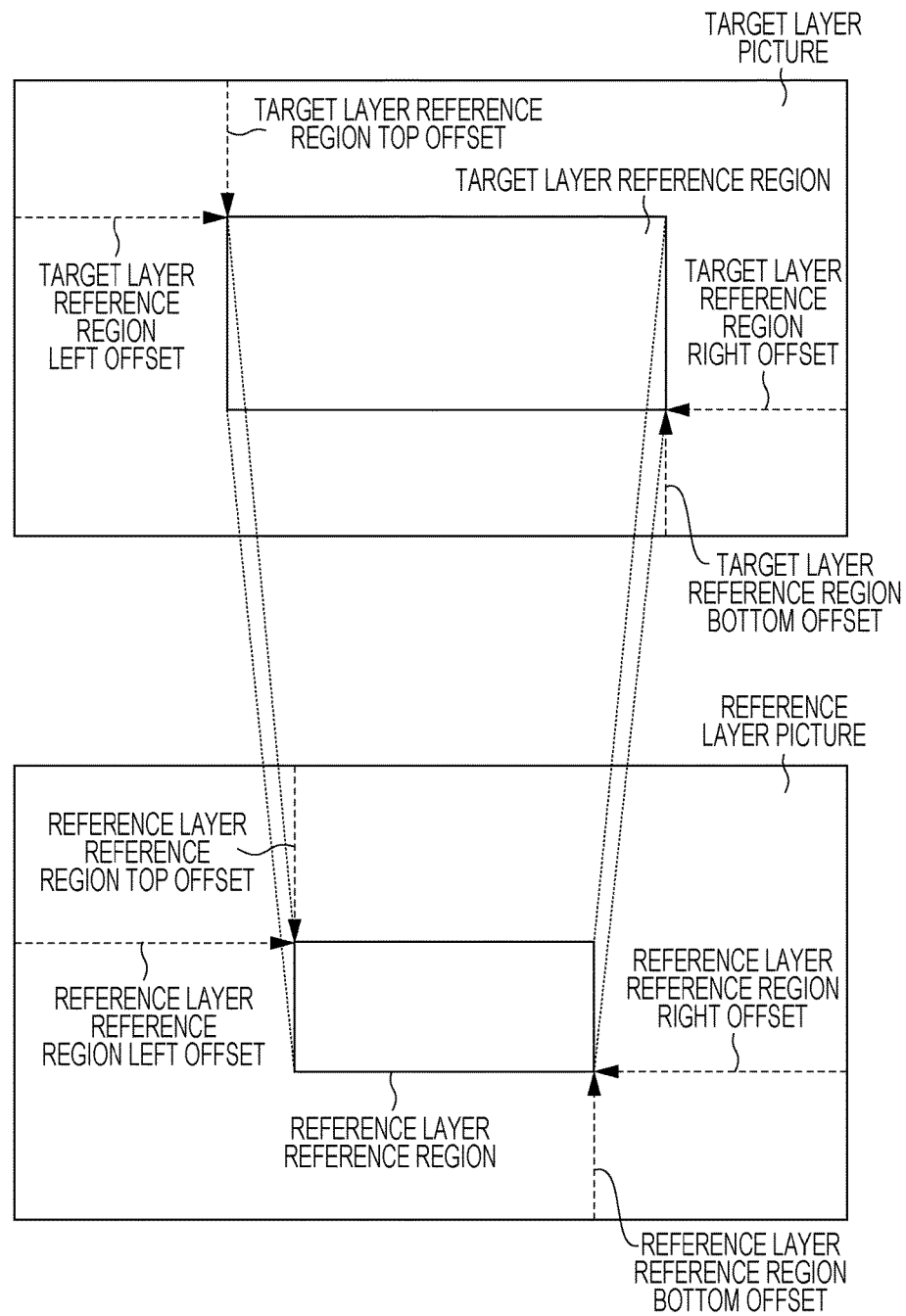
FIG. 8 is a diagram illustrating an example of a relation between a target layer picture, a target layer reference region, a reference layer picture, a reference layer reference region, and a reference region offset.

1. Reference region left offset: an offset between the upper left pixel of the reference region and the upper left pixel of the picture region, in a horizontal direction 2. Reference region top offset: an offset between the upper left pixel of the reference region and the upper left pixel of the picture region, in a vertical direction 3. Reference region right offset: an offset between the lower right pixel of the reference region and the lower right pixel of the picture region, in the horizontal direction 4. Reference region bottom offset: an offset between the lower right pixel of the reference region and the lower right pixel of the picture region, in the vertical direction A relation between each of the offsets included in the reference region offset, the picture region, and the reference region will be described with reference to FIG. 8. FIG. 8 is a diagram illustrating an example of a relation between the target layer picture, the target layer reference region, the reference layer picture, the reference layer reference region, and the reference region offset. FIG. 8 illustrates a relation of the reference region offsets (target layer reference region left offset, target layer reference region top offset, target layer reference region right offset, and target layer reference region bottom offset) in the target layer, in a case where a reference region (target layer reference region) in the target layer is enclosed in a picture region (target layer picture) of the target layer. FIG. 8 illustrates a relation of the reference region offsets (reference layer reference region left offset, reference layer reference region top offset, reference layer reference region right offset, and reference layer reference region bottom offset) in the reference layer, in a case where a reference region (reference layer reference region) in the reference layer is enclosed in a picture region (reference layer picture) in the reference layer. In inter-layer processing which is represented as inter-layer prediction, corresponding pixel position deriving or scale deriving is performed by using the target layer reference region and the reference layer reference region.

FIG. 8 illustrates a case where the reference region included in the picture region. However, it is not limited thereto. The picture region may be included in the reference region, or a portion of the reference region may overlap the picture region. In the embodiment, regarding positive and negative values of the reference region offset, in a case where the reference region is included in the picture region, the reference region offset is set to have a positive value. In a case where the reference region is included in the picture region, the reference region offset is set to have a negative value. That is, in a case where the picture region includes the reference region as illustrated in FIG. 8, value of all of the reference region offsets are set to be positive. The positiveness and negativeness of the reference region offset may be reversely defined. However, in this case, it is necessary that a deriving expression of a corresponding reference position or a scale (which will be described later) be appropriately replaced, and be applied.

An object of the reference region offset is to define the shape of a reference region, and a spatially-positional relation between a picture region and the reference region. Thus, if the object is achieved, a parameter other than the reference offset, which is excluded from the above descriptions, may be used. For example, offsets of the upper left pixel of the reference region to the upper left pixel of the picture region, in the horizontal and the vertical directions, and a combination of the width and the height of a rectangle for the reference region may be used. Information for defining the shape of the reference region and a spatially-positional relation between the picture region and the reference region is referred to as reference region position information. The reference region position information corresponds to the superordinate concept of the reference region offset. In the embodiment, descriptions will be made on the assumption that the reference region offset is used as the reference region position information.

(Syntax of Reference Region Offset)

Syntax relating to the reference region offset which is decoded from the input coding data by the parameter set decoding unit 12 will be described with reference to FIG. 9. FIG. 9 illustrates a portion which is a portion relating to the reference region offset, and is a portion of a syntax table referring when the parameter set decoding unit 12 decodes VPS extension (vps_extension( )) included in a VPS.

The VPS includes a plurality of syntax elements relating to the reference region offset. The plurality of syntax elements relating to the reference region offset are collectively referred to as reference region offset association syntax below. The syntax table illustrated in FIG. 9 indicates that the following syntax elements are included in the VPS extension, as syntax elements constituting the reference region offset association syntax.

A0: reference region offset present flag (ref_region_offsets_in_vps_flag)
A1: number of reference region offsets (num_ref_region_offsets[i])
A2: reference region layer index information (ref_region_layer_idx_delta_minus1[i][j])
A3L: reference region left offset information (ref_region_left_offset[i][j])
A3T: reference region top offset information (ref_region_top_offset[i][j])
A3R: reference region right offset information (ref_region_right_offset[i][j])
A3B: reference region bottom offset information (ref_region_bottom_offset[i][j])

The syntax element A0 is a symbol of a 1-bit flag (u(1)). The syntax elements A1 and A2 are coded by using the 0th exponential Golomb code (ue(v)) of a non-negative integer defined in HEVC. A3L, A3T, A3R, and A3B are coded by using the 0th exponential Golomb code (se(v)) of a signed integer which is defined in HEVC.

The reference region offset present flag (A0) is a flag indicating whether or not the reference region offset association syntax except for the flag (A0) is included in the VPS extension. In a case where a value of the flag is 1, the flag indicates that the reference region offset association syntax is included. In other cases (where the value of the flag is 0), the flag indicates that the reference region offset association syntax is not included.

The number of reference region offsets (A1) indicates the number of reference region offsets for a layer (below, layer i) specified by an index i which is included in the VPS extension. The index i is an index indicating a layer which is included in the VPS extension. The number of pieces of the reference region offset corresponds to the number of pieces of a combination of 4 offsets (A3L, A3T, A3R, and A3B) which respectively correspond to the left, the top, the right, and the bottom. The number of reference region offsets is coded/decoded for a layer specified by each of index values of 0 to MaxLayersMinus1.

Regarding the number of reference region offsets included in the VPS extension, the above-described range is preferable in realizing of functionality in which transmission of the reference region offset for any layer is allowed. However, in a case where it is apparent that the reference region offset is not used for some layers, by another means, the number of reference region offsets, which corresponds to the layer may be omitted, and a value of the reference region offset for the layer may be estimated to be 0.

The reference region layer index information (A2) is information for specifying the j-th layer associated with the layer i. Specifically, the reference region layer index information is used for deriving a layer index (LIdx[i][j]) in a VPS of the j-th layer associated with the layer i. In a case where a syntax value ref_region_layer_idx_delta_minus1[i][j] of the reference region layer index information is set to be RRL[i][j], LIdx[i][j] is derived by using the following expression.

$$LIdx[i][j]=i-(RRL[i][j]+1)\ldots(j==0)$$

$$LIdx[i][j]=LIdx[i][j-1]+(RRL[i][j]+1)\ldots(j>=1)$$

That is, in a case where j is equal to 0, a layer index smaller than the index i by a value which is obtained by adding 1 to the reference region layer index information is set. In a case where j is equal to or more than 1, a layer index more than the index of the (j−1)th layer associated with the layer i, by a value which is obtained by adding 1 to the reference region layer index information is set. Here, the maximum value of RRL[i][j] is smaller than the maximum value (MaxLayersMinus1+1) of the number of layers in a bitstream. That is, the maximum value of indices of the j-th layer associated with the layer i is obtained so as to be a value more than the index (index i) of the layer i.

In a case where the reference region layer index information as described above is defined, there is an advantage of suppressing a coding amount of the reference region layer index information. However, in a case where suppression of the coding amount is not important, a combination of an index j, and another syntax associated with a specific layer, and deriving means may be used. For example, the layer index in a VPS may be used as reference region layer index information. In this case, LIdx[i][j] is derived by the following expression.

$$LIdx[i][j]=RRL[i][j]$$

The reference region offset information (reference region left offset information (A3L), reference region top offset information (A3T), reference region right offset information (A3R), and reference region bottom offset information (A3B)) is information for deriving an offset (reference region offset) which indicates a reference region which is a reference region on the layer i and refers in inter-layer processing (inter-layer prediction) between the layer i and the j-th layer associated with the layer i. The reference region offset information is also information indicating the position and the size (shape) of the reference region, and is also referred to as the reference region position information.

The reference region offset information can be expressed as follows. That is, the reference region position information corresponds to an array variable in which first layer identification information (in the above descriptions, i) and second layer identification information (in the above descriptions, j) are used as indices. i which is the first layer identification information is a layer index in a VPS of a layer in which a reference region is provided. j which is the second layer identification information is information for specifying a target layer of inter-layer processing to which a reference region is applied. j is associated with a layer index in a VPS of a target layer of the inter-layer processing, through LIdx[i][j].

(Slice Decoding Unit 14)

The slice decoding unit 14 generates a decoding picture based on the VCL NAL and the parameter set which are input, and tile information. The slice decoding unit 14 outputs the generated decoding picture.

Figure 13:
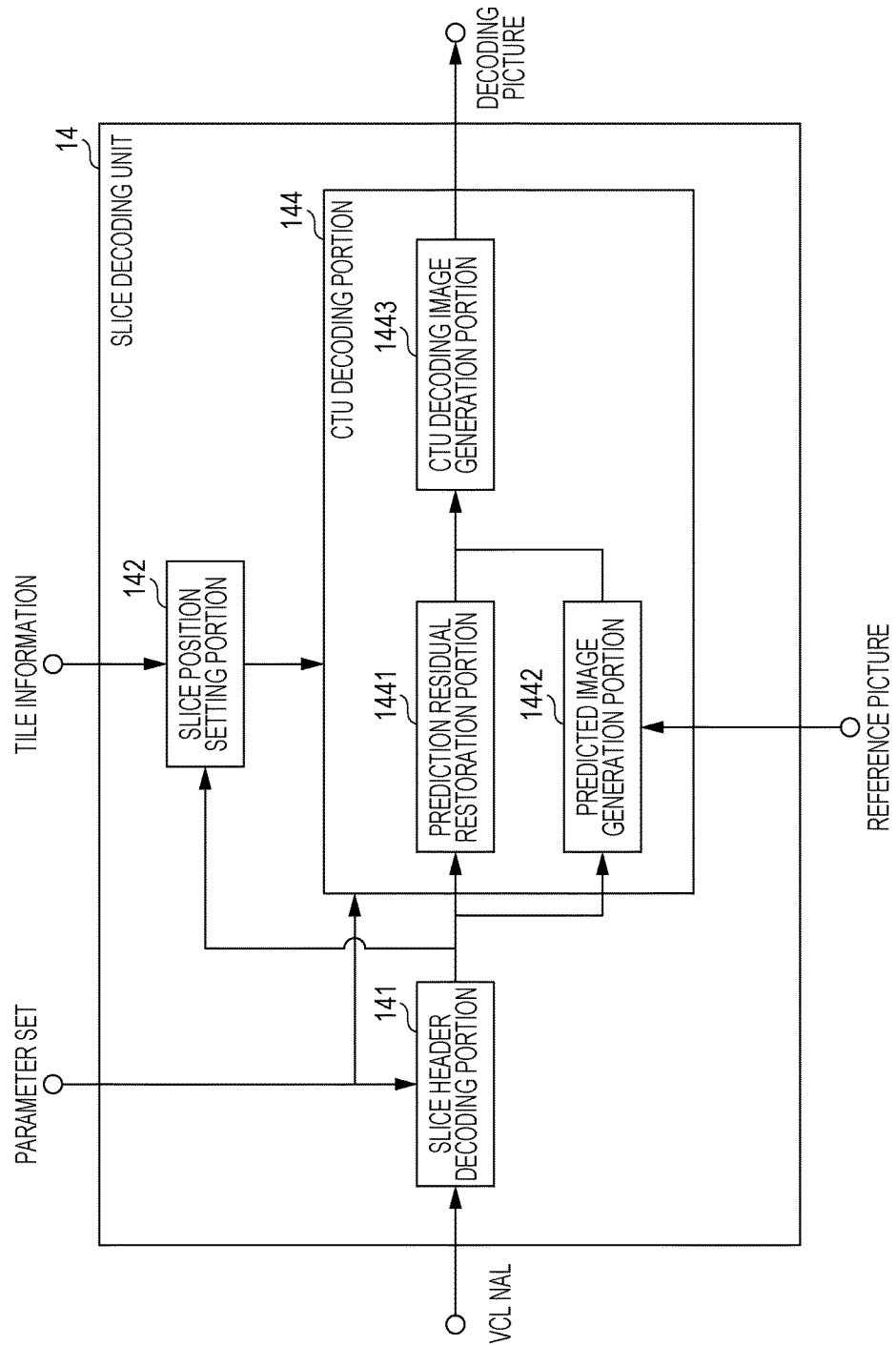
FIG. 13 is a functional block diagram illustrating an example of a configuration of a slice decoding unit included in the hierarchy video decoding device.

A schematic configuration of the slice decoding unit 14 will be described with reference to FIG. 13. FIG. 13 is a functional block diagram illustrating the schematic configuration of the slice decoding unit 14.

The slice decoding unit 14 includes a slice header decoding portion 141, a slice position setting portion 142, and a CTU decoding portion 144. The CTU decoding portion 144 includes a prediction residual restoration portion 1441, a predicted image generation portion 1442, and a CTU decoding image generation portion 1443.

(Slice Header Decoding Unit)

The slice header decoding portion 141 decodes a slice header based on the VCL NAL and the parameter set which have been input. The slice header decoding portion 141 outputs the decoded slice header to the slice position setting portion 142, a skip slice determination unit 143, and the CTU decoding portion 144.

The slice header includes information (SH slice position information) regarding a slice position in a picture, and information (SH skip slice information) regarding a skip slice.

The slice header includes the leading slice flag (first_slice_segment_in_pic_flag) in a picture, as slice position information. In a case where the leading slice flag in the picture is 1, the flag indicates that a target slice is positioned at the leading in the picture in a decoding order. In a case where the leading slice flag in the picture is 0, the flag indicates that the target slice is not positioned at the leading in the picture in the decoding order.

The slice header includes a slice PPS identifier (slice_pic_parameter_set_id) as the slice position information. The slice PPS identifier is an identifier of a PPS which is associated with a target slice. Tile information which is to be associated with the target slice is specified by using the PPS identifier.

(Slice Position Setting Portion)

The slice position setting portion 142 specifies a slice position in the picture, based on the input slice header and the tile information. The slice position setting portion 142 outputs the specified slice position to the CTU decoding portion 144. The slice position in the picture, which is derived by the slice position setting portion 142 includes a position of each CTU in the picture, which is included in a slice.

(CTU Decoding Unit)

Schematically, the CTU decoding portion 144 decodes a decoding image of a region corresponding to each CTU which is included in the slice, based on the slice header, the slice data, and the parameter set which have been input. Thus, the CTU decoding portion 144 generates a decoding image of the slice. The decoding image of the slice is output to a position indicated by the input slice position, as a portion of the decoding picture. The decoding image of a CTU is generated by the prediction residual restoration portion 1441, the predicted image generation portion 1442, and the CTU decoding image generation portion 1443 which are included in the CTU decoding portion 144. The prediction residual restoration portion 1441 decodes prediction residual information (TT information) which is included in an input slice data, and generates a prediction residual of a target CTU. The prediction residual restoration portion 1441 outputs the generated prediction residual. The predicted image generation portion 1442 generates and outputs a predicted image based on a prediction method and a prediction parameter which are indicated by prediction information (PT information) included in the input slice data. At this time, if necessary, a decoding image of the reference picture or a coding parameter is used. The CTU decoding image generation portion 1443 adds the input predicted image and the prediction residual to each other, and thus generates and outputs a decoding image of a target CTU.

(Details of Predicted Image Generation Portion)

Predicted image generation processing in a case where inter-layer image prediction is selected, in predicted image generation processing performed by the above-described predicted image generation portion 1442 will be described in detail.

Generation processing of a prediction pixel value of a target pixel included in a target CTU to which the inter-layer image prediction is applied is performed by the following procedures. Firstly, reference picture position deriving processing is performed so as to derive a corresponding reference position. Here, the corresponding reference position is a position on a reference layer, which corresponds to the target pixel on a target layer picture. Since pixels of the target layer and the reference layer do not necessarily have one-to-one correspondence, the corresponding reference position is expressed with accuracy which is less than a unit of a pixel, in the reference layer. Then, interpolated filter processing is performed by using the derived corresponding reference position as an input, and thus the prediction pixel value of the target pixel is generated.

Figure 1:
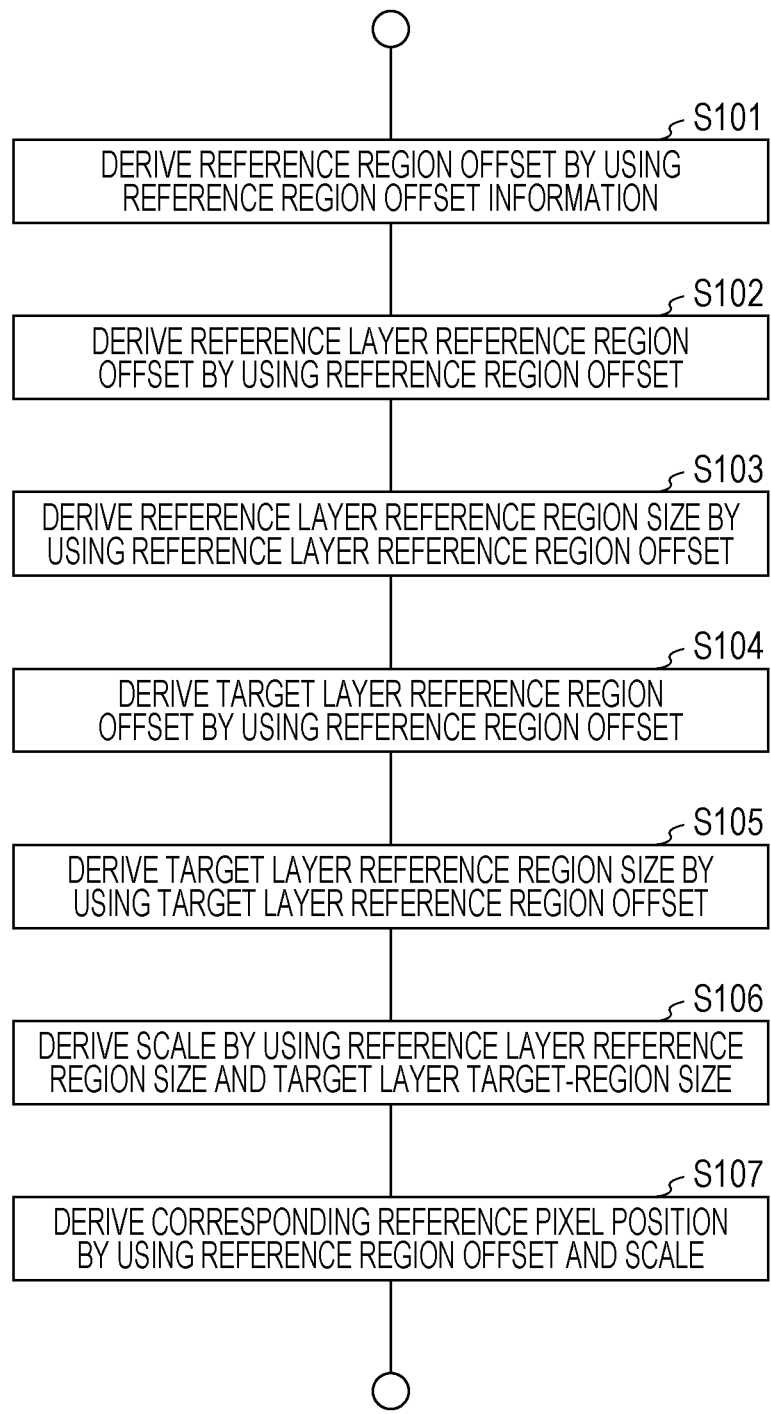
FIG. 1 is a flowchart of corresponding reference position deriving processing performed in a hierarchy video decoding device and a hierarchy video coding device, according to an embodiment.

In the corresponding reference position deriving processing, the corresponding reference position is derived based on picture information which is included in the parameter set, and reference region information. Detailed procedures of the corresponding reference position deriving processing will be described with reference to FIG. 1. Descriptions will be made on the assumption that the target layer of the corresponding reference position deriving processing is a layer C (index in a VPS of the layer C is c), and a reference layer of the target layer is a layer R (index in a VPS of the layer R is r). Here, the reference layer of the target layer is a layer lower than the target layer, and a layer corresponding to an index of a small VPS is a lower layer. A relation that r is smaller than c is established based on the above two statements. FIG. 1 is a flowchart illustrating the corresponding reference position deriving processing. The corresponding reference position deriving processing in inter-layer image prediction processing between the layer C and the layer R in a case where the layer C is set as the target layer is sequentially performed by the following procedures S101 to S107.

(S101) A reference region offset is derived from reference region offset information which has been coded as reference region information by the parameter set decoding unit 12, and has i and j as indices. The derived reference region offset is referred below to as RRO[k][l]. In addition, reference region offsets and signs thereof which constitute RRO[k][l] and respectively correspond to the left, the top, the right, and the bottom are defined as follows.

Reference region left offset: RRLO[k][l]
Reference region top offset: RRTO[k][l]
Reference region right offset: RRRO[k][l]
Reference region bottom offset: RRBO[k][l]

Each of the offsets RRLO[k][l], RRTO[k][l], RRRO[k][l], and RRBO[k][l] which constitute RRO[i][j][k][l] are derived based on the corresponding reference region offset information, by using the following calculations.

$$RRLO[k][l]=(\text{ref\_region\_left\_offset}[i][j])<<1)$$

$$RRTO[k][l]=(\text{ref\_region\_top\_offset}[i][j])<<1)$$

$$RRRO[k][l]=(\text{ref\_region\_right\_offset}[i][j])<<1)$$

$$RRBO[k][l]=(\text{ref\_region\_bottom\_offset}[i][j])<<1)$$

Here, a relation of k=i and l=LIdx[i][j] is provided. LIdx[i][j] is an array which is derived based on reference region layer index information which is decoded by the parameter set decoding unit 12. LIdx[i][j] indicates an index in a VPS of a layer associated with the j-th reference region offset information for the layer i.

In a case where reference region offset information corresponding to a combination of i and j which correspond to each other is not provided for a reference region offset (RRO[k][l]) corresponding to a combination of specific k and specific l, values of the offsets constituting RRO[k][l] are set to 0. That is, in such a case, a region corresponding to the entirety of a picture on a layer k is set as a predetermined value of a reference region which is a reference region on the layer k and refers in the inter-layer prediction between the layer k and the layer l.

According to the expressions, a value obtained by multiplying a syntax value of the corresponding reference region offset information by 2 is set as a reference region offset. However, a relation between the reference region offset and the reference region offset information is not limited thereto. The relation between the reference region offset and the reference region offset information is just an example. Both of the reference region offset and the reference region offset information may be associated with each other by using another appropriate method.

(S102) A reference layer reference region offset (reference layer reference region position) which indicates the position and the shape of a reference region on the reference layer (layer r) is derived. The reference layer reference region offset is configured from 4 offsets (RL_RRLO, RL_RRTO, RL_RRRO, and RL_RRBO in this order) which respectively correspond to the left, the top, the right, and the bottom. The reference layer reference region offset is derived by using the following expressions.

$$RL\_RRLO = RRLO[r][c]$$

$$RL\_RRTO = RRTO[r][c]$$

$$RL\_RRRO = RRRO[r][c]$$

$$RL\_RRBO = RRBO[r][c]$$

That is, a reference region offset which refers in the inter-layer prediction between the reference layer R and the target layer C, and is used for a reference region on the reference layer R is set as a value of the reference layer reference region offset.

The reference region offset (RRO[r][c]) used for the value of the reference layer reference region offset is a reference region offset which satisfies a condition of "r<c".

The above-described deriving processing of the reference layer reference region offset can be expressed as follows. That is, the reference layer reference region offset (reference layer reference region position) when the inter-layer prediction between a target layer and a reference layer is performed is set by using an element of the reference region offset. The reference region offset has an index in a VPS of the reference layer as the first array index, and has an index in a VPS of the target layer as the second array index. Regarding the corresponding elements of the reference region offset, in S101, a value of the reference region position information (RRO[r][c]) is set. In the reference region position information (RRO[r][c]), the index r (first layer identification information) in the VPS of the reference layer is used as the first array index, and the number i (second layer identification information) which indirectly indicates the index c in the VPS of the target layer is used as the second array index.

(S103) The size of the reference region on the reference layer is derived based on the reference layer reference region offset derived in S102 and a reference layer picture size. The width (RL_RRW) and the height (RL_RRH) of the reference region on the reference layer are respectively derived based on the width (RL_PICW) and the height (RL_PICH) of the reference layer picture, by the following expressions.

$$RL\_RRW = RL\_PICW - n*(RL\_RRLO + RL\_RRRO)$$

$$RL\_RRH = RL\_PICH - n*(RL\_RRTO + RL\_RRBO)$$

Here, a value of n is a parameter for aligning a unit of a pixel of the reference layer picture and a unit of the reference region offset. For example, in a case where a color signal of an input image has a format of 4:2:0, in a case where a unit of the reference region offset is a unit of a luminance pixel, the unit is aligned by using a value of n=1 for luminance, and using a value of n=0.5 for chrominance.

That is, according to the above expressions, the sum of the reference layer reference region left offset and the reference layer reference region right offset is added to the width of the reference layer picture, in the aligned unit. Thus, the width of the reference region on the reference layer is derived. The height of the reference region on the reference layer is similarly derived.

(S104) A target layer reference region offset (target layer reference region position) which indicates the position and the shape of the reference region on the target layer (layer c) is derived. The target layer reference region offset is configured from 4 offsets (CL_RRLO, CL_RRTO, CL_RRRO, and CL_RRBO in this order) which respectively correspond to the left, the top, the right, and the bottom. The target layer reference region offset is derived by using the following expressions.

$$CL\_RRLO = RRLO[c][r]$$

$$CL\_RRTO = RRTO[c][r]$$

$$CL\_RRRO = RRRO[c][r]$$

$$CL\_RRBO = RRBO[c][r]$$

That is, a reference region offset which is used for the reference region on the target layer C, and refers in the inter-layer prediction between the target layer C and the reference layer R is set as a value of the target layer reference region offset.

The reference region offset (RRO[r][c]) used for the value of the target layer reference region offset is a reference region offset which satisfies a condition of "c>r".

The above-described deriving processing of the target layer reference region offset can be expressed as follows. That is, the target layer reference region offset (target layer reference region position) when the inter-layer prediction between a target layer and a reference layer is performed is set by using an element of the reference region offset. The reference region offset has an index c in a VPS of the target layer as the first array index, and has an index r in the VPS of the reference layer as the second array index. Regarding the corresponding elements of the reference region offset, in S101, a value of the reference region position information (RRO[i][j]) is set. In the reference region position information (RRO[i][j]), the index i (first layer identification information) in the VPS of the target layer is used as the first array index, and the number j (second layer identification information) which indirectly indicates an index in the VPS of the reference layer is used as the second array index.

(S105) The size of a target region on the target layer is derived based on the target layer reference region offset derived in S104 and a target layer picture size. The width (CL_RRW) and the height (CL_RRH) of the reference region on the target layer are respectively derived based on the width (CL_PICW) and the height (CL_PICH) of the target layer picture, by the following expressions.

CL_RRW=CL_PICW−$n$*(CL_RRLO+CL_RRRO)

CL_RRH=CL_PICH−$n$*(CL_RRTO+CL_RRBO)

Here, a value of n is similar to n described in S103. The value of n is a parameter for aligning a unit of a pixel of the target layer picture and a unit of a target region offset.

That is, according to the above expressions, the sum of the target layer reference region left offset and the target layer reference region right offset is added to the width of the target layer picture, in the aligned unit. Thus, the width of the reference region on the target layer is derived. The height of the reference region on the target layer is similarly derived.

(S106) A scale used in the inter-layer prediction is derived based on the size of the reference layer reference region derived in S103 and the size of the target layer reference region derived in S105. A scale sx in the horizontal direction and a scale sy in the vertical direction are respectively derived by the following expressions.

$sx$=((RL_RRW<<16)+(CL_RRW>>1))/CL_RRW $sy$=((RL_RRH<<16)+(CL_RRH>>1))/CL_RRH

The operator "/" is an operator indicating division of an integer.

That is, according to the expressions, a predetermined constant (in the above expressions, "<<16") is multiplied by the reference layer reference region size, and a value obtained by dividing a value obtained by multiplication, by the target layer reference region size is set as the scale. The item of "(CL_RRW>>1)" is an item for adjusting rounding-off by division. Thus, if an effect of the unit or the rounding-off is excluded, the scale can be described as a ratio between the size (width or height) of the reference layer reference region and the size (width or height) of the target layer reference region.

(S107) A reference pixel position is derived with 1/16 of pixel accuracy, based on the reference layer reference region offset derived in S102 and the scale derived in S106. Values of a horizontal component (x component) xRef16 and a vertical component (y component) yRef16 of the reference pixel position on the reference layer with 1/16 of pixel accuracy correspond to a pixel position (xP, yP) on the target layer, and are respectively derived by the following expressions.

$x$Ref16=((($xP$−CL_OX)*$sx$+add$X$+(1<<11))>>12)+delta$X$+RL_OX $y$Ref16=((($yP$−CL_OY)*$sy$+add$Y$+(1<<11))>>12)+delta$Y$+RL_OY Here, CL_OX=CL_RRLO/$cr$Adjust CL_OY=CL_RRTO/$cr$Adjust RL_OX=(RL_RRLO<<4)/$cr$Adjust RL_OY=(RL_RRTO<<4)/$cr$Adjust crAdjust is a parameter for correcting a difference in a unit between luminance and chrominance. For example, in a case where a decoding image of 4:2:0 is handled, a value of 1 is set in crAdjust if being luminance, and a value of 2 is set in crAdjust if being chrominance. addX, addY, deltaX, and deltaY are parameters for indicating a shift between a pixel on the target layer and a pixel on the reference layer, which occurs by up-sampling or interlacing.

That is, according to the above expressions, the reference pixel position is calculated based on the reference layer reference region offset and the scale. The derived reference pixel position with 1/16 of pixel accuracy is set as the corresponding reference position, and then the corresponding reference position deriving processing is ended.

In the above corresponding reference position deriving processing, the scale is derived as not a picture size, but a ratio of the size between regions specified by the reference region. Thus, even in a case where the picture size of the target layer picture or the reference layer picture is changed for the purpose of interest region extraction, an association syntax value is set to cause the reference region to be the same, and thus the same scale can be derived before and after extraction.

In the interpolated filter processing, a pixel value of a position corresponding to the corresponding reference position which has been derived in the corresponding reference position deriving processing is generated by applying an interpolated filter to a decoding pixel of a pixel in the vicinity of the corresponding reference position, on the reference layer picture.

(Advantages of Video Decoding Device 1)

The above-described hierarchy video decoding device (hierarchy image decoding device) 1 according to the embodiment includes the parameter set decoding unit 12 that decodes a parameter set, and the predicted image generation portion 1442 that generates a predicted image by inter-layer prediction, with reference to a decoding pixel of a reference layer picture. The parameter set decoding unit 12 decodes a reference region offset. The predicted image generation portion 1442 calculates a scale based on a reference layer reference region offset and a target layer reference region offset which are derived from the reference region offset, and derives a corresponding reference position with reference to the calculated scale, so as to perform the inter-layer prediction. In other words, the hierarchy video decoding device 1 decodes a syntax value necessary for deriving the reference region offset, from coding data, and calculates the corresponding reference position based on a parameter which has been derived based on the syntax value. Thus, it is possible to provide a function of deriving an appropriate corresponding reference position in a case where interest region is extracted. Accordingly, the hierarchy video decoding device 1 can provide a function of maintaining accuracy of a positional relation between a higher layer pixel and a lower layer pixel before and after interest region extraction, by using syntax elements of which the number is smaller than that in the related art.

Modification Example 1: Restriction of Reference Region Offset for Higher Layer

In the above descriptions for the hierarchy video decoding device 1, a case where reference region layer index information included in reference region information is decoded by the parameter set decoding unit 12, and the index LIdx[i][j] of the j-th layer associated with the layer i, which is derived based on the reference region layer index information can have a value more than i is described. This means that the j-th reference region offset information associated with the layer i is used for indicating a reference region in inter-layer processing with LIdx[i][j], and a layer indicated by LIdx[i][j] can be independently designated for each layer which is higher than the layer i.

The j-th reference region offset information associated with the layer i, in a case where restriction by the LIdx[i][j] is changed, and the value of LIdx[i][j] is set to be i in a state where a value allowed for LIdx[i][j] is restricted to be equal to or less than i, is set to be information indicating an offset of a reference region which is a reference region on the layer i and is used in inter-layer processing between the layer i and any layer which is higher than the layer i.

As described above, in a case where the value of LIdx[i][j] is restricted to be equal to or less than i, deriving processing of the reference layer reference region offset, which has been described in S102 for the corresponding reference position deriving processing is modified as follows. That is, a target layer reference region offset indicating the reference region on the reference layer (layer R, index r in VPS) is derived. The reference layer reference region offset is configured from 4 offsets (RL_RRLO, RL_RRTO, RL_RRRO, and RL_RRBO in this order) which respectively correspond to the left, the top, the right, and the bottom. The reference layer reference region offset is derived by using the following expressions.

RL_RRLO=RRLO[r][r]

RL_RRTO=RRTO[r][r]

RL_RRRO=RRRO[r][r]

RL_RRBO=RRBO[r][r]

That is, a reference region offset which is for the reference region on the reference layer R and refers in the inter-layer prediction between the layer R and any layer which is higher than the layer R is set as a value of the target layer reference region offset.

According to the modification example, it is possible to reduce a coding amount required for the reference region information. This is because, in a case where a common layer (target reference layer) is used as a reference, the same reference region on the target reference layer can be specified by a set of reference region offsets. Generally, since the reference region referring in the inter-layer prediction is the same in many cases, if the same reference region on the target reference layer can be set as described above, the reference region can be functionally sufficiently used in many applications.

Modification Example 2: Transmission of Reference Region Information by SPS

In the above descriptions for the hierarchy video decoding device 1, an example in which the reference region information is included in VPS extension is described. However, transmission can be performed by another parameter sets (SPS or PPS) or another header (slice header). A modification example in a case where the reference region information is included in an SPS will be described below.

(Syntax of Reference Region Offset in SPS)

Syntax relating to the reference region offset which is decoded from the input coding data by the parameter set decoding unit 12 will be described with reference to FIG. 10. FIG. 10 illustrates a portion which is a portion of a syntax table referring when the parameter set decoding unit 12 decodes SPS extension (sps_multilayer_extension( )) included in an SPS, and which relates to the reference region offset.

A plurality of syntax elements relating to the reference region offset is included in the SPS extension. The plurality of syntax elements relating to the reference region offset is collectively referred to as SPS reference region offset association syntax below. The syntax table illustrated in FIG. 10 indicates that the following syntax elements are included in the SPS extension, as syntax elements constituting the SPS reference region offset association syntax.

B1: number of reference region offsets (num_ref_region_offsets)

B2: reference region layer identifier information (ref_region_layer_id[i])

B3L: reference region left offset information (ref_region_left_offset[i])

B3T: reference region top offset information (ref_region_top_offset[i])

B3R: reference region right offset information (ref_region_right_offset[i])

B3B: reference region bottom offset information (ref_region_bottom_offset[i])

The syntax element B1 is a symbol of a 6-bit binary expression. B2 is the 0th exponential Golomb code (ue(v)) of a non-negative integer defined in HEVC. B3L, B3T, A3R, and A3B are the 0th exponential Golomb codes (se(v)) of a signed integer defined in HEVC.

The number of reference region offsets (B1) indicates the number of reference region offsets for a layer (below, target layer) which belongs to a slice (picture) referring the SPS extension. The number of pieces of reference region offsets corresponds to the number of pieces of a combination of 4 offsets (B3L, B3T, B3R, and B3B as described above) which respectively correspond to the left, the top, the right, and the bottom.

The reference region layer identifier information (B2) is information for specifying a layer with which the i-th reference region offset in the target layer is associated. Specifically, the reference region layer identifier information is a layer identifier (nuh_layer_id) of the i-th layer associated with the target layer. A value of ref_region_layer_id[i] is equal to or less than the layer identifier of the target layer. In a case where the value of ref_region_layer_id[i] is less than the layer identifier of the target layer, the reference region offset information associated with the index i indicates an offset of the reference region which is a reference region on the target layer, and refers in the inter-layer prediction between the target layer and a layer indicated by ref_region_layer_id[i]. In a case where the value of ref_region_layer_id[i] is equal to the layer identifier of the target layer, the reference region offset information associated with the index i indicates a reference region offset which corresponds to the reference region on the target layer, and refers in the inter-layer prediction between a layer in which the target layer is set as the reference layer, and the target layer.

In a case where indices i1 and i2 satisfy "i1<i2", a condition of "ref_region_layer_id[i1]<ref_region_layer_id[i2]" is preferably satisfied. That is, the reference region layer identifier information is preferably included in the SPS extension, in an order in which the corresponding layer identifiers have an ascending order. If the layer identifier has an order, reference region layer identifier information of which the layer identifier is largest can be simply derived by ref_region_layer_id[num_ref_region_offsets-1], for example.

The reference region offset information (reference region left offset information (B3L), reference region top offset information (B3T), reference region right offset information (B3R), and reference region bottom offset information (B3B)) is information for deriving an offset (reference region offset) which indicates a reference region which is a reference region which is the reference region on the target layer, and refers in inter-layer processing (inter-layer prediction) between the target layer and the i-th layer associated with the target layer.

(Corresponding Reference Deriving Processing in Case Using Reference Region Information by SPS)

Next, corresponding reference position deriving processing will be described. The corresponding reference position deriving processing is performed by using SPS reference region offset association syntax which is decoded with reference to the syntax table in FIG. 10, in a case where inter-layer image prediction is selected from predicted image generation processing by the predicted image generation portion 1442.

The corresponding reference position deriving processing in inter-layer image prediction processing between a target layer and a reference layer is sequentially performed by the following procedures S201 to S207.

(S201) A reference region offset is derived from reference region offset information by the parameter set decoding unit 12. The reference region offset corresponds to a reference region of a target layer, and refers in inter-layer prediction between the target layer (layer C, layer identifier cLId) and the reference layer (layer R, layer identifier rLId). The reference region offset information has been coded as reference region information, from an SPS to which the target layer refers. The derived reference region offset is referred below to as RRO[cLId][rLId]. In addition, reference region offsets and signs thereof, which constitute RRO[cLId][rLId] and respectively correspond to the left, the top, the right, and the bottom are defined as follows.

Reference region left offset: RRLO[cLId][rLId]
Reference region top offset: RRTO[cLId][rLId]
Reference region right offset: RRRO[cLId][rLId]
Reference region bottom offset: RRBO[cLId][rLId]

Each of the offsets RRLO[i][j], RRTO[i][j], RRRO[i][j], and RRBO[i][j] which constitute RRO[i][j] is derived based on the corresponding reference region offset information, by the following calculations.

RRLO[cLId][rLId]=(ref_region_left_offset[rLId]<<1)

RRTO[cLId][rLId]=(ref_region_top_offset[rLId]<<1)

RRRO[cLId][rLId]=(ref_region_right_offset[rLId]<<1)

RRBO[cLId][rLId]=(ref_region_bottom_offset[rLId]<<1)

(S202) A reference layer reference region offset which indicates the reference region on the reference layer is derived. The reference layer reference region offset is configured from 4 offsets (RL_RRLO, RL_RRTO, RL_RRRO, and RL_RRBO in this order) which respectively correspond to the left, the top, the right, and the bottom. The reference layer reference region offset is derived by using the following expressions.

RL_RRLO=RRLO[cLId][cLId]

RL_RRTO=RRTO[cLId][cLId]

RL_RRRO=RRRO[cLId][cLId]

RL_RRBO=RRBO[cLId][cLId]

That is, a reference region offset which is used for the reference region on the reference layer, and refers in inter-layer prediction between the reference layer R and a layer which is higher than the reference layer is set as a value of the reference layer reference region offset.

For example, in a case where coding in a VPS is used together, the reference region offset in which a first array index is set to be rLIdx can be referred, and the followings may be used as the reference region offset.

RL_RRLO=RRLO[rLId][rLId]

RL_RRTO=RRTO[rLId][rLId]

RL_RRRO=RRRO[rLId][rLId]

RL_RRBO=RRBO[rLId][rLId]

(S203) The size of the reference region on the reference layer is derived based on the reference layer reference region offset derived in S202 and a reference layer picture size. A specific process is the same as the process of S103 except that the value of the reference layer reference region offset is the value derived in S202. Thus, descriptions thereof will be omitted.

(S204) A target layer reference region offset which indicates the reference region on the target layer is derived. The target layer reference region offset is configured from 4 offsets (CL_RRLO, CL_RRTO, CL_RRRO, and CL_RRBO in this order) which respectively correspond to the left, the top, the right, and the bottom. The target layer reference region offset is derived by using the following expressions.

CL_RRLO=RRLO[cLId][rLId]

CL_RRTO=RRTO[cLId][rLId]

CL_RRRO=RRRO[cLId][rLId]

CL_RRBO=RRBO[cLId][rLId]

That is, a reference region offset which is used for the reference region on the target layer, and refers in the inter-layer prediction between the target layer (layer identifier cLId) and the reference layer (layer identifier rLId) is set as a value of the target layer reference region offset.

(S205) The size of the reference region on the reference layer is derived based on the target layer reference region offset derived in S204 and a target layer picture size. A specific process is the same as the process of S105 except that the value of the target layer reference region offset is the value derived in S204. Thus, descriptions thereof will be omitted.

(S206) A scale used in the inter-layer prediction is derived based on the size of the reference layer reference region derived in S203 and the size of the target layer reference region derived in S205. A specific process is the same as the process of S106 except that the size of the reference layer reference region is the value derived in S203, and the size of the target layer reference region is the value derived in S205. Thus, descriptions thereof will be omitted.

(S207) A reference pixel position is derived with 1/16 of pixel accuracy, based on the reference layer reference region offset derived in S202 and the scale derived in S206. A specific process is the same as the process of S207 except that the value of the reference layer reference region offset is the value derived in S202, and the scale is the value derived in S206. Thus, descriptions thereof will be omitted.

The hierarchy video decoding device according to the modification example performs the above-described deriving processing of the corresponding reference position by using the syntax relating to the reference region offset which is included in the SPS, and by using the syntax value thereof. Thus, it is possible to provide a function of deriving an appropriate corresponding reference position in a case where interest region is extracted.

Modification Example 3: Another Example of Correlation of Reference Region Offset with Layer In Modification Example 2, it is determined which offset of the reference region on the target layer and the reference region on the reference layer is indicated by the subsequent reference region offset, based on whether the value of the reference region layer identifier is less than the layer identifier of the target layer, or is equal to the layer identifier. A method in which a layer with which the reference region offset is associated is determined by using another syntax and another deriving method can be used.

For example, as will be described below with reference to FIG. 11, reference region target selection information is sent, and the followings are derived from the reference region target selection information by using a predetermined method: layer to which the reference region belongs; and two layers selected for inter-layer processing to which the reference region refers.

FIG. 11 illustrates a syntax table referring when the SPS reference region offset association syntax is decoded, by the parameter set decoding unit 12. The syntax table illustrated in FIG. 11 can be used instead of the syntax table illustrated in FIG. 10 for Modification Example 2.

The syntax table in FIG. 11 indicates that the following syntax elements are included instead of the syntax elements of B2, B3L, B3T, B3R, and B3B included in the syntax table in FIG. 10 for Modification Example 2.

C2: reference region target selection information (ref_region_target_info[i])

C3L: reference region left offset information (ref_region_left_offset[lid1][lid2])

C3T: reference region top offset information (ref_region_top_offset[lid1][lid2])

C3R: reference region right offset information (ref_region_right_offset[lid1][lid2])

C3B: reference region bottom offset information (ref_region_bottom_offset[lid1][lid2])

Schematically, firstly, the reference region target selection information is decoded, and then two layer identifiers lid1 and lid2 are derived from the reference region target selection information. The reference region offset information which is decoded after that is set to be an offset of a reference region which is a reference region on the layer lid1, and refers in the inter-layer prediction between the layer lid1 and the layer lid2.

The reference region target selection information (C2) is information for specifying a layer with which the subsequent reference region offset is associated. The two layer identifiers lid1 and lid2 are derived from the reference region target selection information.

The layer identifier lid1 (first layer identification information) indicates a layer identifier of a layer in which the reference region is provided. lid1 is derived in the next procedure. A value (ref_region_target_info[i]) of the reference region target selection information is abbreviated to be RRTI[i].

1. In a case where RRTI[i] is smaller than the layer identifier (nuh_layer_id) of the target layer, the value of lid1 is set to be nuh_layer_id.

2. In other cases (case where RRTI[i] is equal to or more than nuh_layer_id), the value of lid1 is set to be "RRTI[i]-nuh_layer_id".

The deriving expression of lid1, which is illustrated in FIG. 11 is obtained by expression the above procedure in a manner of a mathematical expression.

The layer identifier lid2 (second layer identification information) indicates whether the reference region is a reference region referring in inter-layer prediction between the layer lid1 and a certain layer. lid2 is derived by the following procedures.

1. In a case where RRTI[i] is smaller than the layer identifier (nuh_layer_id) of the target layer, the value of lid2 is set to be RRTI[i].

2. In other cases (case where RRTI[i] is equal to or more than nuh_layer_id), the value of lid2 is set to be nuh_layer_id.

The deriving expression of lid2, which is illustrated in FIG. 11 is obtained by expression the above procedure in a manner of a mathematical expression.

The two layer identifiers lid1 and lid2 are derived from the value of the reference region target selection information by using the above procedures. Regarding the deriving procedures, in a case where the reference region target selection information is smaller than the value of the layer identifier of a target layer (layer referring to an SPS), the subsequent reference region offset is used as an offset of the reference region on the target layer. In a case where the reference region target selection information is equal to or more than the value of the layer identifier of the target layer, the subsequent reference region offset is used as a reference region offset of a layer of which a layer identifier is set to be a value obtained by subtracting the value of the reference region target selection information from the layer identifier of the target layer.

Mapping of the reference region target selection information onto the two layer identifier may be performed by using another method. In this case, it is necessary that deriving processing be performed so as to cause a certain layer identifier to be used as the layer identifier of the target layer. For example, the layer identifier nuh_layer_id of the target layer is used in the determination expression or subtraction. However, instead of this, the maximum value of the layer identifier may be used. In this case, the coding amount of the reference region target selection information is increased. However, there is an advantage in that revising a value of the reference region target selection information can be omitted even in a case where revision so as to cause another layer to refer to an SPS is required.

The reference region offset information (reference region left offset information (C3L), reference region top offset information (C3T), reference region right offset information (C3R), and reference region bottom offset information (C3B)) is information for deriving an offset (reference region offset) which indicates a reference region which is the reference region on the target layer, is the reference region on the layer lid1, and refers in inter-layer processing (inter-layer prediction) between the layer lid1 and the layer lid2. The reference region offset information is recorded in association with a combination of lid1 and lid2.

As described above, the reference region offset information is sent along with the reference region selection target information, and thus it is possible to provide a function of designating a different reference region offset for each combination of layers, with the smaller additional coding amount, even in a case where transmission with an SPS is performed.

Modification Example 4: Control Information in Using Display Region

As a method of implicitly determining a reference region in a case where inter-layer prediction between two layers, a method of using display region information is known. However, in a case where the display region information is used for designating a reference region, there is a problem in that a change of the display region information to being used for designating a display region. In a case where a display region of a specific layer is changed, an inter-layer predicted image of a higher layer in which the specific layer is set as a reference layer is changed. Thus, there is a problem in that reproduction of coding data of the higher layer is required. Accordingly, it is preferable that it can be determined whether or not the display region is used as the reference region, based on another piece of information.

(4-1: Method Of Being Used As Defined Value Of Reference Region)

In S101 for the corresponding reference position deriving processing which is described with reference to FIG. 1, when the reference region offset is derived from the reference region offset information, a case in which a value of the reference region offset is set so as to cause the reference region to be the entirety of a picture, as a predetermined value of the reference region offset in a case where the corresponding reference region offset information is not provided is described. The predetermined of the reference region offset is set for the display region, and thus the display region is used as the predetermined of the reference region in a case where the reference region offset is not sent. In addition, in a case where a change of the display region is required, a value corresponding to the display region is designated before the reference region offset is explicitly changed, and thus the display region can be changed with avoiding revision of the higher layer.

S101a which is a process of modifying S101 of the corresponding reference position deriving processing so as to use the display region as the predetermined value of the reference region will be described below.

(S101a) A reference region offset which corresponds to the reference region on the target layer C (index c in a VPS), and refers in inter-layer prediction between the target layer C and the reference layer R is derived from reference region offset information which has been coded as reference region information by the parameter set decoding unit 12, and has i and j as indices. The derived reference region offset is referred below to as RRO[c][r]. In addition, reference region offsets and signs thereof which constitute RRO[c][r] and respectively correspond to the left, the top, the right, and the bottom are defined as follows.

Reference region left offset: RRLO[c][r]
Reference region top offset: RRTO[c][r]
Reference region right offset: RRRO[c][r]
Reference region bottom offset: RRBO[c][r]

Each of the offsets RRLO[c][r], RRTO[c][r], RRRO[c][r], and RRBO[c][r] which constitute RRO[c][r] are derived based on the corresponding reference region offset information, by using the following calculations.

$$RRLO[c][r]=(ref\_region\_left\_offset[i][j]<<1)$$

$$RRTO[c][r]=(ref\_region\_top\_offset[i][j]<<1)$$

$$RRRO[c][r]=(ref\_region\_right\_offset[i][j]<<1)$$

$$RRBO[c][r]=(ref\_region\_bottom\_offset[i][j]<<1)$$

Here, a relation of c=i and r=LIdx[i][j] is provided. LIdx[i][j] is an array which is derived based on reference region layer index information which is decoded by the parameter set decoding unit 12. LIdx[i][j] indicates an index in a VPS of a layer associated with the j-th reference region offset information for the layer i.

In a case where reference region offset information corresponding to a combination of i and j which correspond to each other is not provided for a reference region offset (RRO[c][r]) corresponding to a combination of specific c and specific r, a value corresponding to the display region information of the reference layer R (index r in the VPS) is set as values of the offsets constituting RRO[c][r]. That is, in such a case, a display region on the reference layer R is set as a predetermined value of the reference region which is a reference region on the target layer C and refers in the inter-layer prediction between the target layer C and the reference layer R. Specifically, the offsets RRLO[c][r], RRTO[c][r], RRRO[c][r], and RRBO[c][r] constituting RRO[c][r] are set based on the display region information of the reference layer R, by the following expressions.

$$RRLO[c][r]=conf\_win\_left\_offset[r]$$

$$RRTO[c][r]=conf\_win\_top\_offset[r]$$

$$RRRO[c][r]=conf\_win\_right\_offset[r]$$

$$RRBO[c][r]=conf\_win\_bottom\_offset[r]$$

Here, conf_win_left_offset[r], conf_win_top_offset[r], conf_win_right_offset[r], and conf_win_bottom_offset[r] are respectively values of syntax corresponding to pieces of display region position information (conf_win_left_offset, conf_win_top_offset, conf_win_right_offset, and conf_win_bottom_offset) decoded from the SPS to which the reference layer R refers.

(4-2: Method of Adding Control Flag)

A flag (display region-using control flag) indicates whether or not the reference region is set as the display region. The display region-using control flag can be included in a parameter set, be decoded by the parameter set decoding unit 12, and be used in the corresponding reference position deriving processing by the predicted image generation portion 1442. Any of the following flags can be used as the display region-using control flag.

Display region-using control flag A: In a case where a value of the display region-using control flag A is 1, the flag A indicates that the display region is set as a reference region in inter-layer prediction. In a case where the value of the flag is 0, the flag indicates that the entirety of a picture is set as a reference region in the inter-layer prediction.

Display region-using control flag B: In a case where the value of the display region-using control flag B is 1, the flag B indicates that the display region is set as a reference region in inter-layer prediction. In a case where the value of the flag is 0, the flag indicates that a reference region designated by the reference region offset information is set as the reference region.

FIG. 12 illustrates an example of the display region-using control flag A which is decoded by the parameter set decoding unit 12. A display region-using flag A (use_conf_win_il_flag) is included in the SPS extension, and is decoded or coded as a 1-bit flag.

In the corresponding reference position deriving processing, the reference layer reference region is set based on the value of the display region-using control flag A, by the following procedures.

1. In a case where a value of the display region-using flag A is 1, a value of an offset which is included in the display region information and is used for specifying the display region of the reference layer is set for each of the offsets in the reference layer reference region offset.
2. In a case where a value of the display region-using flag A is 0, each of the offsets in the reference layer reference region offset is set to 0.

As described above, the display region-using control flag is used, and thus it is possible to control whether or not the display region is used as the reference region. Thus, even in a case where the display region is used for a purpose which is different from being used as the reference region, in the inter-layer prediction, the reference region in the inter-layer prediction is avoided.

[Supplementary Information 1: Regarding Layer in which Reference Region Position Information Can Be Transmitted]

In the above embodiment and the above modification examples, the reference region position information (reference region offset information) is directly or indirectly associated with two pieces of layer identification information. That is, a certain set of pieces of reference region position information are information indicating the shape and the position of a reference region which is a reference region on a layer A, and refers in inter-layer processing between the layer A and a layer B.

The reference region position information is not necessarily required to be included in coding data for all combinations of the layer A and the layer B. Layer identification information for specifying the layer A or the layer B may be used such that only a piece of reference region position information relating to the necessary combination can be decoded from coding data. For example, a range allowed to obtain the layer B may be limited to a direct reference layer of the layer A. In this case, an index for a list of direct reference layers for the layer A can be used as the layer identification information. Thus, it is possible to reduce a coding amount of the layer identification information. Particularly, in a case where the reference region position information is included in a PPS or a slice header, it is preferable that a range for the layer B be limited to the direct reference layer of the layer A.

In a case where the reference region position information is included in the slice header, the range for the layer B may be limited to an active direct reference layer in a picture including the slice header. In this case, the layer identification information of the layer B can use an index for a list of active direct reference layers in the picture including the slice header.

(Configuration of Hierarchy Video Coding Device)

Figure 14:
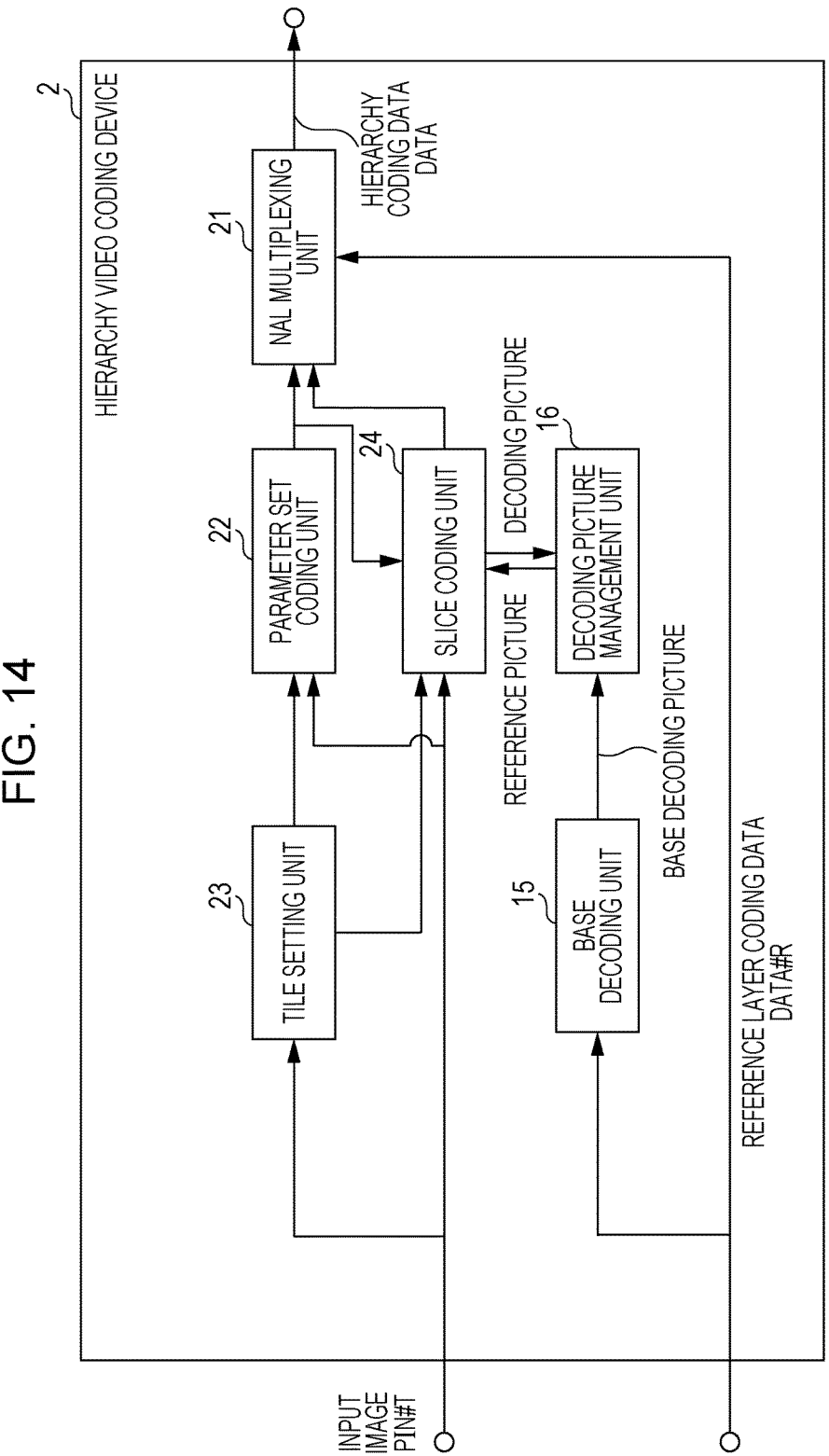
FIG. 14 is a functional block diagram illustrating a schematic configuration of the hierarchy video coding device according to another embodiment of the present invention.

A schematic configuration of the hierarchy video coding device 2 will be described with reference to FIG. 14. FIG. 14 is a functional block diagram illustrating the schematic configuration of the hierarchy video coding device 2. The hierarchy video coding device 2 codes an input image PIN#T of a target layer with reference to reference layer coding data DATA#R, and generates hierarchy coding data DATA of the target layer. It is assumed that the reference layer coding data DATA#R corresponds to a reference layer and is completely coded in the hierarchy video coding device.

As illustrated in FIG. 14, the hierarchy video coding device 2 includes a NAL multiplexing unit 21, a parameter set coding unit 22, a tile setting unit 23, a slice coding unit 24, a decoding picture management unit 16, and a base decoding unit 15.

The NAL multiplexing unit 21 generates hierarchy video coding data DATA and outputs the generated hierarchy video coding data DATA to the outside thereof. The hierarchy video coding data DATA is generated in such a manner that target layer coding data DATA#T and reference layer coding data DATA#R which have been input are stored in a NAL unit so as to perform NAL multiplexing.

The parameter set coding unit 22 sets a parameter set (VPS, SPS, and PPS) used when an input image is coded, based on tile information and the input image which have been input. The parameter set coding unit 22 performs packetization as a portion of the target layer coding data DATA#T in a format of a VCL NAL, and supplies a result of packetization to the NAL multiplexing unit 21.

The parameter set coded by the parameter set coding unit 22 includes at least picture information, display region information, and reference region information which are described in association with the hierarchy video decoding device 1.

The tile setting unit 23 sets tile information of a picture based on the input image, and supplies the set tile information to the parameter set coding unit 22 and the slice coding unit 24. For example, tile information indicating that a picture size is divided into M×N pieces of tiles. Here, M and N are certain positive integers.

The slice coding unit 24 codes a portion of the input image, which corresponds to a slice constituting the picture, based on the input image, the parameter set, and the tile information which have been input, and a reference picture recorded in the decoding picture management unit 16. The slice coding unit 24 generates coding data of the coded portion, and supplies the generated coding data to the NAL multiplexing unit 21, as a portion of the target layer coding data DATA#T. The slice coding unit 24 will be described in detail later.

The decoding picture management unit 16 is the same component as the decoding picture management unit 16 included in the above-described hierarchy video decoding device 1. However, in the decoding picture management unit 16 included in the hierarchy video coding device 2, it is not necessary that a picture recorded in the internal DPB is output as an output picture. Thus, the output can be omitted. The descriptions of "decoding" in the descriptions for the decoding picture management unit 16 of the hierarchy video decoding device 1 is replaced with those of "coding", and this can be also applied to the decoding picture management unit 16 in the hierarchy video coding device 2.

The base decoding unit 15 is the same component as the base decoding unit 15 included in the above-described hierarchy video decoding device 1, and thus detailed descriptions thereof will be omitted.

(Slice Coding Unit)

Figure 15:
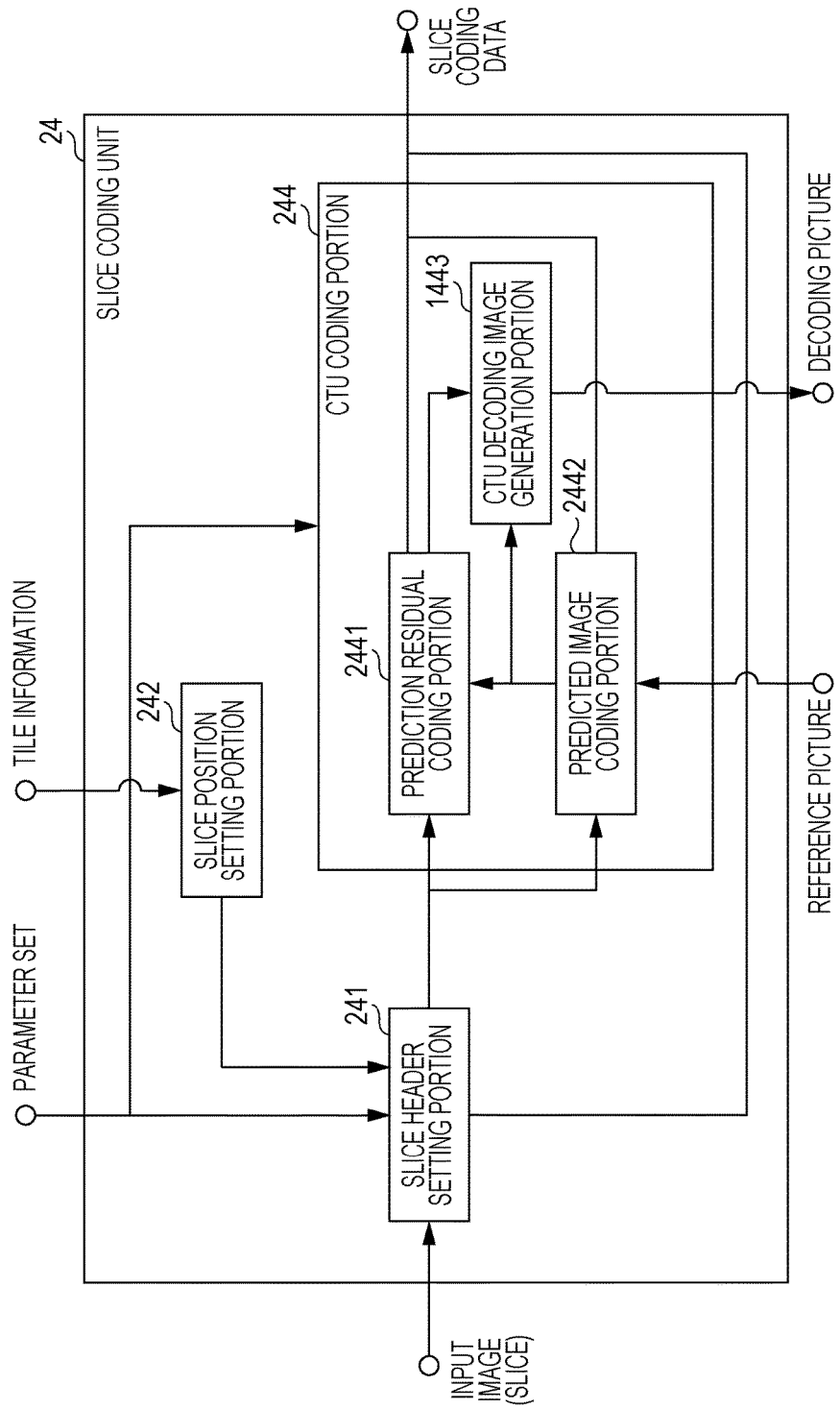
FIG. 15 is a functional block diagram illustrating an example of a configuration of a slice coding unit included in the hierarchy video coding device.

Next, a configuration of the slice coding unit 24 will be described in detail with reference to FIG. 15. FIG. 15 is a functional block diagram illustrating a schematic configuration of the slice coding unit 24.

As illustrated in FIG. 15, the slice coding unit 24 includes a slice header setting portion 241, a slice position setting portion 242, and a CTU coding portion 244. The CTU coding portion 244 includes a prediction residual coding portion 2441, a predicted image coding portion 2442, and a CTU decoding image generation portion 1443 therein.

The slice header setting portion 241 generates a slice header based on the input parameter set and slice position information. The slice header is used for coding an input image which is input in a unit of a slice. The generated slice header is output as a portion of slice coding data, and is supplied to the CTU coding portion 244 in combination with the input image.

The slice header generated by the slice header setting portion 241 includes at least SH slice position information.

The slice position setting portion 242 determines a slice position in the picture based on the input tile information, and supplies the determined slice position to the slice header setting portion 241.

The CTU coding portion 244 codes the input image (target slice portion) in a unit of a CTU, based on the parameter set and the slice header which have been input. The CTU coding portion 244 generates and outputs slice data and a decoding image (decoding picture) which relates to a target slice. The CTU is coded by the predicted image coding portion 2442, the prediction residual coding portion 2441, and the CTU decoding image generation portion.

The predicted image coding portion 2442 determines a prediction method and a prediction parameter of a target CTU included in the target slice. The predicted image coding portion 2442 generates a predicted image based on the determined prediction method, and outputs the generated predicted image to the prediction residual coding portion 2441 and the CTU decoding image generation portion 1443. Information of the prediction method or the prediction parameter is subjected to variable length coding as prediction information (PT information). The information subjected to the variable length coding is output as a portion of slice data included in slice coding data. The prediction method selectable in the predicted image coding portion 2442 includes at least the inter-layer image prediction.

In a case where the inter-layer image prediction is selected as the prediction method, the predicted image coding portion 2442 performs the corresponding reference position deriving processing. The predicted image coding portion 2442 determines a reference layer pixel position corresponding to a prediction target pixel, and determines a prediction pixel value based on the determined position, by interpolation processing. As the corresponding reference position deriving processing, the processes described for the predicted image generation portion 1442 of the hierarchy video decoding device 1 can be applied. For example, the process (which is described with reference to FIG. 1) of deriving a corresponding reference position based on the reference region information which is included in the parameter set is applied.

The prediction residual coding portion 2441 outputs a quantization transform coefficient (TT information) as a portion of the slice data included in the slice coding data. The quantization transform coefficient is obtained by transforming and quantizing a differential image between the input image and the predicted image which have been input. The prediction residual coding portion 2441 applies reverse transform and reverse quantization to the quantization transform coefficient, so as to restore a prediction residual. The prediction residual coding portion 2441 outputs the restored prediction residual to the CTU decoding image generation portion 1443.

The CTU decoding image generation portion 1443 has the same component and the same function as those of the hierarchy video decoding device 1, which have the same name. Thus, the CTU decoding image generation portion 1443 is denoted by the same reference sign, and descriptions thereof will be omitted.

(Advantages of Video Coding Device 2)

The above-described hierarchy video coding device (hierarchy image coding device) 2 according to the embodiment includes the parameter set coding unit 22 that codes a parameter set, and the predicted image coding portion 2442 that generates a predicted image with reference to a decoding pixel of a reference layer picture, by the inter-layer prediction. The parameter set coding unit 22 codes reference region information. The predicted image coding portion 2442 derives a corresponding reference position to a pixel on the target layer, by using the target layer reference region offset and the value of the reference layer reference region information which have been derived from the reference region information.

Thus, the hierarchy video coding device 2 appropriately set the reference region information. Accordingly, even in a case where hierarchy coding data is transformed for the purpose represented as interest region extraction, the corresponding reference position to a pixel of the target layer corresponding to a position can be derived so as to be the same as the position before and after transform. At this time, since the corresponding reference position is derived from the reference region information, based on a reference region of the target layer and the reference layer which are used for calculating a scale. Thus, it is possible to realize a function of deriving corresponding reference positions which are the same as each other before and after transform, by using syntax elements of which the number is smaller than that in the related art.

[Hierarchy Coding Data Transform Device 3]

Figure 16:
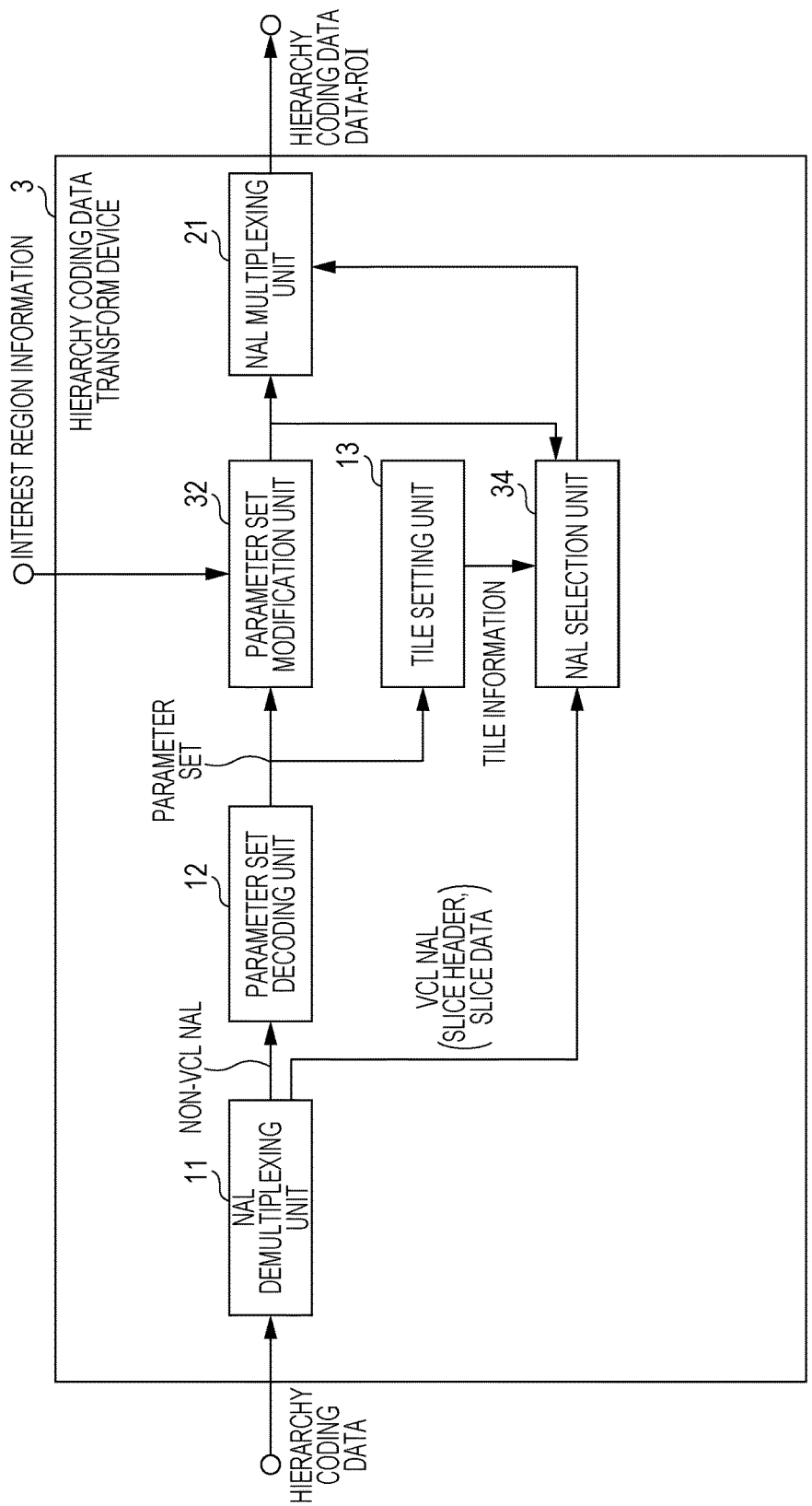
FIG. 16 is a functional block diagram illustrating a schematic configuration of a hierarchy coding data transform device according to still another embodiment of the present invention.

A schematic configuration of the hierarchy coding data transform device 3 will be described with reference to FIG. 16. FIG. 16 is a functional block diagram illustrating the schematic configuration of the hierarchy coding data transform device 3. The hierarchy coding data transform device 3 transforms the input hierarchy coding data DATA, and generates hierarchy coding data DATA-ROI which relates to input interest region information. The hierarchy coding data DATA is hierarchy coding data generated by the hierarchy video coding device 2. The hierarchy coding data DATA-ROI is input to the hierarchy video decoding device 1, and thus it is possible to reproduce a video which has a higher layer, and relates to the interest region information.

As illustrated in FIG. 16, the hierarchy coding data transform device 3 includes a NAL demultiplexing unit 11, a NAL multiplexing unit 21, a parameter set decoding unit 12, a tile setting unit 13, a parameter set modification unit 32, and a NAL selection unit 34.

Each of the NAL demultiplexing unit 11, the parameter set decoding unit 12, and the tile setting unit 13 includes the same component and the same function as each of those which are have the same names and are included in the hierarchy video decoding device 1. Thus, the NAL demultiplexing unit 11, the parameter set decoding unit 12, and the tile setting unit 13 are denoted by the same reference sign, and descriptions thereof will be omitted.

The NAL multiplexing unit 21 has the same component and the same function as that which has the same name and is included in the hierarchy video coding device 2. Thus, the NAL multiplexing unit 21 is denoted by the same reference sign, and descriptions thereof will be omitted.

The parameter set modification unit 32 modifies and outputs the input parameter set information based on the interest region information and the tile information which have been input. The parameter set modification unit 32 schematically modifies picture information, display region information, inter-layer pixel corresponding information, reference region information, and PPS tile information which are included in the parameter set.

The interest region information corresponds to a partial region of a picture designated by a user (for example, viewer of a reproduced video), in the picture constituting a video. The interest region information is designated as a rectangular region, for example. In this case, for example, offsets of positions from sides (upper side, a lower side, a left side, and a right side) corresponding to the entirety of a rectangular picture which indicates an interest region and has an upper side, a lower side, a left side, and a right side can be designated as the interest region information. A region (for example, region of a circle or a polygon, or region indicating an object extracted by object extraction) having a shape other than a rectangle may be used as the interest region. However, in the following descriptions, a rectangular interest region is assumed for simple descriptions. In a case where details described as follows are applied to a region having a shape other than a rectangle, for example, a rectangle which encloses the interest region and has the smallest area can be considered as the interest region and be applied in the following descriptions.

(Outline of Transform Processing)

Figure 17:
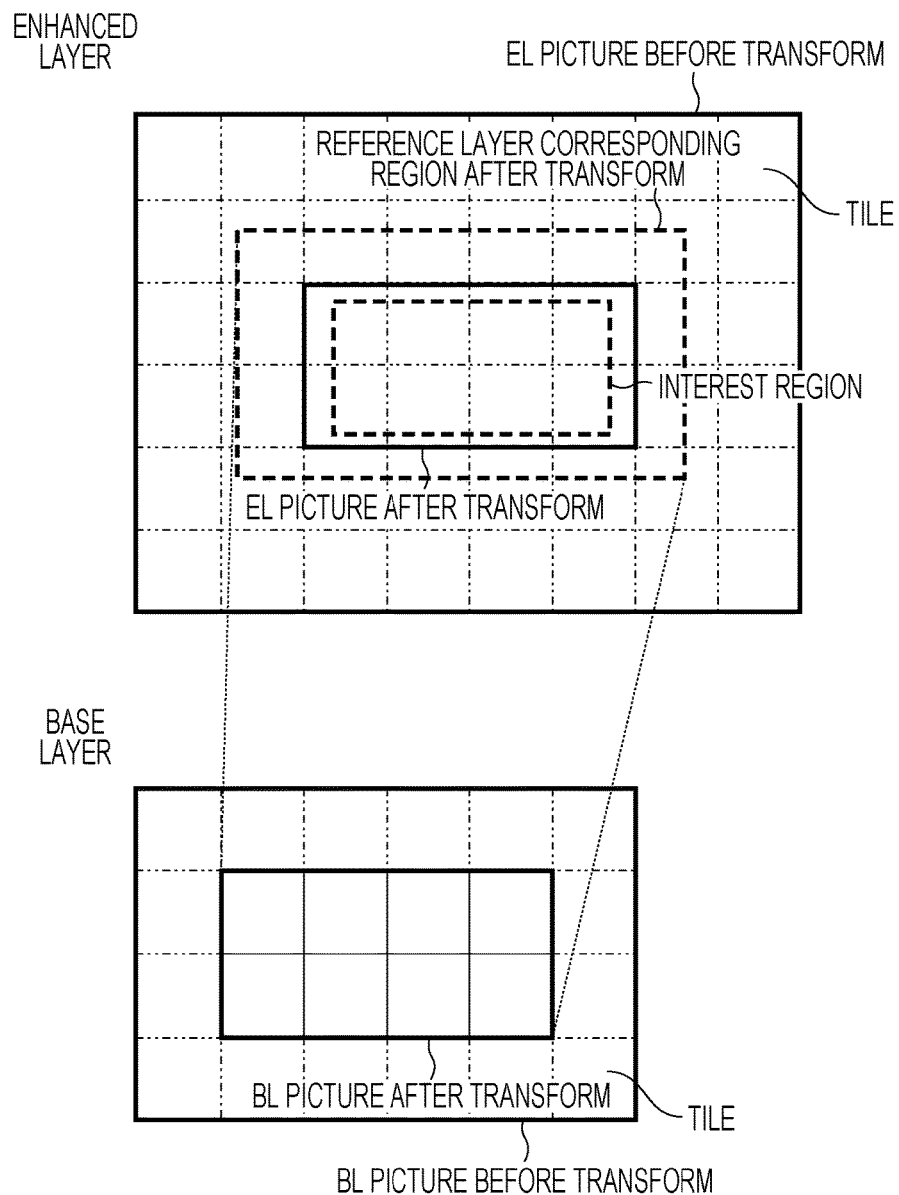
FIG. 17 is a diagram illustrating an example of a relation between a picture, an interest region, and a tile in hierarchy coding data before and after transform.

Firstly, an outline of parameter set modification by transform processing will be described with reference to FIG. 17. FIG. 17 is a diagram illustrating an example of a relation between a picture, an interest region, and a tile in hierarchy coding data before and after transform. The transform processing is performed by the hierarchy coding data transform device 3. FIG. 17 illustrates a relation between pictures before and after transform, in a case where hierarchy coding data (hierarchy coding data before transform) configured from two layers of an enhanced layer and a base layer is transformed, and thus hierarchy coding data (hierarchy coding data after transform) including an interest region is generated. The enhanced layer of the hierarchy coding data before transform is data corresponding to an EL picture before transform. The base layer is data corresponding to a BL picture before transform. Similarly, an enhanced layer of hierarchy coding data after transform is data corresponding to an EL picture after transform. A base layer is data corresponding to a BL picture after transform.

Schematically, the hierarchy coding data transform device 3 removes a tile which does not have a region overlapping the interest region, on the enhanced layer from the input hierarchy coding data before transform. The hierarchy coding data transform device 3 modifies a parameter set to be associated, and thus generates hierarchy coding data after transform. The hierarchy video decoding device can generate a decoding image relating to the interest region by using the hierarchy coding data after transform, as an input.

(Modification of Tile Information)

The parameter set modification unit 32 updates PPS tile information of the enhanced layer with reference to the interest region information and the tile information which have been input, such that a portion of the corresponding region includes only a tile (extraction target tile) overlapping the interest region. The parameter set modification unit 32 updates the PPS tile information of the enhanced layer based on information of the extraction target tile. Firstly, in a case where the number of extraction target tiles is 1, the parameter set modification unit 32 modifies tiles_enabled_flag to be 0. In a case where the number of extraction target tiles is equal to or more than 2, the modification processing can be omitted. Then, the parameter set modification unit 32 modifies (num_tile_columns_minus1) which indicates the number of tile columns, and modifies (num_tile_rows_minus1) which indicates the number of tile rows, based on the number of pieces of extraction target tiles which are included in a picture in the horizontal direction and the vertical direction. Then, in a case where the tile size is not uniform (uniform_spacing_flag is 0), a bit string corresponding to syntax which relates to the width of the tile rows which does not include the extraction target tile, and the height of the tile columns which does not include the extraction target tile is deleted from the parameter set.

In addition, the parameter set modification unit 32 removes a tile which is unnecessary for decoding a tile extracted in the enhanced layer, among tiles included in the BL picture before transform. For example, the parameter set modification unit 32 updates the PPS tile information of the base layer such that a region (reference layer corresponding region after transform) corresponding to the BL picture after transform, on the enhanced layer encloses the EL picture after transform.

(Modification of Picture Information)

The parameter set modification unit 32 sets a region corresponding to a set of extraction target tiles of the enhanced layer, as an EL picture size after transform, and modifies picture information. The parameter set modification unit 32 respectively sets the width and the height of the EL picture after transform, as values of pic_width_in_luma_samples and pic_height_in_luma_samples of the enhanced layer SPS.

In addition, the parameter set modification unit 32 sets a region corresponding to a set of extraction target tiles of the base layer, as a BL picture size after transform, and modifies the picture information. The parameter set modification unit 32 respectively sets the width and the height of the BL picture after transform, as values of pic_width_in_luma_samples and pic_height_in_luma_samples of the base layer SPS.

(Modification of Inter-Layer Pixel Corresponding Information)

The parameter set modification unit 32 modifies inter-layer pixel corresponding information which is included in the parameter set, considering a change of the picture size. Specifically, the parameter set modification unit 32 modifies a reference region offset included in the inter-layer pixel corresponding information. Here, for descriptions, a layer identifier of the enhanced layer is set as e, and a layer identifier of the base layer is set as b. A value is obtained in such a manner that a distance between an upper-left pixel of the EL picture before transform and an upper-left pixel of the EL picture after transform in the horizontal direction is expressed in a unit of two pixels. A negative value of an absolute value of the obtained value is set to be a value (b=rLIdx[e][k]) of a reference region left offset ref_region_right_offset[e][k] (which is included in the reference region offset) for a reference region which is a reference region on the layer e, and refers in inter-layer prediction between the layer e and the layer b. In addition, a value is obtained in such a manner that a distance between an upper-left pixel of the BL picture before transform and an upper-left pixel of the BL picture after transform in the horizontal direction is expressed in a unit of two pixels. A negative value of an absolute value of the obtained value is set to be a value (e=rLIdx[b][l]) of a reference region left offset ref_region_right_offset[b][l] for a reference region which is a reference region on the layer b and refers in inter-layer prediction between the layer b and the layer e. Values of the reference region offsets corresponding to the top, the right, and the bottom are similarly set.

(Modification of Display Region Information)

The parameter set modification unit 32 revises display region information of an SPS, which is included in the input parameter set, so as to match with the interest region which is indicated by the input interest region information. For example, the display region information is revised by the following procedures of S301 to S303.

(S301) It is determined whether or not the interest region matches with the entirety of the picture. In a case of matching, the process proceeds to S302. In a case of not matching, the process proceeds to S303.

(S302) In a case where the value of the display region flag before overwriting is 1, the value of the display region flag is overwritten so as to be 0, and the display region offset (conf_win_left_offset, conf_win_right_offset, conf_win_top_offset, and conf_win_bottom_offset) are removed from the SPS. Then, the processing is ended.

(S303) The value of the display region flag is overwritten so as to be 1. Each offset of the display region offsets is set to be a value of an offset of a position on the corresponding side of a picture to each side of a rectangle for indicating the interest region. For example, a position offset of an interest region upper side for a picture upper side is set to be a value of the display region top offset (conf_win_top_offset). In a case where the value of the display region flag before revision is 1, a value of the original interest region offset is overwritten by using the set value of the interest region offset. In a case where the value of the display region flag before revision is 1, the set interest region offset is inserted just after the display region flag of an SPS.

The NAL selection unit 34 selects a video coding layer NAL (VCL NAL) to be input, based on the interest region information and the tile information which have been input. The selected VCL NAL is sequentially output to the NAL multiplexing unit 21, and a VCL NAL which does not have been selected is discarded.

The VCL NAL selected by the NAL selection unit 34 is a VCL NAL which includes a slice header and slice data relating to a slice which is included in the extraction target tile. The NAL selection unit 34 determines whether the slice is included in the extraction target tile, based on a slice address included in the slice header, and tile information. In a case of being included, the NAL selection unit 34 selects a VCL NAL including the slice. In a case of not being included, the VCL NAL is discarded.

(Hierarchy Coding Data Transform Processing Flow)

Procedures indicated by S501 to S506 are sequentially performed, so as to realize hierarchy coding data transform processing performed by the hierarchy coding data transform device 3.

(S501) The NAL demultiplexing unit 11 performs demultiplexing of the input hierarchy coding data DATA. The NAL demultiplexing unit 11 outputs a portion (non-VCL NAL) relating to the parameter set, to the parameter decoding unit 12, and outputs a video coding layer NAL(VCL NAL) which is a portion relating to a slice layer (slice header, slice data), to the NAL selection unit 34.

(S502) The parameter set decoding unit 12 decodes the parameter set (VPS, SPS, and PPS) from the input non-VCL NAL, and outputs the decoded parameter set to the parameter set modification unit 32 and the tile setting unit 13.

(S503) The tile setting unit 13 derives tile information from the input parameter set, and outputs the derived tile information to the parameter set modification unit 32 and the NAL selection unit 34.

(S504) The parameter set modification unit 32 modifies and outputs the input parameter set based on the interest region information and the tile information which have been input.

(S505) The NAL selection unit 34 selects some of the input VCL NALs based on the tile information and the interest region information which have been input, and outputs the selected VCL NAL to the NAL multiplexing unit 21.

(S506) The NAL multiplexing unit 21 sets the input parameter set after modification, and the slice header and the slice data after modification, as coding data of the target layer after modification. The NAL multiplexing unit 21 performs multiplexing with the input reference layer coding data DATA#R, and outputs a result of multiplexing as the hierarchy coding data DATA-ROI, to the outside thereof.

(Advantages of Hierarchy Coding Data Transform Device 3)

The above-described hierarchy coding data transform device 3 according to the embodiment includes the NAL selection unit 34 and the parameter set modification unit 32. The NAL selection unit 34 modifies a portion of coding data (VCL NAL) of a video layer included in coding data of the target layer (higher layer), based on the interest region information. The NAL selection unit 34 selects a tile having a region which overlaps an interest region, as the extraction target tile, based on the interest region which is indicated by the interest region information. Coding data of a video layer relating to a slice included in the selected extraction target tile is included in the hierarchy coding data after transform. The parameter set modification unit 32 modifies picture information, PPS tile information, display information, and reference region information based on the interest region information and the tile information.

According to the above hierarchy coding data transform device 3, the input hierarchy coding data is transformed, a VCL NAL relating to the extraction target tile (tile having a region overlapping the interest region) in the higher layer is extracted, and thus hierarchy coding data after transform can be configured. Since the VCL NAL relating to a tile which does not have a region overlapping the interest region is discarded, a coding amount of the hierarchy coding data after transform is smaller than that of the hierarchy coding data before transform. According to the above hierarchy coding data transform device 3, the picture information, the PPS tile information, and the display information are modified with combining of the parameter set with the extraction target tile. Thus, the hierarchy coding data after transform can be decoded by the hierarchy video decoding device, and a decoding picture relating to the interest region can be displayed. In addition, since the reference region information is modified, a correspondence relation of a scale and a correspondence relation between a pixel of the higher layer and a pixel of the reference layer, in hierarchy coding data before and after transform are maintained. Thus, a predicted image of inter-layer prediction, which is generated by coding data after transform can be maintained so as to be substantially the same as a predicted image of inter-layer prediction, which is generated by coding data after transform.

[Interest Region Display System]

A system (interest region display system SYS) which displays the interest region information can be configured by combining the hierarchy video decoding device 1, the hierarchy video coding device 2, and the hierarchy coding data transform device 3 which are described above.

Figure 18:
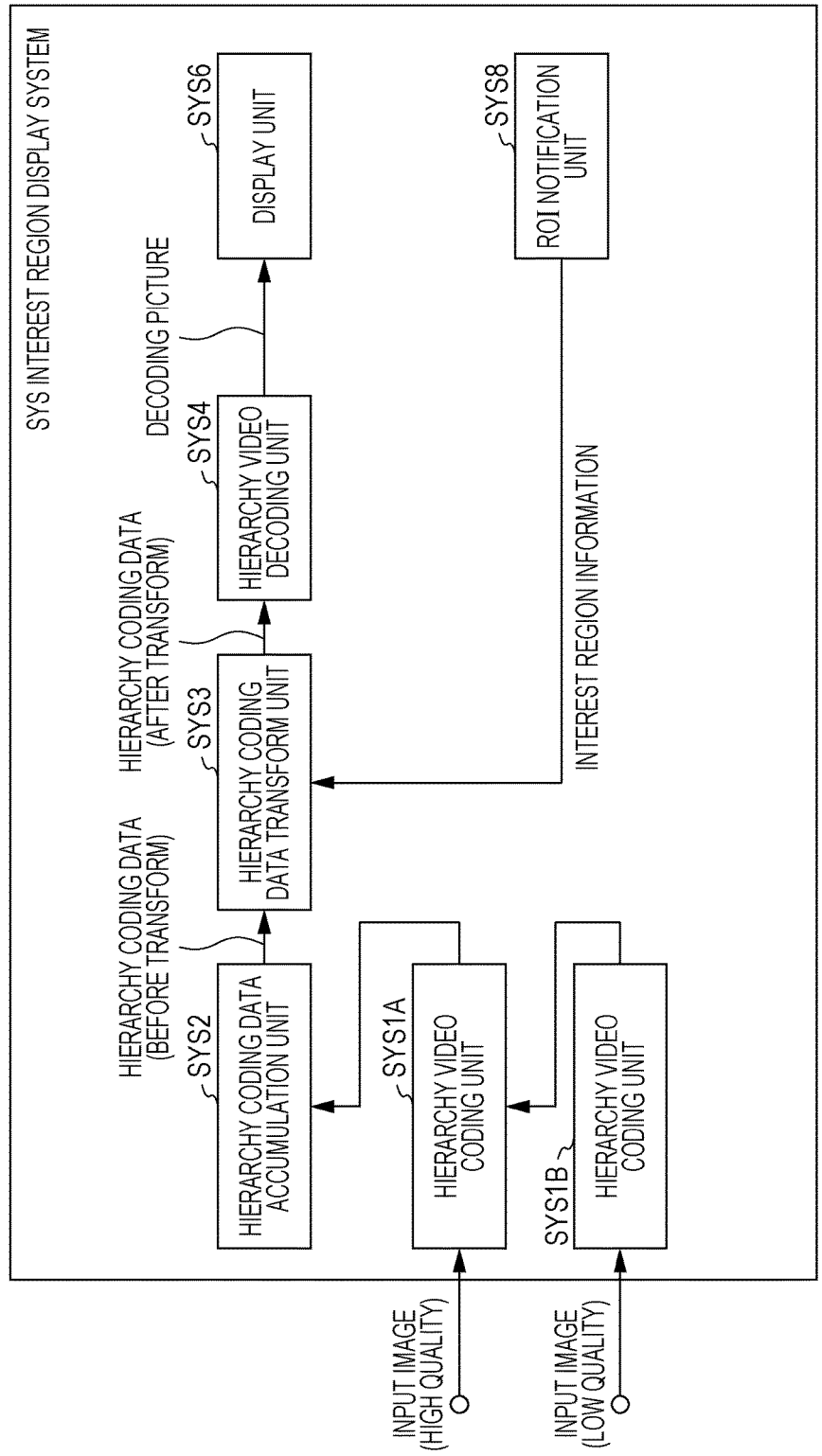
FIG. 18 is a block diagram illustrating a configuration of an interest region display system which is realized by combining the hierarchy video decoding device, the hierarchy video coding device, and the hierarchy coding data transform device.

An example in which the interest region display system is configured by combining the hierarchy video decoding device 1, the hierarchy video coding device 2, and the hierarchy coding data transform device 3 which are described above will be described based on FIG. 18. FIG. 18 is a block diagram illustrating a configuration of the interest region display system obtained by combining the hierarchy video decoding device 1, the hierarchy video coding device 2, and the hierarchy coding data transform device 3. In the interest region display system SYS, schematically, input images which have quality different from each other are hierarchically coded, and accumulated. Hierarchy coding data accumulated in accordance with the interest region information from a user is transformed and provided, and the transformed hierarchy coding data is decoded. Thus, a reproduction image which relates to the interest region (ROI) and has high quality is displayed.

As illustrated in FIG. 18, the interest region display system SYS includes a hierarchy video coding unit SYS1A, a hierarchy video coding unit SYS1B, a hierarchy coding data accumulation unit SYS2, a hierarchy coding data transform unit SYS3, a hierarchy video decoding unit SYS4, a display unit SYS6, and a ROI notification unit SYS8, as components.

The above-described hierarchy video coding device 2 can be used in the hierarchy video coding units SYS1A and SYS1B.

The hierarchy coding data accumulation unit SYS2 accumulates pieces of hierarchy coding data, and supplies hierarchy coding data if necessary. As the hierarchy coding data accumulation unit SYS2, a computer including a recording medium (memory, hard disk, optical disc) can be used.

The above-described hierarchy coding data transform unit 3 can be used in the hierarchy coding data transform unit SYS3. Thus, the hierarchy coding data transform unit SYS3 can set reference region information which is included in the input hierarchy coding data, to be an appropriate value in accordance with the input interest region.

The above-described hierarchy video decoding device 1 can be used in the hierarchy video decoding unit SYS4. Thus, the hierarchy video decoding unit SYS4 can decode reference region information from a parameter set, and can perform inter-layer prediction with reference to the decoded reference region information.

The display unit SYS6 displays a decoding image at a predetermined display position in a predetermined display region. For example, the display region is a screen of a television, and the display position is the entirety of the screen. It is preferable that the display unit SYS6 enlarges or reduces input decoding image so as to cause the size of the input decoding image to match with the size of the display region, and thus performs display.

The ROI notification unit SYS8 performs a notification of interest region information which is designated by a user using a predetermined method. For example, a user designates a region corresponding to an interest region, on the display region in which the whole display image is displayed. Thus, the interest region can be transmitted to the ROI notification unit. In a case where designation from a user is not performed, the ROI notification unit SYS8 performs a notification of information indicating that there is no interest region, as the interest region information.

(Flow of Interest Region Display System)

Processing performed by the interest region display system can be divided into hierarchy coding data generation and accumulation processing and interest region data generation and reproduction processing.

In the hierarchy coding data generation and accumulation processing, pieces of hierarchy coding data are generated from input images which have quality different from each other, and are accumulated. The hierarchy coding data generation and accumulation processing is performed by procedures of T101 to T103.

(T101) The hierarchy video coding unit SYS1B codes the input image which has been input and has low quality, and supplies the generated hierarchy coding data to the hierarchy video coding unit SYS1A. That is, the hierarchy video coding unit SYS1B generates and outputs hierarchy coding data which is used as a reference layer (lower layer) in the hierarchy video coding unit SYS1A, from an input image.

(T102) The hierarchy video coding unit SYS1A codes the input image which has been input and has high quality by using the input hierarchy coding data as coding data of a reference layer. The hierarchy video coding unit SYS1A generates hierarchy coding data and outputs the generated hierarchy coding data to the hierarchy coding data accumulation unit SYS2.

(T103) The hierarchy coding data accumulation unit SYS2 adds an appropriate index to the input hierarchy coding data, and records a result of addition in an internal recording medium.

In the interest region data generation and reproduction processing, hierarchy coding data is read from the hierarchy coding data accumulation unit SYS2. The read hierarchy coding data is transformed to be hierarchy coding data corresponding to an interest region, and the transformed hierarchy coding data is decoded. The decoded hierarchy coding data is reproduced and displayed. The interest region data generation and reproduction processing is performed by the following procedures of T201 to T205.

(T201) Hierarchy coding data relating to a video which has been selected from a user is supplied to the hierarchy coding data transform unit SYS3 from the hierarchy coding data accumulation unit SYS2.

(T202) The ROI notification unit SYS8 notifies hierarchy coding data transform unit SYS3 of the interest region information which has been designated by the user.

(T203) The hierarchy coding data transform unit SYS3 transforms the input hierarchy coding data based on the input interest region information, and outputs the transformed hierarchy coding data to the hierarchy video decoding unit SYS4.

(T204) The hierarchy video decoding unit SYS4 decodes the input hierarchy video coding data (after transform), and outputs a decoding picture of the obtained higher layer to the display unit SYS6.

(T205) The display unit SYS6 displays the input decoding image.

(Advantages of Interest Region Display System SYS)

The above-described interest region display system SYS according to the embodiment includes the interest region notification unit (ROI notification unit SYS8) which supplies interest region information, the hierarchy coding data transform unit SYS3 which transforms hierarchy coding data based on the interest region information, so as to generate hierarchy coding data after transform, the hierarchy video decoding unit SYS4 which decodes the hierarchy coding data after transform, and outputs decoding pictures of the higher layer and the lower layer, and the display unit SYS6.

According to the above interest region display system SYS, it is possible to display a decoding picture of a region designated by the interest region information. At this time, the decoding picture of the region designated by the interest region information is decoded from coding data of the higher layer of the hierarchy coding data, by using inter-layer image prediction. The inter-layer image prediction uses a scale and a corresponding reference position which are derived based on the reference region information. Thus, image quality is high. In addition, the hierarchy coding data which has been transformed based on the interest region has a coding amount smaller than the hierarchy coding data. Accordingly, it is possible to reduce a bandwidth required for transmitting hierarchy coding data, and to reproduce a decoding picture which relates to the interest region and has high image quality, by using the above interest region display system SYS.

Embodiment 2

A hierarchy video decoding device 3 according to another embodiment of the present invention will be described as follows, with reference to FIGS. 21 to 24.

[Hierarchy Video Decoding Device]

A schematic configuration of the hierarchy video decoding device 3 will be described. The hierarchy video decoding device 3 has a configuration in which, in the hierarchy video decoding device 1 which has been described with reference to FIG. 5, the parameter set decoding unit 12 is replaced with a parameter set decoding unit 12A, and the slice decoding unit 14 is replaced with a slice decoding unit 14A. That is, the hierarchy video decoding device 3 includes the NAL demultiplexing unit 11, the parameter set decoding unit 12A, the tile setting unit 13, the slice decoding unit 14A, the base decoding unit 15, and the decoding picture management unit 16. In the following descriptions, the parameter decoding unit 12A and the slice decoding unit 14A which are new components will be described.

(Parameter Set Decoding Unit 12A)

(Inter-Layer Position Corresponding Information)

The parameter set decoding unit 12A decodes inter-layer position corresponding information from the input target layer coding data. The inter-layer position corresponding information schematically indicates a positional relation between corresponding regions of the target layer and the reference layer. For example, in a case where a certain object (object A) is included in a picture of a target layer and a picture of a reference layer, a region on the picture of the target layer, which corresponds to the object A, and a region on the picture of the reference layer, which corresponds to the object A correspond to the corresponding regions between the target layer and the reference layer. The inter-layer position corresponding information may be not necessarily information which accurately indicates the positional relation between the corresponding regions of the target layer and the reference layer. However, generally, the inter-layer position corresponding information indicates an accurate positional relation between the corresponding regions of the target layer and the reference layer, in order to improve accuracy of inter-layer prediction.

In this embodiment, the inter-layer position corresponding information includes scaled reference layer offset information, reference layer offset information, and inter-layer phase information.

(Inter-Layer Position Corresponding Information: Scaled Reference Layer Offset Information)

The inter-layer position corresponding information includes information for defining an scaled reference layer offset. A plurality of scaled reference layer offsets may be included in coding data. Each of the scaled reference layer offsets is configured from 4 offsets which respectively correspond to the left, the top, the right, and the bottom. Each of the scaled reference layer offsets is associated with a combination of two pictures of a target picture and a reference picture. In other words, information for defining the corresponding scaled reference layer offset is included in the inter-layer position corresponding information for each combination of the target picture and a specific reference picture. It is not necessary that the information for defining the corresponding scaled reference layer offset is included for the combination of the target picture and the reference picture. Some combinations can be omitted under a specific condition, and predefined values can be used.

The meaning of each of the offsets constituting the scaled reference layer offset will be described with reference to FIG. 21. FIG. 21 is a diagram illustrating a relation between a target layer picture, a reference layer picture, and an inter-layer pixel corresponding offset.

FIG. 21(*a*) illustrates an example of a case where the entire picture of the reference layer corresponds to a portion of a picture of the target layer. In this case, a region (target layer corresponding region) on the target layer, which corresponds to the entirety of a reference layer picture is included in the target layer picture. FIG. 21(*b*) illustrates an example of a case where a portion of a picture of the reference layer corresponds to the entire picture of the target layer. In this case, a target layer picture is included in the reference layer corresponding region. The offsets are included in the entirety of the target layer picture.

As illustrated in FIG. 21, an scaled reference layer left offset (in FIG. 21, SRL left offset) indicates an offset of a reference layer corresponding region left side from a target layer picture left side. In a case where the SRL left offset is more than 0, this indicates that the reference layer corresponding region left side is positioned on the right side of the target layer picture left side.

An scaled reference layer upper offset (in FIG. 21, SRL upper offset) indicates an offset of a reference layer corresponding region upper side from a target layer picture upper side. In a case where the SRL upper offset is more than 0, this indicates that the reference layer corresponding region upper side is positioned on a lower side of the target layer picture upper side.

An scaled reference layer right offset (in FIG. 21, SRL right offset) indicates an offset of a reference layer corresponding region right side from a target layer picture right side. In a case where the SRL right offset is more than 0, this indicates that the reference layer corresponding region right side is positioned on the left side of the target layer picture right side.

An scaled reference layer lower offset (in FIG. 21, SRL lower offset) indicates an offset of a reference layer corresponding region lower side from a target layer picture lower side. In a case where the SRL lower offset is more than 0, this indicates that the reference layer corresponding region lower side is positioned on an upper side of the target layer picture lower side.

(Inter-Layer Position Corresponding Information: Reference Layer Offset Information)

The inter-layer position corresponding information includes information (reference layer offset information) for defining a reference layer offset. A plurality of reference layer offsets may be included in coding data. Each of the reference layer offsets is configured from 4 offsets which respectively correspond to the left, the top, the right, and the bottom. Each of the reference layer offsets is associated with a combination of two pictures of a target picture and a reference picture. In other words, the corresponding reference layer offset is included in inter-layer pixel corresponding information, for each combination of the target picture and a specific reference picture.

A reference layer left offset indicates an offset of a reference layer base region left side from a reference layer picture left side. In a case where an offset value is more than 0, this indicates that the reference layer base region left side is positioned on the right side of the reference layer picture left side.

A reference layer upper offset indicates an offset of a reference layer base region upper side from a reference layer picture upper side. In a case where an offset value is more than 0, this indicates that the reference layer base region upper side is positioned on a lower side of the reference layer picture upper side.

A reference layer right offset indicates an offset of a reference layer base region right side from a reference layer picture right side. In a case where an offset value is more than 0, this indicates that the reference layer base region right side is positioned on the left side of the reference layer picture right side.

A reference layer lower offset indicates an offset of a reference layer base region lower side from a reference layer picture lower side. In a case where an offset value is more than 0, this indicates that the reference layer base region lower side is positioned on an upper side of the reference layer picture lower side.

(Inter-Layer Position Corresponding Information: Inter-Layer Phase Information)

The inter-layer phase information includes information (inter-layer phase offset) which indicates a phase difference between layers. A plurality of inter-layer phases may be included in coding data. Each inter-layer phase offset is configured from 4 offsets which respectively correspond to a luminance horizontal direction, a luminance vertical direction, a chrominance horizontal direction, and a chrominance vertical direction. Each inter-layer phase offset is associated with a combination of two pictures of a target picture and a reference picture. In other words, the corresponding inter-layer phase offset is included in the inter-layer pixel corresponding information for each combination of the target picture and a specific reference picture.

An inter-layer phase luminance horizontal offset indicates a shift between a reference layer corresponding region upper-left pixel and a pixel on the reference layer, which corresponds to the pixel, in the horizontal direction, on a luminance image of the target layer. The shift is less than one pixel.

An inter-layer phase luminance vertical offset indicates a shift between a reference layer corresponding region upper-left pixel and a pixel on the reference layer, which corresponds to the pixel, in the vertical direction, on the luminance image of the target layer. The shift is less than one pixel.

An inter-layer phase chrominance horizontal offset indicates a shift between a reference layer corresponding region upper-left pixel and a pixel on the reference layer, which corresponds to the pixel, in the horizontal direction, on a chrominance image of the target layer. The shift is less than one pixel.

An inter-layer phase chrominance vertical offset indicates a shift between a reference layer corresponding region upper-left pixel and a pixel on the reference layer, which corresponds to the pixel, in the vertical direction, on the chrominance image of the target layer. The shift is less than one pixel.

(Syntax of Inter-Layer Position Corresponding Information)

Next, scaled reference layer offset information, reference layer offset information, and inter-layer phase offset information which are included in coding data, and are decoded by the parameter set decoding unit 12A will be described.

The scaled reference layer offset information, the reference layer offset information, and the inter-layer phase offset information are included in, for example, PPS extension which is a portion of a PPS of a higher layer. The pieces of information are decoded in accordance with a syntax table illustrated in FIG. 22. FIG. 22 illustrates a portion of a syntax table to which the parameter set decoding unit 12A refers when a PPS is decoded. The portion of the syntax table is a portion relating to the inter-layer pixel corresponding information.

The scaled reference layer offset information decoded from the PPS includes the number (num_scaled_ref_layer_offsets) of scaled reference layer offsets included in the PPS extension. Scaled reference layer offsets of which the number is the number of pieces, which is indicated by the number of scaled reference layer offsets are included along with a reference layer identifier. The reference layer identifier (ref_layer_id) is an identifier indicating a reference layer with which the subsequent scaled reference layer offset is associated. As the inter-layer pixel corresponding offset, an scaled reference layer left offset (scaled_ref_layer_left_offset), an scaled reference layer upper offset (scaled_ref_layer_top_offset), an scaled reference layer right offset (scaled_ref_layer_right_offset), and an scaled reference layer lower offset (scaled_ref_layer_bottom_offset) are included. scaled_ref_layer_left_offset, scaled_ref_layer_top_offset, scaled_ref_layer_right_offset, and scaled_ref_layer_bottom_offset are collectively referred to as scaled reference layer offset syntax below. In the syntax table of FIG. 22, an array index "[ref_layer_id[i]]" which appends to the scaled reference layer offset syntax indicates that the scaled reference layer offset syntax is associated with a reference layer indicated by ref_layer_id[i].

The parameter set decoding unit 12A decodes coding exponential Golomb codes (se(v)) from coding data, and thus decodes a value of the scaled reference layer offset syntax. As the coding exponential Golomb codes, specifically, codes which have the same name predefined in HEVC can be used. The decoded value of the scaled reference layer offset syntax has a chrominance pixel of the target picture, as a unit. In a case where scaled reference layer offset syntax corresponding to a specific reference layer is not provided in coding data, the value of each of the scaled reference layer offsets corresponding to the reference layer is set to 0.

The reference layer offset information decoded from the PPS includes a reference layer offset information present flag (ref_layer_offset_present_flag). The reference layer offset information present flag is a flag indicating whether or not the reference layer offset information associated with a reference layer which is indicated by the layer identifier "ref_layer_id[i]" is provided in the PPS. In a case where a value (ref_layer_offset_present_flag[i]) of the reference layer offset information present flag in which the array index is "i" is 1, the PPS includes a layer (target layer) to which a slice referring the PPS belongs, and each reference layer offset associated with the reference layer. Specifically, a reference layer left offset (ref_layer_left_offset), a reference layer upper offset (ref_layer_top_offset), a reference layer right offset (ref_layer_right_offset), and a reference layer lower offset (ref_layer_bottom_offset) are included. ref_layer_left_offset, ref_layer_top_offset, ref_layer_right_offset, and ref_layer_bottom_offset are collectively referred to as reference layer offset syntax below.

The parameter set decoding unit 12A decodes coding exponential Golomb codes (se(v)) from coding data, and thus decodes a value of the reference layer offset syntax. The decoded value of the reference layer offset syntax has a chrominance pixel of the reference layer picture which is associated with the reference layer offset syntax through the reference layer identifier, as a unit. In a case where reference layer offset syntax corresponding to a specific reference layer is not provided in coding data, the value of each of the reference layer offsets corresponding to the reference layer is set to 0.

The reference layer offset information decoded from the PPS includes an inter-layer phase offset information present flag (resample_phase_present_flag). The inter-layer phase offset information present flag is a flag indicating whether or not inter-layer phase offset information associated with a reference layer which is indicated by the layer identifier "ref_layer_id[i]" is provided in the PPS. In a case where a value of the inter-layer phase offset information present flag (resample_phase_present_flag[i]) in which the array index is "i" is 1, the PPS includes a layer (target layer) to which a slice referring the PPS belongs, and an inter-layer phase offset which is associated with the reference layer. Specifically, an inter-layer phase luminance horizontal offset (phase_hor_luma), an inter-layer phase luminance vertical offset (phase_ver_luma), an inter-layer phase chrominance horizontal offset (phase_hor_chroma), and an inter-layer phase chrominance vertical offset (phase_ver_chroma) are included. phase_hor_luma, phase_ver_luma, phase_hor_chroma, and phase_ver_chroma are collectively referred to as inter-layer phase offset syntax below.

The parameter set decoding unit 12A decodes coding exponential Golomb codes (ue(v)) from coding data, and thus decodes a value of the inter-layer phase offset syntax. In a case where inter-layer phase offset syntax corresponding to a specific reference layer is not provided in coding data, the value of the inter-layer phase offset corresponding to the reference layer is set to 0.

The inter-layer position corresponding information which has been described above with reference to the syntax table in FIG. 22, and is decoded from the PPS by the parameter set decoding unit 12A has the following features.

A reference layer identifier for selecting one reference layer is included in the PPS. The scaled reference layer offset syntax, the reference layer offset syntax, and the inter-layer phase offset syntax which are associated with the same reference layer identifier are consecutively included in coding data. In other words, the PPS includes ref_layer_id[i], and scaled reference layer offset syntax, reference layer offset syntax, and inter-layer phase offset syntax which have the same array index "[ref_layer_id[i]]" are consecutively included in coding data. A present flag (for example, reference layer offset information present flag or inter-layer phase offset information present flag which are described above) of each piece of offset information may be intermittently included. Some offsets may be omitted in accordance with a value of the present flag. An order of the scaled reference layer offset syntax, the reference layer offset syntax, and the inter-layer phase offset syntax which are associated with the same reference layer identifier, in coding data may be not necessarily the above-described order. The order may be switched.

As described above, the scaled reference layer offset syntax, the reference layer offset syntax, and the inter-layer phase offset syntax which are associated with the same reference layer identifier are consecutively included in coding data, and thus it is possible to decode inter-layer position corresponding information from the coding data, for each type of the offset, with a coding amount which is smaller than that in a case where the number of offsets, and the identifier of the associated reference layer are decoded.

In other words, the parameter set decoding unit 12A decodes a first reference layer identifier (ref_layer_id[i]) indicating a specific reference layer, and continuously decodes the scaled reference layer offset syntax associated with the decoded first reference layer identifier, the reference layer offset syntax associated with the decoded first reference layer identifier, and the inter-layer phase offset syntax associated with the decoded first reference layer identifier, from coding data. Thus, it is possible to decode inter-layer position information from coding data with a smaller coding amount.

Since the inter-layer position corresponding information includes the reference layer offset information present flag, it is possible to reduce a coding amount in a case where it is not necessary that the reference layer offset is explicitly transmitted. Since the reference layer offset has a feature in that a percentage of applying a default value is high, it is possible to reduce an average coding amount by using an inter-reference layer offset information present flag.

Since the inter-layer position corresponding information includes the inter-layer phase offset information present flag, it is possible to reduce a coding amount in a case where it is not necessary that the inter-layer phase offset is explicitly transmitted. Since the inter-layer phase offset has a feature in that a percentage of applying a default value is high, it is possible to reduce an average coding amount by using the inter-layer phase offset information present flag.

(Slice Decoding Unit 14A)

The slice decoding unit 14A has a configuration and a function which are similar to those of the slice decoding unit 14 which has been described with reference to FIG. 13. A difference between the slice decoding unit 14A and the slice decoding unit 14 is that the slice decoding unit 14A includes a predicted image generation portion 1443A instead of the predicted image generation portion 1442 included in the slice decoding unit 14. In the predicted image generation portion 1443A, when the predicted image generation processing is performed in a case where the inter-layer prediction is selected, the corresponding reference position deriving processing is performed based on the inter-layer position corresponding information, by the following procedures of S401 to S409.

(S401) It is determined whether a target of the predicted image generation processing is a luminance pixel or a chrominance pixel. In a case where the target is a luminance pixel, S402 is performed. In a case where the target is a chrominance pixel, S404 is performed.

(S402) The scaled reference layer offset is derived from the value of the scaled reference layer offset syntax which is decoded by the parameter set decoding unit 12A, and corresponds to a reference layer. The scaled reference layer offset which is derived and relates to a reference layer (layer R) is referred to as SRLO[r] below. In addition, scaled reference layer offsets and signs thereof, which constitute SRLO[r] and respectively correspond to the left, the top, the right, and the bottom are defined as follows.

Scaled reference layer left offset: SRLLO[r]
Scaled reference layer upper offset: SRLTO[r]
Scaled reference layer right offset: SRLRO[r]
Scaled reference layer lower offset: SRLBO[r]

Each of the offsets SRLLO, SRLTO, SRLRO, and SRLBO which constitute SRLO[r] is derived based on a value of the corresponding scaled reference layer offset syntax, by the following calculations.

SRLLO=(scaled_ref_layer_left_offset[r]*SubWidthC)

SRLTO=(scaled_ref_layer_top_offset[r]*SubHeightC)

SRLRO=(scaled_ref_layer_right_offset[r]*SubWidthC)

SRLBO=(scaled_ref_layer_bottom_offset[r]*SubHeightC)

Here, SubWidthC and SubHeightC are respectively a luminance-chrominance width ratio and a luminance-chrominance height ratio which are derived from a color format correlated with the target layer.

The deriving processing of the scaled reference layer offset can be expressed as follows. That is, in a case where a target of the predicted image generation processing is a luminance pixel, the scaled reference layer offset is derived by the product of the value of the scaled reference layer offset syntax, and a luminance-chrominance size ratio (luminance-chrominance width ratio or luminance-chrominance height ratio) in the target layer. Then, S403 is performed.

(S403) The reference layer offset on the reference layer (layer r) is derived. The reference layer offset is configured from 4 offsets (RLLO, RLTO, RLRO, and RLBO in this order) which respectively correspond to the left, the top, the right, and the bottom. The reference layer offset is derived based on the value of the reference layer offset syntax, by using the following expressions.

RLLO=(ref_layer_left_offset[r]*RefSubWidthC)

RLTO=(ref_layer_top_offset[r]*RefSubHeightC)

RLRO=(ref_layer_right_offset[r]*RefSubWidthC)

RLBO=(ref_layer_bottom_offset[r]*RefSubHeightC)

Here, RefSubWidthC and RefSubHeightC are a luminance-chrominance size ratio derived from a color format correlated with the reference layer. That is, a value of SubWidthC derived based on the color format of the reference layer is set as RefSubWidthC. A value of SubHeightC derived based on the color format of the reference layer is set as RefSubHeightC.

The deriving processing of the reference layer offset can be expressed as follows. That is, in a case where a target of the predicted image generation processing is a luminance pixel, the reference layer offset is derived by the product of the value of the reference layer offset syntax, and the luminance-chrominance size ratio in the reference layer. Then, S406 is performed.

(S404) Each of the offsets SRLLO, SRLTO, SRLRO, and SRLBO which constitute SRLO[j] described in S402 is derived based on the value of the corresponding scaled reference layer offset syntax, by using the following calculations.

SRLLO=scaled_ref_layer_left_offset[r]

SRLTO=scaled_ref_layer_top_offset[r]

SRLRO=scaled_ref_layer_right_offset[r]

SRLBO=scaled_ref_layer_bottom_offset[r]

The deriving processing of the scaled reference layer offset can be expressed as follows. That is, in a case where a target of the predicted image generation processing is a chrominance pixel, the value of the scaled reference layer offset syntax is derived as the scaled reference layer offset. Then, S405 is performed.

(S405) The reference layer offsets (RLLO, RLTO, RLRO, and RLBO) which have been described in S403 are derived by the following expressions.

RLLO=ref_layer_left offset[r]

RLTO=ref_layer_top offset[r]

RLRO=ref_layer_right offset[r]

RLBO=ref_layer_bottom offset[r]

The deriving processing of the reference layer offset can be expressed as follows. That is, in a case where a target of the predicted image generation processing is a chrominance pixel, the value of the reference layer offset syntax is derived as the reference layer offset. Then, S406 is performed.

(S406) The size of an scaled reference layer is derived based on the scaled reference layer offset which has been derived in S402 or S404, and a target layer picture size. The width (SRLW) and the height (SRLH) of the scaled reference layer are respectively derived based on the width (CL_PICW) and the height (CL_PICH) of the target layer picture, by using the following expressions.

SRLW=CL_PICW-(SRLLO+SRLRO)

SRLH=CL_PICH-(SRLTO+SRLBO)

That is, according to the above expressions, the sum of the scaled reference layer left offset and the scaled reference layer right offset is subtracted from the width of the target layer picture. Thus, the width of the scaled reference layer on the target layer is derived. Regarding the height of the scaled reference layer on the target layer, the above descriptions are similarly applied. Then, S407 is performed. The reason of the subtraction of the sum of the offsets in the expression is because the sign of the offset is defined so as to cause the value of the offset to be positive in a case where an scaled reference layer (reference layer corresponding region in FIG. 21(a)) is in the target layer picture, as illustrated in FIG. 21(a).

(S407) The size of a region (reference layer base region) which is set as a base of scale calculation on the reference layer is derived based on the reference layer offset which has been derived in S403 or S405, and a reference layer picture size. The width (RLW) and the height (RLH) of the reference layer base region are respectively derived based on the width (RL_PICW) and the height (RL_PICH) of the reference layer picture, by using the following expressions.

RLW=RL_PICW-(RLLO+RLRO)

RLH=RL_PICH-(RLTO+RLBO)

That is, according to the above expressions, the sum of the reference layer left offset and the reference layer right offset is subtracted from the width of the reference layer picture. Thus, the width of the reference layer base region is derived. Regarding the height of the reference layer base region, the above descriptions are similarly applied. Then, S408 is performed.

(S408) A scale used in the inter-layer prediction is derived based on the size of the scaled reference layer, which has been derived in S406, and the size of the reference layer base region, which has been derived in S407. A scale sx in the horizontal direction and a scale sy in the vertical direction are respectively derived by the following expressions.

$$sx=((RLW<<16)+(SRLW>>1))/SRLW$$

$$sy=((RLH<<16)+(SRLH>>1))/SRLH$$

The operator "/" is an operator indicating division of an integer.

That is, according to the expressions, a predetermined constant (in the above expressions, "<<16") is multiplied by the reference layer reference region size, and a value obtained by dividing a value obtained by multiplication, by the target layer reference region size is set as the scale. The item of "(SRLW>>1)" is an item for adjusting rounding-off by division. Thus, if an effect of the unit or the rounding-off is excluded, the scale can be described as a ratio between the size (width or height) of the reference layer base region and the size (width or height) of the scaled reference layer. Then, S409 is performed.

(S409) A reference pixel position is derived with 1/16 of pixel accuracy, based on the scaled reference layer offset, which has been derived in S402 or S404, the reference layer base region offset, which has been derived in S403 or S405, the scale derived in S408, and the inter-layer phase offset derived by the parameter set decoding unit 12A. Values of a horizontal component (x component) xRef16 and a vertical component (y component) yRef16 of the reference pixel position on the reference layer with 1/16 of pixel accuracy correspond to a pixel position (xP, yP) on the target layer, and are respectively derived by the following expressions.

$$xRef16=(((xP-CL\_OX)*sx+addX+(1<<11))>>12)+RL\_OX$$

$$yRef16=(((yP-CL\_OY)*sy+addY+(1<<11))>>12)+RL\_OY$$

Here,

CL_OX=SRLLO

CL_OY=SRLTO

RL_OX=(RLLO<<4)

RL_OY=(RLTO<<4)

addX and addY are parameters for indicating a shift between a pixel on the target layer and a pixel on the reference layer, which occurs by up-sampling or interlacing. addX and addY are respectively derived by the following expressions.

$$addX=(sx*phaseX+8)>>4$$

$$addY=(sy*phaseY+8)>>4$$

Here, if the value of the reference layer identifier is set as r, in a case where a target pixel is a luminance pixel, phase_hor_luma[r] is set as the value of phaseX, and phase_ver_luma[r] is set as the value of phaseY. In a case where the target pixel is a chrominance pixel, the value of phase_hor_chroma[r] is set in phaseX, and the value of phase_ver_chroma[r] is set in phaseY.

That is, according to the deriving expressions of xRef16 and yRef16, the reference pixel position is calculated based on the scaled reference layer offset, the reference layer offset, the inter-layer phase offset, and the scale. The derived reference pixel position with 1/16 of pixel accuracy is set as the corresponding reference position, and then the corresponding reference position deriving processing is ended.

In the interpolated filter processing, a pixel value at a position corresponding to the corresponding reference position which has been derived in the corresponding reference position deriving processing is generated in such a manner that an interpolated filter is applied to a decoding pixel of a pixel in the vicinity of the corresponding reference position, on the reference layer picture.

Modification Example 5: Scaled Reference Layer Offset Information Present Flag

An example in which the inter-layer position corresponding information decoded by the parameter set decoding unit 12A includes the reference layer offset information present flag and the inter-layer phase offset information present flag is described. However, as illustrated in FIG. 23, a configuration in which a syntax table which additionally includes an scaled reference layer offset information present flag is used may be made. The scaled reference layer offset information present flag (scaled_ref_layer_offset_present_flag) is a flag indicating whether or not the scaled reference layer offset information is provided in the PPS. The scaled reference layer offset information present flag (scaled_ref_layer_offset_present_flag[i]) corresponding to the array index i indicates whether or not syntax (scaled_ref_layer_left_offset[ref_layer_id[i]], scaled_ref_layer_top_offset[ref_layer_id[i]], scaled_ref_layer_right_offset[ref_layer_id[i]], and scaled_ref_layer_bottom_offset[ref_layer_id[i]]) of the scaled reference layer offset corresponding to a reference layer of which a layer identifier is ref_layer_id[i] is provided in coding data. In a case where a value of the flag is 1, the flag indicates that the syntax is provided. In a case where the value of the flag is 0, the flag indicates the syntax is not provided. It is possible to reduce a coding amount in a case where the scaled reference layer offset is not necessary, by using the scaled reference layer offset information present flag.

In another example, as illustrated in FIG. 24, a configuration in which a syntax table which includes the layer offset information present flag and the inter-layer phase offset present flag is used in the inter-layer position corresponding information may be made. The layer offset information present flag (layer_offset_present_flag) is a flag indicating that the scaled reference layer offset information and the reference layer offset information are provided in the PPS. The layer offset information present flag (layer_offset_present_flag[i]) corresponding to the array index i indicates whether or not the scaled reference layer offset and the reference layer offset syntax which correspond to a reference layer of which a layer identifier is ref_layer_id[i] are provided in coding data. In a case where a value of the flag is 1, the flag indicates that the syntax is provided. In a case where the value of the flag is 0, the flag indicates that the syntax is not provided. Regarding the scaled reference layer offset and the reference layer offset, in a case where the entirety of the target picture corresponds to the entirety of the reference picture, that is, in a typical use case, all of the offset values are 0, and are omitted. Accordingly, it is possible to reduce a coding amount in such a case, by using the layer offset information present flag.

Application Example to Another Hierarchy Video Coding/Decoding System

The hierarchy video coding device 2 and the hierarchy video decoding device 1 which have been described above can be mounted in various devices which perform transmission, reception, recording, and reproduction of a video, and be used. The video may be a natural video captured by a camera and the like, or be an artificial video (including CG and a GUI) generated by a computer and the like.

Figure 19:
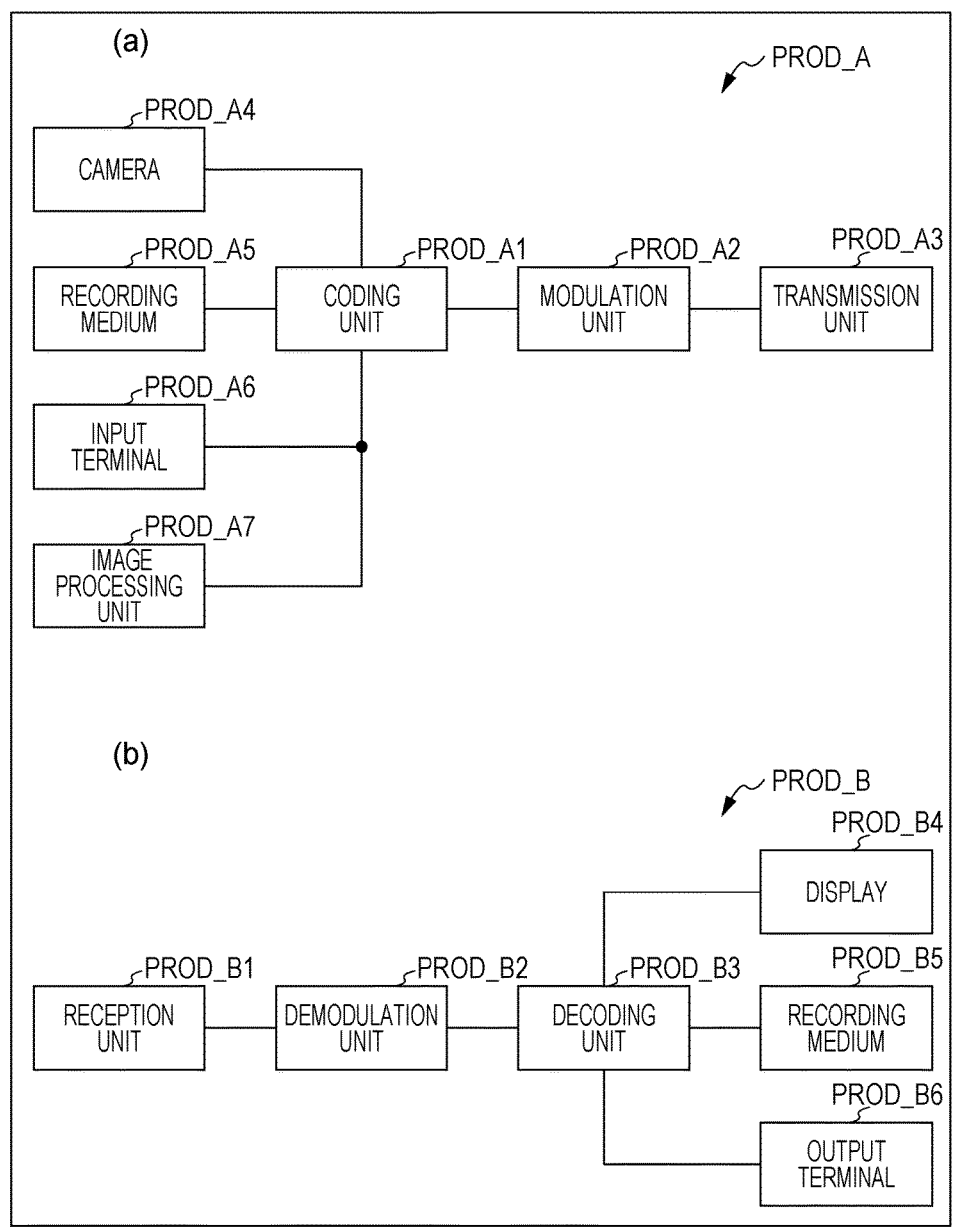
FIG. 19 is a diagram illustrating a configuration of a transmission device having the hierarchy video coding device mounted therein, and a configuration of a reception device having the hierarchy video decoding device mounted therein.

A case where the hierarchy video coding device 2 and the hierarchy video decoding device 1 which are described above can be used when a video is transmitted and received will be described with reference to FIG. 19. FIG. 19(*a*) is a block diagram illustrating a configuration of a transmission device PROD_A in which the hierarchy video coding device 2 is mounted.

As illustrated in FIG. 19(*a*), the transmission device PROD_A includes a coding unit PROD_A1, a modulation unit PROD_A2, and a transmission unit PROD_A3. The coding unit PROD_A1 obtains coding data by coding a video. The modulation unit PROD_A2 obtains a modulation signal by modulating the coding data which is obtained by the coding unit PROD_A1, with a carrier wave. The transmission unit PROD_A3 transmits the modulation signal obtained by the modulation unit PROD_A2. The above-described hierarchy video coding device 2 is used as the coding unit PROD_A1.

The transmission device PROD_A may include a camera PROD_A4, a recording medium PROD_A5, an input terminal PROD_A6, and an image processing unit A7. The camera PROD_A4 is used as a supply source of a video input to the coding unit PROD_A1, and captures a video. The recording medium PROD_A5 records a video. The input terminal PROD_A6 is used for input a video from the outside of the device. The image processing unit A7 generates or processes an image. FIG. 19(*a*) illustrates a configuration in which the transmission device PROD_A includes all of the above-described units. However, some thereof may be omitted.

The recording medium PROD_A5 may be used for recording a video which is not coded, or may be used for recording a video coded by a coding method for recording which is different from a coding method for transmission. In a case of the latter, a decoding unit (not illustrated) may be interposed between the recording medium PROD_A5 and the coding unit PROD_A1. The decoding unit decodes coding data which has been read from the recording medium PROD_A5, in accordance with the coding method for recording.

FIG. 19(*b*) is a block diagram illustrating a configuration of a reception device PROD_B in which the hierarchy video decoding device 1 is mounted. As illustrated in FIG. 19(*b*), the reception device PROD_B includes a reception unit PROD_B1, a demodulation unit PROD_B2, and a decoding unit PROD_B3. The reception unit PROD_B1 receives a modulation signal. The demodulation unit PROD_B2 obtains coding data by demodulating the modulation signal which has been received by the reception unit PROD_B1. The decoding unit PROD_B3 obtains a video by decoding the coding data which has been obtained by the demodulation unit PROD_B2. The above-described hierarchy video decoding device 1 is used as the decoding unit PROD_B3.

The reception device PROD_B may include a display PROD_B4, a recording medium PROD_B5, and an output terminal PROD_B6. The display PROD_B4 displays a video as a supply destination of a video output by the decoding unit PROD_B3. The recording medium PROD_B5 records a video. The output terminal PROD_B6 outputs a video to the outside of the device. FIG. 19(*b*) illustrates a configuration in which the reception device PROD_B includes all of the above-described units. However, some thereof may be omitted.

The recording medium PROD_B5 may be used for recording a video which is not coded, or may be used for recording a video coded by a coding method for recording which is different from a coding method for transmission. In a case of the latter, a coding unit (not illustrated) may be interposed between the decoding unit PROD_B3 and the recording medium PROD_B5. The coding unit codes a video acquired from the decoding unit PROD_B3, in accordance with the coding method for recording.

A transmission medium for transmitting the modulation signal may be wireless or wired. A transmission form in which the modulation signal is transmitted may be broadcasting (which means a transmission form in which a transmission destination is not specified in advance, here), or communication (which means a transmission form in which a transmission destination is specified in advance, here). That is, transmission of the modulation signal may be realized by any of radio broadcasting, cable broadcasting, wireless communication, and wired communication.

For example, a broadcast station (broadcasting facilities and the like)/receiving station (television receiver and the like) for digital terrestrial broadcasting is an example of the transmission device PROD_A/reception device PROD_B which transmits and receives a modulation signal in radio broadcasting. A broadcast station (broadcasting facilities and the like)/receiving station (television receiver and the like) for cable television broadcasting is an example of the transmission device PROD_A/reception device PROD_B which transmits and receives a modulation signal in cable broadcasting.

A server (workstation and the like)/client (television receiver, personal computer, smart phone and the like) for a VOD (Video On Demand) service or a video sharing service which uses the Internet is an example of the transmission device PROD_A/reception device PROD_B which transmits and receives a modulation signal in communication (generally, either of wireless and a cable is used as a transmission medium in the LAN, and a cable is used as a transmission medium in the WAN). Here, the personal computer includes a desktop PC, a laptop PC, and a tablet PC. The smart phone includes a multi-function mobile phone.

The client of the video sharing service has a function of coding a video which has been captured by a camera, and uploading the coded video to the server, in addition to a function of decoding coding data which has been downloaded from the server, and displaying the decoded data in the display. That is, the client of the video sharing service functions as both of the transmission device PROD_A and the reception device PROD_B.

Figure 20:
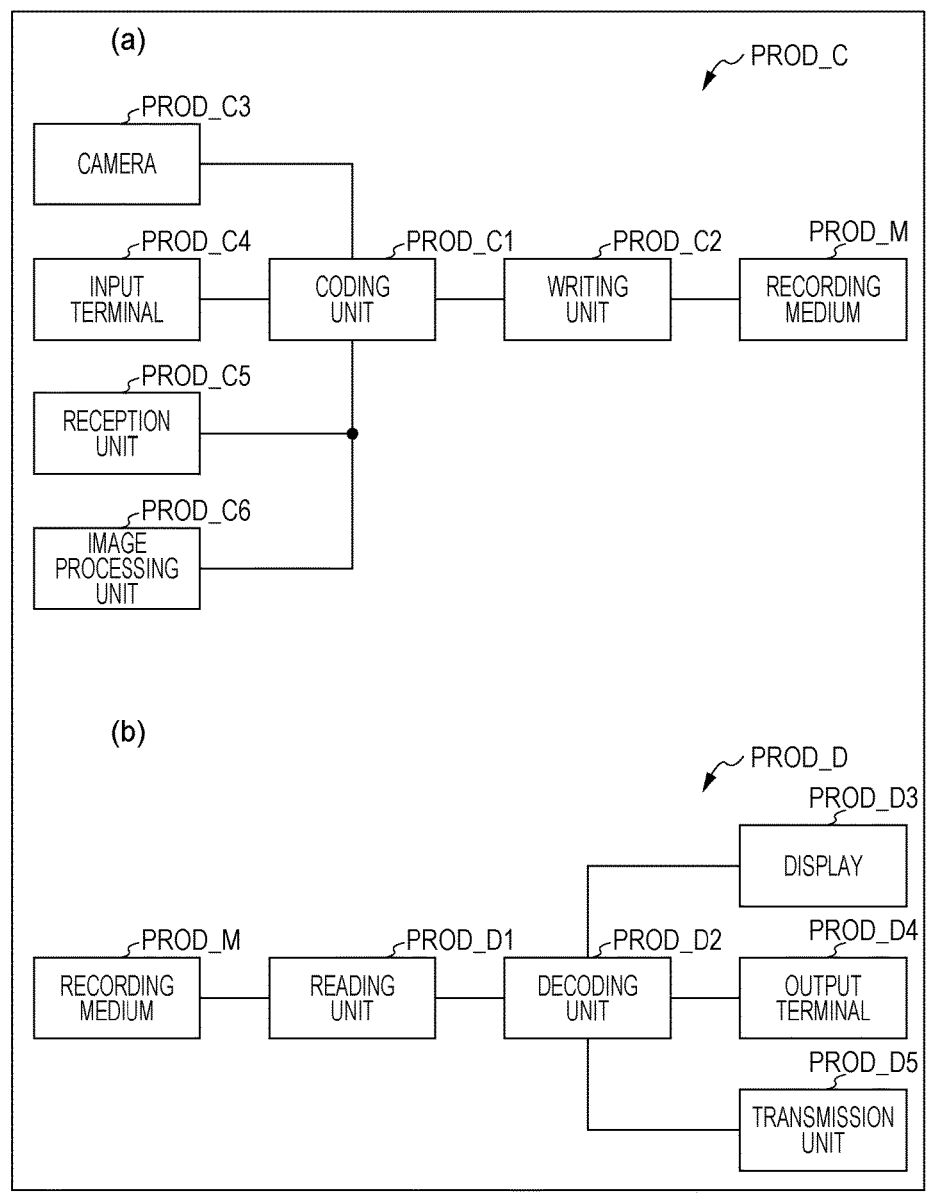
FIG. 20 is a diagram illustrating a configuration of a recording device having the hierarchy video coding device mounted therein, and a configuration of a reproduction device having the hierarchy video decoding device mounted therein.

A case where the hierarchy video coding device 2 and the hierarchy video decoding device 1 which are described above are used in recording and reproducing of a video will be described with reference to FIG. 20. FIG. 20(*a*) is a block diagram illustrating a configuration of the recording device PROD_C in which the above-described hierarchy video coding device 2 is mounted.

As illustrated in FIG. 20(*a*), the recording device PROD_C includes a coding unit PROD_C1, and a writing unit PROD_C2. The coding unit PROD_C1 obtains coding data by coding a video. The writing unit PROD_C2 writes the coding data which has been obtained by the coding unit PROD_C1, in a recording medium PROD_M. The above-described hierarchy video coding device 2 is used as the coding unit PROD_C1.

The recording medium PROD_M may have (1) a type of being mounted in the recording device PROD_C, such as a hard disk drive (HDD) and a solid state drive (SSD), may have (2) a type of being connected to the recording device PROD_C, such as an SD memory card, and a USB (Universal Serial Bus) flash memory, or may (3) be loaded in a drive device (not illustrated) mounted in the recording device PROD_C, such as a digital versatile disc (DVD) and a Blu-ray Disc (BD: registered trademark).

The recording device PROD_C includes a camera PROD_C3, an input terminal PROD_C4, a reception unit PROD_C5, and an image processing unit C6. The camera PROD_C3 is used as a supply source of a video input to the coding unit PROD_C1, and captures a video. The input terminal PROD_C4 inputs a video from the outside of the device. The reception unit PROD_C5 receives a video. The image processing unit C6 generates or processes an image. FIG. 20(a) illustrates a configuration in which the recording device PROD_C includes all of the above-described units. However, some thereof may be omitted.

The reception unit PROD_C5 may receive a video which is not coded, or may receive coding data coded by a coding method for transmission which is different from a coding method for recording. In a case of the latter, a decoding unit (not illustrated) for transmission may be interposed between the reception unit PROD_C5 and the coding unit PROD_C1. The decoding unit for transmission decodes coding data which has been coded by using the coding method for transmission.

Examples of such a recording device PROD_C include a DVD recorder, a BD recorder, a HDD (Hard Disk Drive) recorder, and the like (in this case, the input terminal PROD_C4 or the reception unit PROD_C5 functions as the main supply source of a video). In addition, a camcorder (in this case, the camera PROD_C3 functions as the main supply source of a video), a personal computer (in this case, the reception unit PROD_C5 or the image processing unit C6 functions as the main supply source of a video), a smart phone (in this case, the camera PROD_C3 or the reception unit PROD_C5 functions as the main supply source of a video), and the like are an example of such a recording device PROD_C.

FIG. 20(b) is a block diagram illustrating a configuration of a reproduction device PROD_D in which the hierarchy video decoding device 1 is mounted. As illustrated in FIG. 20(b), the reproduction device PROD_D includes a reading unit PROD_D1 and a decoding unit PROD_D2. The reading unit PROD_D1 reads coding data which has been written in the recording medium PROD_M. The decoding unit PROD_D2 obtains a video by decoding the coding data which has been read by the reading unit PROD_D1. The above-described hierarchy video decoding device 1 is used as the decoding unit PROD_D2.

The recording medium PROD_M may have (1) a type of being mounted in the reproduction device PROD_D, such as a HDD and a SSD, may have (2) a type of being connected to the reproduction device PROD_D, such as an SD memory card, and a USB flash memory, or may (3) be loaded in a drive device (not illustrated) mounted in the reproduction device PROD_D, such as a DVD and a BD.

The reproduction device PROD_D includes a display PROD_D3, an output terminal PROD_D4, and a transmission unit PROD_D5. The display PROD_D3 is used as a supply destination of a video output by the decoding unit PROD_D2, and displays a video. The output terminal PROD_D4 is used for outputting a video to the outside of the device. The transmission unit PROD_D5 transmits a video. FIG. 20(b) illustrates a configuration in which the reproduction device PROD_D includes all of the above-described units. However, some thereof may be omitted.

The transmission unit PROD_D5 may transmit a video which is not coded, or may transmit coding data which has been coded by using a coding method for transmission which is different from a coding method for recording. In a case of the latter, a coding unit (not illustrated) may be interposed between the decoding unit PROD_D2 and the transmission unit PROD_D5. The coding unit codes a video by using the coding method for transmission.

Examples of such a reproduction device PROD_D include a DVD player, a BD player, a HDD player, and the like (in this case, the output terminal PROD_D4 to which the television receiver and the like are connected functions as the main supply destination). A television receiver (in this case, the display PROD_D3 functions as the main supply destination), a digital signage (which is also referred to as an electronic signboard, an electric bulletin board, or the like, and the display PROD_D3 or the transmission unit PROD_D5 functions as the main supply destination), a desktop PC (in this case, the output terminal PROD_D4 or the transmission unit PROD_D5 functions as the main supply destination), a laptop or tablet PC (in this case, the display PROD_D3 or the transmission unit PROD_D5 functions as the main supply destination), a smart phone (in this case, the display PROD_D3 or the transmission unit PROD_D5 functions as the main supply destination), and the like are an example of such a reproduction device PROD_D.

(Realization by Hardware and Realization by Software)
Finally, the blocks of the hierarchy video decoding device 1 and the hierarchy video coding device 2 may be realized by hardware of a logical circuit which is formed on an integrated circuit (IC chip), or may be realized by software of using a central processing unit (CPU).

In a case of the latter, each of the devices includes a CPU, a read only memory (ROM), a random access memory (RAM), a storage device (recording medium) such as a memory, and the like. The CPU executes a command of a control program for realizing functions. The ROM stores the program. In the RAM, the program is developed. The storage device stores the program and various types of data. An object of the present invention can be achieved in such a manner that a recording medium is supplied to each of the device, and a computer (CPU or a micro processing unit (MPU)) thereof reads and executes program codes recorded in the recording medium. In the recording medium, program codes (execution format program, intermediate code program, and source program) of a control program for each of the devices are recorded so as to be allowed to be read by a computer. The control program is software for realizing the above-described functions.

As the recording medium, for example, tapes such as a magnetic tape or a cassette tape, disks, cards such as an IC card (including a memory card)/optical card, semiconductor memories such as a mask ROM/EPROM (Erasable Programmable Read-only Memory)/EEPROM (registered trademark) (Electrically Erasable and Programmable Read-only Memory)/flash ROM, logical circuits such as a programmable logic device (PLD) or a field programmable gate array (FPGA), or the like can be used. The disks includes a magnetic disk such as a floppy (registered trademark) disk/hard disk, and an optical disk such as a CD-ROM (Compact Disc Read-Only Memory)/MO (Magneto-Optical)/MD (Mini Disc)/DVD (Digital Versatile Disk)/CD-R (CD Recordable).

Each of the devices may be configured so as to be allowed to be connected to a communication network, and the program code may be supplied through the communication network. The communication network may be used for transmitting the program code, but is not limited thereto. For example, the Internet, an intranet, an extranet, a local area network (LAN), an integrated services digital network (ISDN), a value-added network (VAN), a CATV (community antenna television) communication network, a virtual private network, a mobile communication network, a satellite communication network, and the like may be used. A transmission medium constituting the communication network may be a medium allowing transmission of the program code, and is not limited to a specific configuration or a specific type. For example, the transmission medium can be used in cable communication and wireless communication. Examples of the cable communication include IEEE (Institute of Electrical and Electronic Engineers) 1394, USB, power-line transmission, a cable TV line, a telecommunication line, and an asymmetric digital subscriber line (ADSL) line. Examples of the wireless communication include infrared communication such as Infrared Data Association (IrDA) or remote control, Bluetooth (registered trademark), IEEE 802.11 wireless communication, high data rate (HDR), near field communication (NFC), digital living network alliance (DLNA), a mobile phone network, a satellite line, and a terrestrial digital network. The present invention may be also realized in a form of a computer data signal which is obtained by implementation of the program codes by electronic transmission, and is embedded to a carrier wave.

The present invention is not limited to the above-described embodiments, and various changes may be made in a range described in claims. An embodiment obtained by appropriately combining the technical means disclosed in each of the different embodiments is also included in the technical scope of the present invention.

INDUSTRIAL APPLICABILITY

The present invention can be appropriately applied to a hierarchy image decoding device which decodes coding data obtained by hierarchically coding image data, and to a hierarchy image coding device which generates coding data obtained by hierarchically coding image data. The present invention can be appropriately applied to a data structure of hierarchy coding data which is generated by a hierarchy image coding device and to which a hierarchy image decoding device refers.

REFERENCE SIGNS LIST 1, 3 HIERARCHY VIDEO DECODING DEVICE (IMAGE DECODING DEVICE)
11 NAL DEMULTIPLEXING UNIT
12, 12A PARAMETER SET DECODING UNIT
13 TILE SETTING UNIT
14, 14A SLICE DECODING UNIT
141 SLICE HEADER DECODING UNIT
142 SLICE POSITION SETTING PORTION
144 CTU DECODING UNIT
1441 PREDICTION RESIDUAL RESTORATION PORTION
1442, 1442A PREDICTED IMAGE GENERATION PORTION
1443 CTU DECODING IMAGE GENERATION PORTION
15 BASE DECODING UNIT
151 BASE NAL DEMULTIPLEXING PORTION
152 BASE PARAMETER SET DECODING PORTION
153 BASE TILE SETTING PORTION
154 BASE SLICE DECODING PORTION
156 BASE DECODING PICTURE MANAGEMENT PORTION
16 DECODING PICTURE MANAGEMENT UNIT
2 HIERARCHY VIDEO CODING DEVICE (IMAGE CODING DEVICE)
21 NAL MULTIPLEXING UNIT
22 PARAMETER SET CODING UNIT
23 TILE SETTING UNIT
24 SLICE CODING UNIT
241 SLICE HEADER SETTING PORTION
242 SLICE POSITION SETTING PORTION
244 CTU CODING PORTION
2441 PREDICTION RESIDUAL CODING PORTION
2442 PREDICTED IMAGE CODING PORTION
3 HIERARCHY CODING DATA TRANSFORM DEVICE (CODING DATA TRANSFORM DEVICE)
32 PARAMETER SET MODIFICATION UNIT
34 NAL SELECTION UNIT

The invention claimed is:

1. An image decoding device which decodes coding data subjected to hierarchy coding, and reconstructs a decoding picture of a higher layer which is a target layer, the device comprising:
a parameter set decoding circuit that decodes:
a reference layer identifier indicating a specific reference layer in a parameter set,
a scaled reference layer offset present flag indicating whether scaled reference layer offset parameters are present in the parameter set, and
a reference layer offset present flag indicating whether reference layer offset parameters are present in the parameter set; and
a deriving circuit that derives a reference location specifying a reference layer with 1/16 of pixel accuracy by using the scaled reference layer offset parameters and the reference layer offset parameters, wherein
the parameter set decoding circuit decodes:
the scaled reference layer offset parameters associated with the reference layer identifier according to a value of the scaled reference layer offset present flag, and
the reference layer offset parameters associated with the reference layer identifier according to a value of the reference layer offset present flag.

2. An image decoding method for decoding coding data subjected to hierarchy coding, and reconstructing a decoding picture of a higher layer which is a target layer, the method comprising:
decoding a reference layer identifier indicating a specific reference layer in a parameter set;
decoding a scaled reference layer offset present flag indicating whether scaled reference layer offset parameters are present in the parameter set;
decoding a reference layer offset present flag indicating whether reference layer offset parameters are present in the parameter set;
decoding the scaled reference layer offset parameters associated with the reference layer identifier according to a value of the scaled reference layer offset present flag;

decoding the reference layer offset parameters associated with the reference layer identifier according to a value of the reference layer offset present flag; and deriving a reference location specifying a reference layer with 1/16 of pixel accuracy by using the scaled reference layer offset parameters and the reference layer offset parameters.

3. A computer-readable recoding medium storing a program for making a computer decode coding data subjected to hierarchy coding and reconstruct a decoding picture of a higher layer which is a target layer, the program making the computer:

decode a reference layer identifier indicating a specific reference layer in a parameter set;

decode a scaled reference layer offset present flag indicating whether scaled reference layer offset parameters are present in the parameter set;

decode a reference layer offset present flag indicating whether reference layer offset parameters are present in the parameter set;

decode the scaled reference layer offset parameters associated with the reference layer identifier according to a value of the scaled reference layer offset present flag;

decode the reference layer offset parameters associated with the reference layer identifier according to a value of the reference layer offset present flag; and derive a reference location specifying a reference layer with 1/16 of pixel accuracy by using the scaled reference layer offset parameters and the reference layer offset parameters.

4. An image coding device which codes a picture of a higher layer which is a target layer hierarchically, and generates coding data, the device comprising:

a parameter set coding circuit that codes:
a reference layer identifier indicating a specific reference layer in a parameter set,
a scaled reference layer offset present flag indicating whether scaled reference layer offset parameters are present in the parameter set, and
a reference layer offset present flag indicating whether reference layer offset parameters are present in the parameter set; and a coding circuit that derives a reference location specifying a reference layer with 1/16 of pixel accuracy by using the scaled reference layer offset parameters and the reference layer offset parameters, wherein the parameter set coding circuit codes:
the scaled reference layer offset parameters associated with the reference layer identifier according to a value of the scaled reference layer offset present flag, and the reference layer offset parameters associated with the reference layer identifier according to a value of the reference layer offset present flag.

5. An image coding method for coding a picture of a higher layer which is a target layer hierarchically, and generating coding data, the method comprising:

coding a reference layer identifier indicating a specific reference layer in a parameter set;

coding a scaled reference layer offset present flag indicating whether scaled reference layer offset parameters are present in the parameter set;

coding a reference layer offset present flag indicating whether reference layer offset parameters are present in the parameter set;

coding the scaled reference layer offset parameters associated with the reference layer identifier according to a value of the scaled reference layer offset present flag;

coding the reference layer offset parameters associated with the reference layer identifier according to a value of the reference layer offset present flag; and deriving a reference location specifying a reference layer with 1/16 of pixel accuracy by using the scaled reference layer offset parameters and the reference layer offset parameters.

6. A computer-readable recoding medium storing a program for making a computer code a picture of a higher layer which is a target layer hierarchically, and generate coding data, the program making the computer:

code a reference layer identifier indicating a specific reference layer in a parameter set;

code a scaled reference layer offset present flag indicating whether scaled reference layer offset parameters are present in the parameter set;

code a reference layer offset present flag indicating whether reference layer offset parameters are present in the parameter set;

code the scaled reference layer offset parameters associated with the reference layer identifier according to a value of the scaled reference layer offset present flag;

code the reference layer offset parameters associated with the reference layer identifier according to a value of the reference layer offset present flag; and derive a reference location specifying a reference layer with 1/16 of pixel accuracy by using the scaled reference layer offset parameters and the reference layer offset parameters.

* * * * *